United States Patent [19]
Garner

[11] Patent Number: 6,058,307
[45] Date of Patent: May 2, 2000

[54] PRIORITY AND PREEMPTION SERVICE SYSTEM FOR SATELLITE RELATED COMMUNICATION USING CENTRAL CONTROLLER

[75] Inventor: William B. Garner, Laytonsville, Md.

[73] Assignee: AMSC Subsidiary Corporation, Reston, Va.

[21] Appl. No.: 09/022,877

[22] Filed: Feb. 12, 1998

Related U.S. Application Data

[63] Continuation-in-part of application No. 08/923,534, Sep. 4, 1997, which is a continuation-in-part of application No. PCT/US96/19120, Nov. 29, 1996.
[60] Provisional application No. 60/007,748, Nov. 30, 1995, provisional application No. 60/007,742, Nov. 30, 1995, and provisional application No. 60/007,749, Nov. 30, 1995.

[51] Int. Cl.[7] .................................................... H04Q 7/20
[52] U.S. Cl. ........................................ 455/428; 455/12.1
[58] Field of Search ................................... 455/12.1, 13.1, 455/13.2, 403, 410, 411, 414, 422, 424, 425, 426, 427, 428, 429, 430, 517, 524, 62, 63, 67.1, 560; 370/316

[56] References Cited

U.S. PATENT DOCUMENTS

| | | |
|---|---|---|
| 4,951,279 | 8/1990 | Hotta . |
| 5,216,427 | 6/1993 | Yan et al. . |
| 5,239,647 | 8/1993 | Comroe et al. . |
| 5,303,286 | 4/1994 | Wiedeman . |
| 5,371,898 | 12/1994 | Grube et al. . |
| 5,392,355 | 2/1995 | Khurana et al. . |
| 5,394,560 | 2/1995 | Kane . |
| 5,488,649 | 1/1996 | Schellinger . |
| 5,526,404 | 6/1996 | Wiedeman et al. . |
| 5,533,023 | 7/1996 | Ohison et al. . |
| 5,555,257 | 9/1996 | Dent . |
| 5,586,165 | 12/1996 | Wiedeman . |
| 5,590,395 | 12/1996 | Diekelman . |
| 5,592,470 | 1/1997 | Rudrapatna et al. . |
| 5,594,740 | 1/1997 | Ladue . |
| 5,594,780 | 1/1997 | Wiedeman et al. . |
| 5,659,878 | 8/1997 | Uchida et al. . |
| 5,713,075 | 1/1998 | Threadgil et al. ................. 455/427 |
| 5,717,830 | 2/1998 | Sigler et al. . |
| 5,842,125 | 11/1998 | Modzelesky et al. .............. 455/428 |

FOREIGN PATENT DOCUMENTS

WO 97/20401  6/1997  WIPO .

OTHER PUBLICATIONS

"North American Mobile Satellite System Signaling Architecture", Lawrence White et al., American Institute of Aeronautics and Astronautics, Inc., pp. 427–739.

"The AMSC/TMI Mobile Satellite Services (MSS) System Ground Segment Architecture", J. Lunsford et al., American Institute of Aeronautics and Astronautics, Inc., pp. 405–426.

"Call Control in the AMSC Mobile Satellite Service System", William R.H. Tisdale, et al., Pre–Publication Review Copy, American Institute of Aeronautics and Astronautics, Mar. 1, 1994, pp. 1–13.

"Westinghouse MSAT Mobile Terminal Channel Emulator", A Fasulo et al., American Institute of Aeronautics and Astronautics, Inc., pp. 256–260.

(List continued on next page.)

Primary Examiner—Reinhard J. Eisenzopf
Assistant Examiner—Marsha D. Banks-Harold
Attorney, Agent, or Firm—Irah H. Donner; Pepper Hamilton LLP

[57] ABSTRACT

A priority and preemption method for performing a priority and preemption process includes the steps of satisfying a resource acquisition request from a reserve pool for an external system, and when the resource acquisition request cannot be satisfied from the reserve pool, requesting additional unused frequencies, and when the additional unused frequencies are not available, requesting to preempt active calls. The method also includes the step of replenishing the power and the frequencies received from the frequency controller, the data hub and/or the independent operations controller when the frequencies are no longer needed by the priority and preemption system.

23 Claims, 42 Drawing Sheets

OTHER PUBLICATIONS

"MSAT Network Communications Controller and Network Operations Center", Tony Harvey et al., American Institute of Aeronautics and Astronautics, Inc. pp. 270–279.

"MSAT and Cellular Hybrid Networking", Patrick W. Baranowsky II, Westinghouse Electric Corporation.

"Fedderlink Earth Station to Provide Mobile Satellite Services in North America", Robert H. McCauley et al., American Institute of Aeronautics and Astronautics, Jan./Feb. 1994, pp. 1–9.

"Summary of the AMSC Mobile Telephone System", Gary A. Johanson et al., American Institute of Aeronautics and Astronautics, Inc., pp. 1–11.

"Implementation of a System to Provide Mobile Satellite Services in North America", Gary A. Johanson et al., presented at International Mobile Satellite Conference '93, Jun. 16–18, 1993.

"The American Mobile Satellite Corporation Space Segment", David J. Whalen et al., pp. 394–404.

"Mobile Earth Terminals in the AMSC Mobile Satellite Service System", Kok–Song Fone et al., American Institute of Aeronautic and Aeronautics, (1994), pp. 1–11.

"Radio Transmission in the American Mobile Satellite System", Charles Kittiver, American Institute of Aeronautics and Astronautics, Inc., pp. 280–294.

| PARAMETER | REQUIREMENT |
|---|---|
| L-BAND AEIRP | 56.6 dBW AT NOISE POWER RATIO OF 18 dB |
| Ku-BAND AEIRP | 36.7 dBw |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz<br>13,200 - 13,250 MHz (CENTRAL SATELLITE RECEIVE)<br>&<br>11,700 - 11,900 MHz (WING SATELLITE TRANSMIT)<br>14,00 - 14,200 MHz (WING SATELLITE RECEIVE) |

FIG. 2

EXAMPLE:
- AN ORGANIZATION
- THEY HAVE 3,300 METs AND 125 DIFFERENT COMMUNICATION NETS
- THEY HAVE 4 BASE FESs ACROSS CANADA
- A VIRTUAL NETWORK IS ASSIGNED TO THE ORGANIZATION

VIRTUAL NETWORK DATABASE
MET FILES
  MET 1 { DN, TN, ETC. }
  MET 2 { DN, TN, ETC. }
    TO
  MET 3300 { DN, TN, ETC. }
(DN = DIRECTORY NUMBER)
VN_ID FILES
  VN_ID 1 { #, ... ETC }
  VN_ID 2 { #, ... ETC }
    TO
  VN_ID 125 { #, ... ETC }

* TWO GATEWAYS FESs (PSTN & CTN) AND 100 BASE FESs (PN) INCLUDED NET RADIO
** 40 MT DELIVERABLES. ARCHITECTURE SUPPOSRTS . 2,000,000 MTs

PRIORITY AND PREEMPTION SERVICE SYSTEM FOR SATELLITE RELATED COMMUNICATION USING CENTRAL CONTROLLER

RELATED APPLICATIONS

This application is a continuation-in-part application of U.S. application Ser. No. 08/923,534, filed Sep. 4, 1997, which is a continuation-in-part application of PCT application serial number PCT US96/19120, filed Nov. 29, 1996, which claims priority to U.S. provisional application Ser. No. 60/007,748, filed Nov. 30, 1995, U.S. provisional application Ser. No. 60/007,742 filed on Nov. 30, 1995, and U.S. provisional application Ser. No. 60/007,749 filed on Nov. 30, 1995, all of which are incorporated herein by reference.

This application is related to, and incorporates by reference, the following U.S. patent applications: U.S. application Ser. No. 08/565,036, filed Nov. 30, 1995; U.S. patent application Ser. No. 08/700,943 filed on Aug. 21, 1996; U.S. patent application Ser. No. 08/728,227 filed on Oct. 10, 1996; U.S. patent application Ser. No. 08/654,198 filed on May 28, 1996.

BACKGROUND OF THE INVENTION

1. Technical Field

The present invention relates generally to a priority and pre-emption service system for satellite related communication, and more particularly, to a priority and pre-emption system for a mobile satellite communication system utilizing a central controller or network operations controller for coordination of same.

2. Background Art

An overview of the satellite network system is illustrated in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications Controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. When the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signalling and network management purposes between FESs and NCCs. The aggregate effective isotropic radiated power (AEIRP) is defined as that satellite e.i.r.p. that would result if the total available communications power of the communications subsystem was applied to the beam that covers that part of the service area. Some of the key performance parameters of the satellite are listed in FIG. 2.

The satellite network system interfaces to a number of entities which are required to access it for various purposes. FIG. 3 is a context diagram of the satellite network system illustrating these entities and their respective interfaces. Three major classes of entities are defined as user of communications services, external organizations requiring coordination, and network management system.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations described below:

Satellite Operations Center (SOC): The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

NOC: The satellite network system interfaces with the satellites located therein via the NOC for a variety of operational reasons including message delivery and coordination.

Independent NOCs: The satellite network system interfaces with outside organizations which lease resources on satellite network satellites and which are responsible for managing and allocating these resources in a manner suited to their own needs.

Other System NOCs: This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System: This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering: This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering: This entity engineers the subsystems, equipment and software which is needed to expand capacity to meet increases in traffic demands and to provide new features and services which become marketable to subscribers.

The satellite network system comprises a number of system elements and their interconnecting communications links as illustrated in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC. The NOC manages and controls the resources of the satellite network system and carries out the administrative functions associated with the management of the total satellite network system. The NOC communicates with the various internal and external entities via a local area network (LAN) /wide area network (WAN) based satellite network Internetwork and dial-up lines.

NCC. The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES. The FES supports communications links between METs, the PSTN, private networks, and other MTs. Once a channel is established with an MET, call completion and service feature management is accomplished via In-Band signaling over the communication channel. Two types of FESs have been defined for the satellite network system; Gateway FESs and Base FESs. Gateway FESs provide MTS, MRS, MTCRS and NR services. Base FESs are for like services and/or value added services.

MET. The MET provides the mobile user access to the communications channels and services provided by the satellite network system. A range of terminal types has been defined for the satellite network system.

RMS. The RMS monitors L-band RF spectrum and transmission performance in specific L-band beams. An RMS is nominally located in each L-band beam. Each RMS interfaces with the NOC via either a satellite or terrestrial link.

STS. The STS provides an L-band network access capability to support FES commissioning tests and network service diagnostic tests. The STS is collocated with, and interfaced to, the NOC.

Communications channels transport voice, data and facsimile transmissions between METs and FESs via the satellite. Connectivity for MET-to-MET calls is accomplished by double hopping the communications channels via equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, DC (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic block diagram of the NOC and its interface. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration showing constituent equipment includes: processing equipment, communications equipment, mass storage equipment, man-machine interface equipment, and optional secure MET Access Security Key (ASK) storage equipment. The Processing Equipment consists of one or more digital processors that provide overall NCC control, NCS call processing, network access processing and internetwork communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MET ASK storage Equipment provides a physically secure facility for protecting and distributing MET Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS (R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS services (described in detail below). Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm reporting, call detail record recording, and provision of operator interfaces.

For operational convenience, an FES may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

It has been discovered that there is a general need for an integrated mobile telephone that can be used to transmit to, and receive from, to communicate in a virtual network arrangement that allows each member of the group to hear what any other user is saying. Each member of the group can also talk when needed. The system behaves like a radio multi-party line where several parties communicate over the same communication channel. Public services and law enforcement agencies are typical users of this service, which is normally provided by either traditional terrestrial radio networks or by the more recent trunked radio systems. These trunked systems, generally in the 800–900 MHz band, provide groups of end users with virtual network systems by assigning frequencies on a demand basis. In this connection, however, it has been discovered that an integrated mobile communication device is needed that provides this ability to communicate in a virtual network of a satellite communications system.

It has also been discovered the need for a nationwide and regional point-to-multipoint mobile communication service that is not limited in coverage.

SUMMARY OF THE INVENTION

It is a feature and advantage of the present invention to provide an integrated mobile telephone that can be used to transmit and receive in a virtual network arrangement that allows each member of the group to hear what any other user is saying.

It is another feature and advantage of the present invention to permit each member of the group to talk when needed, and to provide a system that behaves like a radio multi-party line.

It is a further feature and advantage of the present invention to provide an integrated mobile communication device that can communicate in a virtual network of a satellite network.

It is another feature and advantage of the present invention to provide an inexpensive virtual network satellite service to the owner of the group.

It is another feature and advantage of the present invention to minimize the call set-up time for one shared circuit per virtual network.

It is another feature and advantage of the present invention to generally effectively and efficiently effectuate transmissions between mobile communication devices and the satellite network in a virtual network environment by utilizing an efficient communication protocol.

It is another feature and advantage of the invention to provide a nationwide and regional point-to-multipoint mobile communication service that is not limited in coverage.

The present invention is based, in part, on the desirability of providing point-to-multipoint circuit switched connections between mobile terminal subscriber stations and a central base station in a virtual network. Mobile users are able to listen to two-way conversations and to transmit.

To achieve these and other features and advantages of the present invention, a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The antenna system includes an antenna including one of a directional and an omnidirectional configuration, a diplexer, an amplifier, a low noise amplifier, a beam steering unit when the antenna is of the directional configuration, and at least one of a compass and sensor to determine vehicle orientation. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The transmitter includes an amplifier, a first converter and associated first frequency synthesizer, a modulator, an encoder, multiplexer, scrambler and frame formatter for at least one of voice, fax, and data. The receiver accepts the first satellite message from the antenna system and converts the first satellite message into at least one of voice, data, fax and signaling signals, at least one of the voice, data and fax signals routed to the user interface system. The receiver includes a second converter with an associated second frequency synthesizer, a demodulator, a decoder, demultiplexer, descrambler and frame unformatter for at least one of voice, fax, and data. The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

In one embodiment of the invention, a system for providing satellite communication between multiple users in a virtual network arrangement includes first and second mobile earth terminals (METs) responsively connected to and registering with the mobile satellite system. The first MET selects a virtual network identifier (VN ID) representing a virtual network group including the first and second METs to establish voice communication therewith and transmits the VN ID to a central controller. The central controller receives the VN ID from the first MET, allocates a frequency for the virtual network group, and broadcasts the message to the virtual network group including the second MET informing the virtual network group of the allocated frequency and the voice communication associated therewith. The second MET tunes to the frequency in response to the message broadcast by the central controller.

In another embodiment of the invention, a method of providing satellite communication between multiple users in a virtual network arrangement includes the steps of first and second mobile earth terminals (METs) registering with the mobile satellite system, the first MET selecting a virtual network identifier (VN ID) representing a virtual network group including the first and second METs to establish voice communication therewith. The method also includes the steps of the first MET transmitting the VN ID to the central controller, the central controller receiving the VN ID, allocating a frequency for the virtual network group, and broadcasting the message to the virtual network group including the second MET informing the virtual network group of the allocated frequency and the voice communication associated therewith. The method also includes the steps of the second MET tuning to the frequency in response to the message broadcast by the central controller.

In another embodiment of the invention, the method also includes the steps of a third MET included in the virtual network group registering with the mobile satellite system, and the central controller broadcasting the message to the virtual network group including the third MET informing the virtual network group of the allocated frequency and the voice communication associated therewith. The method also includes the steps of the third MET tuning to the frequency in response to the message broadcast by the central controller.

According to the invention, the central controller advantageously controls the virtual network satellite communication including virtual network parameters used by the first and second METs.

The central controller advantageously collects billing information regarding the virtual network satellite communication and transmits the billing information to the mobile satellite system. The mobile satellite system optionally charges a service fee to a customer that has requested the virtual network arrangement instead of each of the individual users in the virtual network group thereby consolidating the billing transactions and permitting a single customer to monitor communication charges.

In another embodiment of the invention, the method includes the steps of the first MET selecting the virtual network identifier (VN ID) representing a virtual network group including the first MET and a non-MET serviced by one of a public switched telephone network and a cellular network to establish voice communication therewith, and the first MET transmitting the VN ID to the central controller. Additionally, the method includes the central controller receiving the VN ID, determining that the virtual network group includes the non-MET, and broadcasting a non-MET message to either the public switched telephone network or the cellular network including the voice communication associated therewith, and either the public switched telephone network or the cellular network receiving the non-MET message from the central controller and transmitting the non-MET message to the non-MET to establish the virtual network arrangement between the MET and the non-MET.

In another embodiment of the invention, the NOC manages and controls the resources of the satellite network system and carries out the administrative functions associated with the management of the total satellite network system. The NOC communicates with the various internal and external entities via a local area network (LAN)/wide area network (WAN) based satellite network Internetwork and dial-up lines.

The NOC's network management functions include measuring the usage of resources by customers to enable predictions of what changes to make in the future deployment of resources. Such resources may be network elements and CPUs in the system. Data such as usage records are collected and analysis of capacity planning is performed based on present characteristics. Security functions are provided wherein the network is protected against unauthorized use. Security mechanisms built in to the network management include enhanced fraud security coding encryption and user passwords. Configuration management, i.e., how resources are allocated, is another function of the NOC. Fault detection and management are provided for by the NOC. Problems are isolated and reported to operations personnel who can react to the problems.

In another embodiment of the invention, a method of performing a call setup procedure in a mobile satellite system from a call initiated by a mobile communication system (MCS) to a destination served by a public switched telephone network, includes the steps of initiating the call by the MCS, the MCS formatting and transmitting an access request message via a random access channel, and receiving by the central controller the access request message, and transmitting frequency assignments to the MCS and to the SCSO. The method also includes receiving by the MCS the frequency assignment, transmitting a scrambling vector message to the SCSO, and verifying by the SCSO the identity of the MET responsive to the scrambling vector. Upon successful verification, the method includes the steps of switching by the SCSO and the MCS from call setup mode to voice mode, transmitting by the SCSO voices frames to the MCS including a voice activation disable signal to disable a voice activation timer in the MCS for at least 3 super frames, and transmitting a destination number to the PSTN. The method also includes the steps of transmitting by the SCSO an enable signal to the MCS to re-enable the call activation timer in the MCS, and establishing voice communication between the PSTN and the MCS.

In another embodiment of the invention, a method of performing a call setup procedure in a mobile satellite system from a call initiated by a destination served by a public switched telephone network (PSTN) to a mobile communication system (MCS). The method includes the steps of receiving by the SCSO a call from the destination served by the PSTN, transmitting by the SCSO to the central controller a channel request using interstation signaling, determining by the central controller an identity of the MCS responsive to the destination number, and transmitting a call announcement via a random access channel. The method also includes the steps of acknowledging by the MCS the call announcement via the random access channel to the central controller, transmitting frequency assignments to the MCS via the random access channel and to the SCSO via an interstation signaling channel, and transmitting an access security check field used to verify the MCS's identity. The method also includes the steps of receiving by the MCS the frequency assignment, and transmitting a scrambling vector message to the SCSO, verifying by the SCSO the identity of the MET responsive to the scrambling vector, and upon successful verification, transmitting by the SCSO a ring command to the MCS. The method also includes the steps of receiving by the MCS of the ring command, generating a ringing signal to a MET user, and transmitting a ring command acknowledgement to the SCSO. The method also includes the steps of receiving by the SCSO the ring command acknowledgement from the MCS, and once the call setup is complete, transmitting by the MCS voice frames to the SCSO including a voice activation disable signal to disable a voice activation timer in the MCS for at least 3 super frames. The method further includes the steps of upon detection of the MCS switching to a voice frame mode, switching by the SCSO to the voice mode, and transmitting a voice activation enable signal to the MCS to re-enable the call activation timer in the MCS, and establishing voice communication between the PSTN and the MCS.

The present invention also solves the following objectives:

To determine how a system designed to the standards will deal with internal failures that might jeopardize satisfactory operation.

To determine the criteria and methods used to prevent failures.

To determine how an AMS(R)S system might accommodate traffic fluctuations while meeting performance specifications.

To help in establishing the probability of, and performance criteria for, external resource provisioning to AMS(R)S from non-AMS(R)S systems.

To aid in determining the susceptibility of AMS(R)S to interference and how it recovers when it does happen.

To aid in establishing specifications for non-AMS(R)S systems that will ensure that a suitable preemptive capability for AMS(R)S is established and minimize the likelihood of interference.

In accordance with this embodiment of the invention, a priority and preemption method/system performs a priority and preemption process, and includes the steps of satisfying a resource acquisition request from a reserve pool for an external system, and when the resource acquisition request cannot be satisfied from the reserve pool, requesting additional unused frequencies, and when the additional unused frequencies are not available, requesting to preempt active calls. The method also includes the step of replenishing the power and the frequencies received from the frequency controller, the data hub and/or the independent operations controller when the frequencies are no longer needed by the priority and preemption system.

These, together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

BEST MODE FOR CARRYING OUT THE INVENTION

Figure 1:
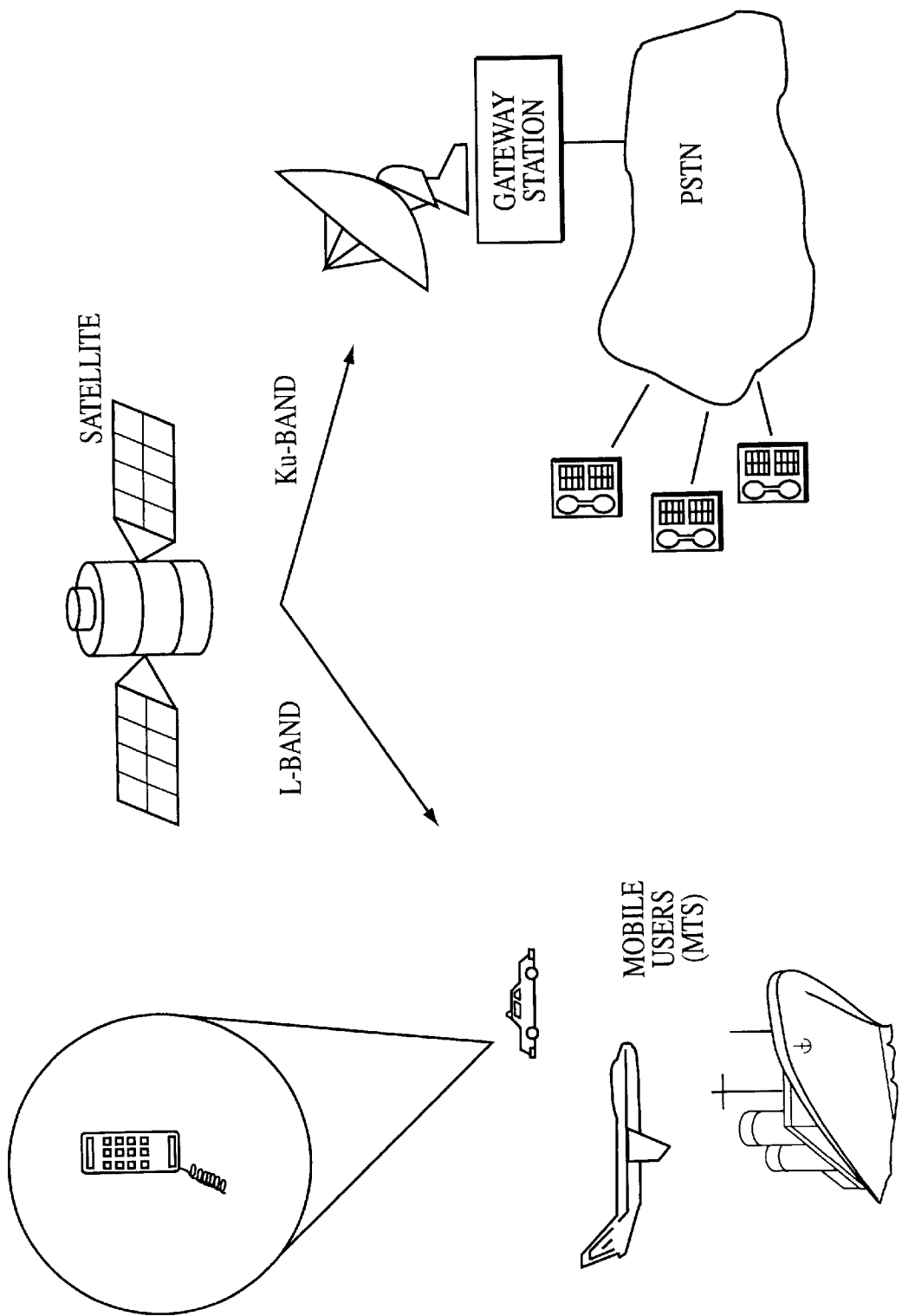
FIG. 1 is a diagram illustrating an overview of the satellite network system.
Figure 3:
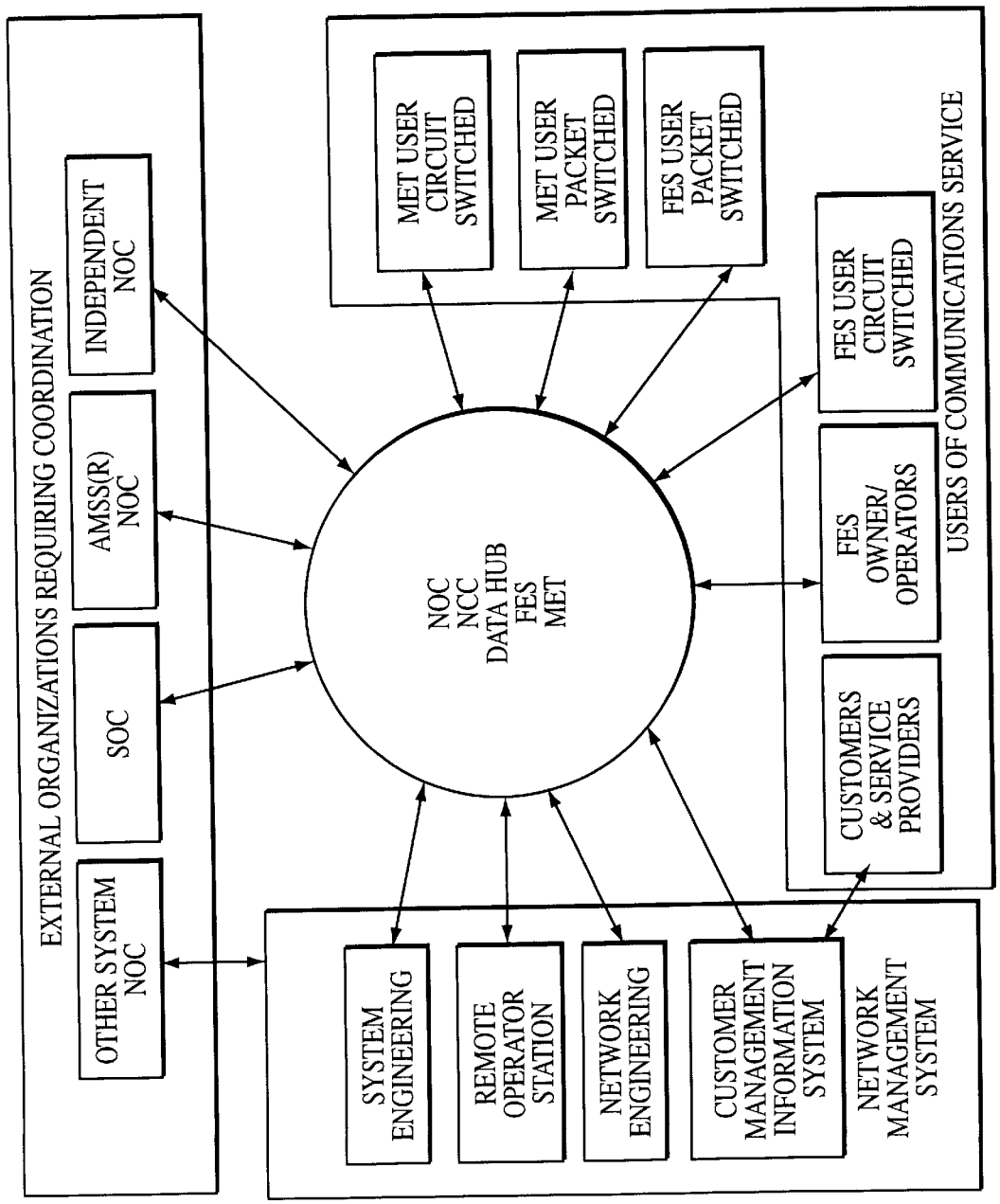
FIG. 3 is a diagram of the satellite network system illustrating components and respective interfaces.
Figure 4:
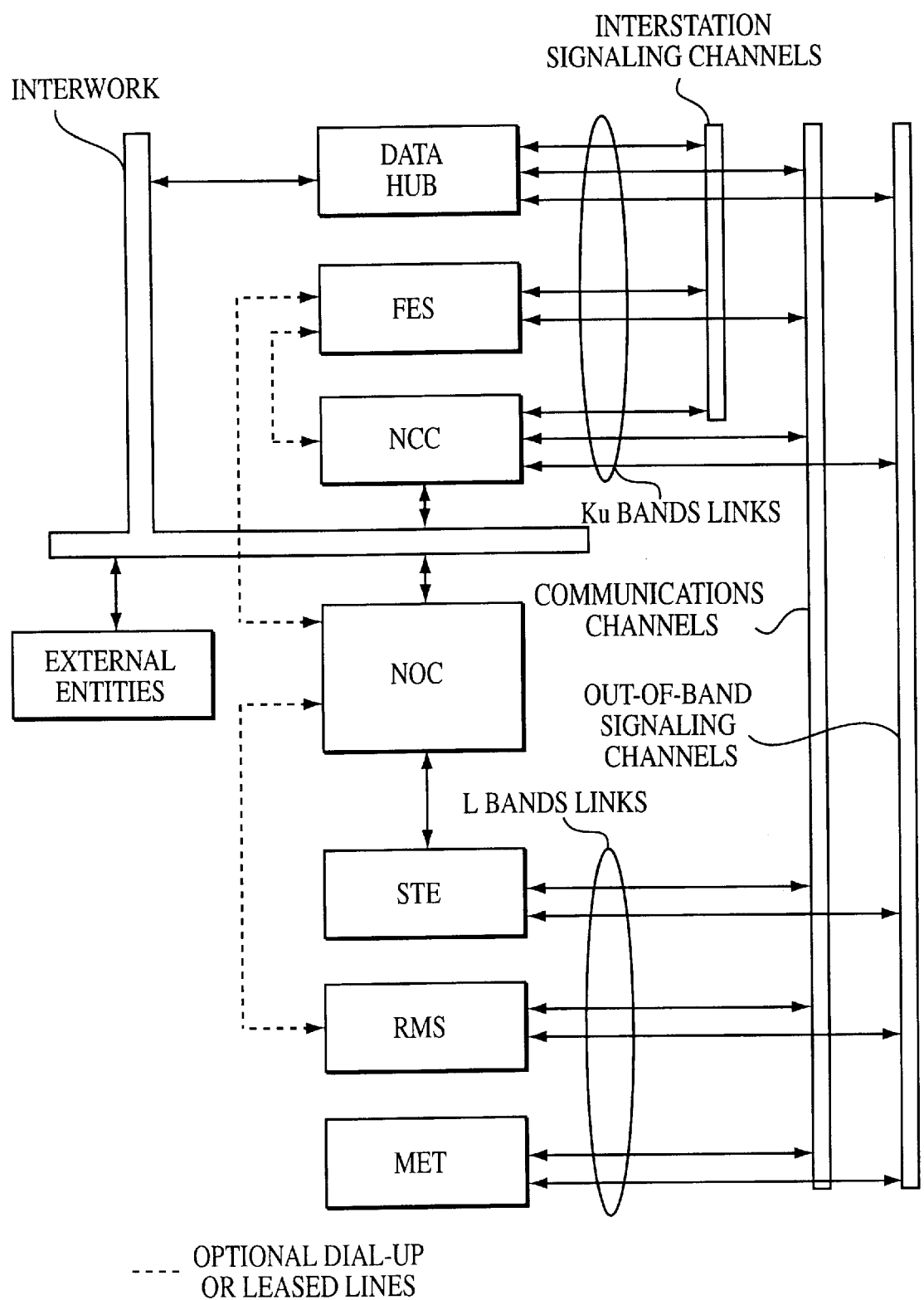
FIG. 4 is a diagram of a satellite network system illustrating a number of system elements and their interconnecting communications links.
Figure 5:
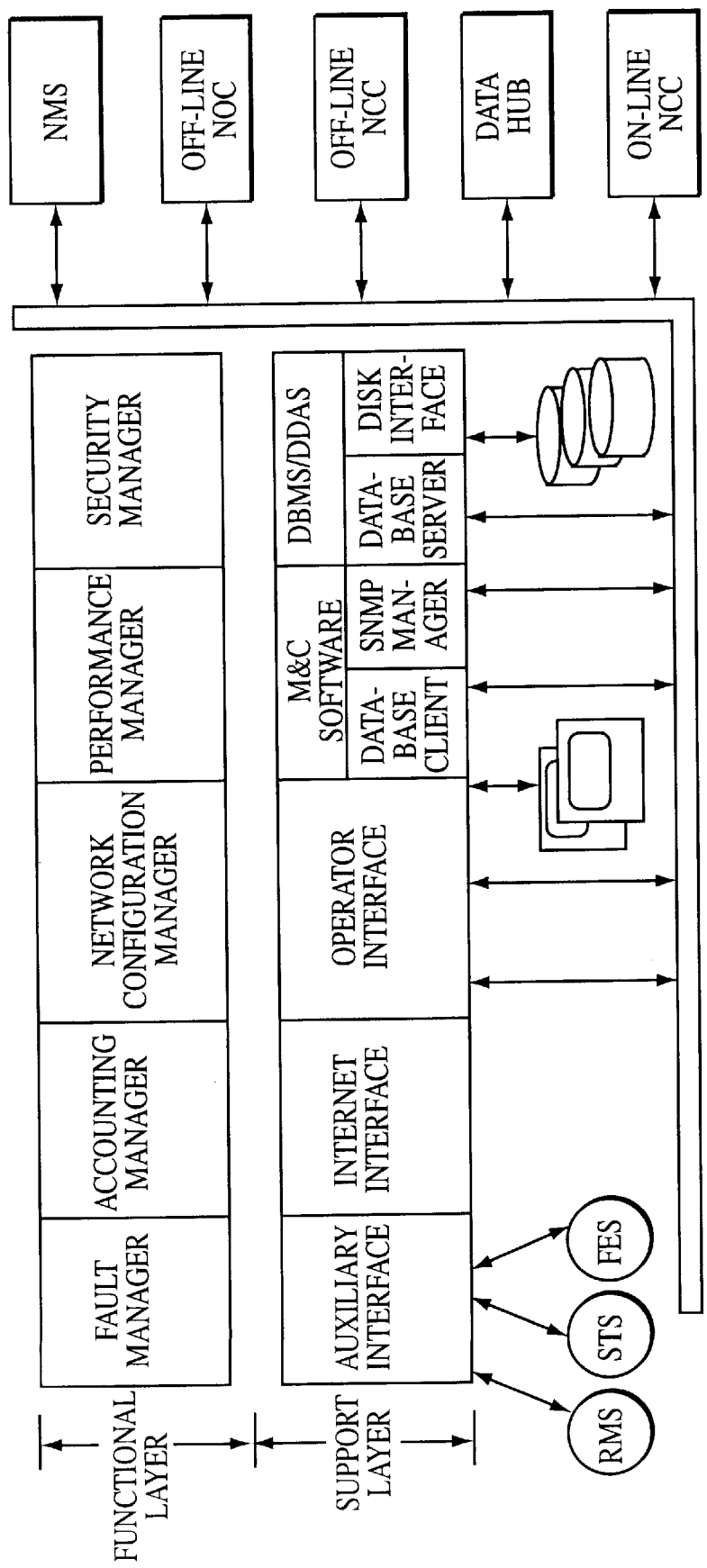
FIG. 5 is a basic block diagram of the NOC and its interfaces.

Digital speech compression means that each satellite can serve a much larger number of customers, substantially reducing the cost of the space segment. Unfortunately compression introduces 80 to 100 milliseconds of additional delay, rendering GEO systems almost unusable due to overtalking.

Omnidirectional antennas are also essential for personal telephones because the mobile users move. Accordingly, the GEO satellite loses its motionless advantage, and the satellites might just as well move also. Improved battery technology for higher power density meant lower mass. Satellites are able to transmit over obstacles from above the user.

There are generally three classes of service that can be identified:

1. Data Transmission And Messaging From Very Small, Inexpensive Satellites. Sometimes these are called the Little low earth orbits (LEO's). These systems are the space equivalent of paging systems. Examples include Orbcomm, Starsys, and VITA. The GEO predecessor was GEOSTAR, which continues to operate using small packages on Spacenet 3 and GSTAR. Orbcomm has already launched experimental satellites. The messaging data rates range from 100 to 4800 bits per second (bps).

2. Voice And Data Communications From the Big LEO's. They include Iridium, Globalstar, Odyssey, and Inmarsat P. Motorola expects to launch experimental satellites next year. All of these systems claim that they will be in service by the year 2000.

3. Wideband Data Transmission. This is the extension of the Global Information Initiative (GII) Systems proposed include Teledesic, Spaceway, and CyberStar. Several other counties and companies are working on systems of this type. These systems will offer computer to computer links and video conferencing. Higher data rates (160×9.6 kbps) 1.544 Mbps (T-1 carrier or higher).

Frequency spectrum was originally st aside for Maritime Mobile Satellite Service (MSS). The original set of bands was established with Inmarsat service in mind. These bands are in the region of 1.6 and 1.5 GHz. More recently, additional bands have been designated for Aeronautical MSS and Land MSS. These bands are also used for domestic service in the U.S., Canada, Mexico, Australia, and Japan.

The spectrum that was allocated for Radio Determination Satellite Service at WARC-88 was made coprimary with MSS at WARC-92. The U.S. FCC has allocated the top 5 MHz of the 1.6 GHz band for TDMA and the lower 11.5 MHZ for CDMA. The lower part of the 1.6 GHz band has also been used by Russian Glonass Navigation system and the Radio Astronomy service won a primary allocation for the lower part as well.

Inmarsat P has campaigned for additional service link spectrum in the new Personal Communication Service band which is also called the Future Personal Land Mobile Telephone Service (FPLMTS). Many of the developing countries and some developed countries use the 2.0/2.2 GHz bands for terrestrial services including troposcatter and microwave links.

In addition to the question of moving service link displacement dates, special provision must be made for feeder links. This could be a more important issue than the provision of communications services, since a wider bandwidth is required for the backhaul to the Land Earth Stations. Generally, wider bandwidths are available at higher frequencies. Currently, there is major competition for spectrum all the way up to 20/30 GHz (Ka bands).

Some of the satellite companies would like to operate in lower bands because the lower bands are less susceptible to rain attenuation and weather conditions. These bands are currently used by a number of critical services, including the Aeronautical Services. The International Civil Aviation Organization (ICAO) and the FAA use the C-band spectrum near 5 GHz for both communications and wind shear radar. Several of the Big LEO's, including Globalstar and Inmarsat P also want to use these bands.

Some of the systems would employ the use of reverse band transmissions for feeder links. This technique involves paired bands by which the Earth to space transmissions are used in the space to Earth direction and vice versa. GEO satellites are located in orbits farthest from the Earth. Time delay is 250 msec or more plus processing delays.

Most of the non-geostationary satellites are located in LEO orbits, between the Earth's atmosphere and the inner Van Allen Belt. The inner belt contains trapped particles which have been ejected from the sun. The particles in the inner belt are high intensity, high energy electrons which are dangerous to electronic components. Collisions with satellites produce X-rays and additional energetic electrons. Shielding within the belt is not practical and satellites in this region would survive only for a few months.

Medium earth orbit (MEO) satellites take advantage of gap between the inner and outer Van Allen belts and orbit satellites in inclined orbits. This region enables service without encountering the extremely dangerous radiation levels within the Van Allen belts. Although the radiation level is about twice as intense as that for CEO, the MEO satellite can be protected by selective shielding and use of hardened electronic components.

American Mobile Satellite Corporation (AMSC)

The race to provide lower cost, space based mobile communications started with the U.S. domestic proposals to the FCC by Skylink and MOBILSAT which merged with other proponents into the consortium which is called American Mobile Satellite Corp. (AMSC). This CEO system is designed to service vehicles with transportable terminals. The satellite antennas are 5 to 6 meters in diameter. Each satellite can provide 1900 circuits.

The system is designed to provide domestic service to the U.S. and Canada. MSAT uses the existing spectrum which is shared with Inmarsat. Other countries are also using this spectrum for domestic services. The constellation includes two CEO satellites, one for AMSC and one for Telsat Mobile Inc. of Canada which is also developing a comparable service. The satellite inclination is approximately 0°, having an altitude of approximately 35,000 km. Two ground stations or control stations are provided. The access method to the system is frequency division multiple access (FDMA). The communication spectrum is approximately 1.6/1.5 GHz, the feeder links are 13/11 GHz, and special features include service to land mobile vehicles.

Several other systems are designed around the goal to provide a desirable, cost effective service from GEO, as well. These include the Asi-African Satellite Corp. (ASC) and the ASEAN Cellular System called ACeS. China and Singapore Telecom are proceeding with development of a GEO system called Asia Pacific Mobile Telephone (APMT).

These GEO systems are planned to provide service to hand held terminals and will require very large satellite antennas, which could be 20 meters in diameter or larger. Each satellite would be required to provide hundreds of transponders. Separate antennas would be desirable for the satellite mobile link receive and transmit functions, but this may be impractical given such large aperture antennas. If a single, large antenna is used there will be the risk of passive intermodulation products.

Orbcomm

Orbcomm is one of the major players among the little LEO's and has launched two satellites. This system is planned to provide real time messaging at data rates of 2400 bps from user to satellite and up to 4800 bps back to the user. The satellites are designed to relay messages throughout the world by means of on board processing.

The sponsors of the Orbcomm program include OSC/Teleglobe. The satellite constellation includes two satellites in four orbit planes. The satellite inclination is 70° (2) 45° (24). The LEO altitude is approximately 750 km, and includes approximately four ground stations located in the United States. The communication access method is TDMA with a communication spectrum of approximately 137.5/150.0 MHz, and feeder link spectrum of 137.5/150.0 MHz.

Iridium

Iridium was one of the earliest systems to consider voice communications from non-geostationary orbits. Much of the exploration and optimization of space based mobile communications services has taken Iridium into consideration. Iridium is designed to provide global communications by means of state of the art electronics. The architecture reflects the need to network LEO communications in space.

Because the satellites operate from relatively low altitude (460 statute miles), each satellite can only observe about 2% of the Earth's surface at a given time. Consequently 66 satellites are needed to provide the service. The satellites therefore are frequently out of contact with land facilities which could carry transmissions into the terrestrial wireline infrastructure. Iridium attempts to overcome this obstacle by passing communications between satellites until a land Earth station can make the terrestrial connection. This architecture provides a space network which links the entire Iridium system to the Public Switched Telephone Networks (PSTNs).

Each satellite projects 48 beams to the Earth, and the satellites provide very high link margins. The system is designed so that one satellite beam always provides service to a given spot on the Earth. Several satellites are available to provide service in more northerly locations, but only one satellite is used. Because the satellites orbit at the low altitude, the elevation angles can be as low as 10 degrees, and the average elevation angle is about 28 degrees. These motion of 15 degrees and 35 degrees per minute.

The main sponsor of the Iridium project is Motorola. The satellite constellation includes 66 satellites in six orbit planes. The satellite inclination is approximately 90°, and the LEO altitude is approximately 740 km. Approximately twenty ground stations are used to control and/or administer the Iridium project. The communication access method is TDMA, and the communication spectrum is approximately 1616 to 1626.5 MHz with feeder links of approximately 20/30 GHz. Special features of Iridium include time division duplex transmission, and cross-links for global networking.

Globalstar

Globalstar's Low Earth Orbit (LEO) satellite system does not use satellite cross links, but uses CDMA communication protocol, and does not process signals on board. The Globalstar satellite system is similar to Iridium. The satellites operate at a higher altitude (about 830 statute miles), and can observe as much as 5% of the surface of the Earth at a time. Consequently, service can be provided by using a somewhat smaller number of satellites (i.e., approximately 48). Each satellite is simpler than the Iridium satellites, since Globalstar does not use satellite cross links. The system uses CDMA, but the satellites do not process the signals on board. This "bent pipe" transponder approach keeps complexity low. Each satellite projects 16 beams to the Earth.

Globalstar employs spatial diversity by transmitting signals through two satellites. The Qualcomm "stereo transmission" technique reduces the amount of power required for transmission. Each handset communicates through two satellites. The two CDMA signals are combined in each handset using standard Rake receivers (which add the two CDMA signals constructively). This technique provides the most robust service when two satellites are available. The double path provides a "soft" handover from beam to beam and satellite to satellite as the constellation of satellites moves overhead.

The proponents of the Globalstar satellite system include Loral and Qualcomm. The satellite constellation includes 48 satellites in 6 orbit planes. The inclination for the satellite is approximately 47°, with a LEO altitude of approximately 1390 km. The number of ground stations are approximately 90 to 200. The communication access method for Globalstar is CDMA, with a communication spectrum of approximately 1.6/2.5 GHz, and feeder links of approximately 5/7 GHz. Special features of the Globalstar satellite system include diversity service using "stereo" transmission.

Odyssey

Odyssey's Medium Earth Orbit (MEO) satellite system uses satellites operating inside the Van Allen Belts. Odyssey employs orbiting satellites in Medium Earth Orbit or Intermediate Circular Orbits (ICO) for mobile satellite service. The Odyssey designers recognized that a cost effective system which would not cause time delay could use a relatively small number of satellites. Furthermore, a small constellation of satellites would require a smaller number of ground antennas and less complex operations. However, this meant that the satellites would operate inside the Van Allen Belts.

These considerations led to the selection of the MEO, which can furnish initial service with only six satellites, and full global coverage with only nine satellites. With twelve satellites, at least two satellites are visible from any point in the world. The system is baselined with twelve satellites so that the satellite constellation would have built in redundancy. This configuration provides the foundation of diversity service. Satellites have an apparent motion of 1° per minute.

Odyssey provides the highest elevation angles of all the mobile satellite systems proposed for voice service. Since two or more satellites are available for service anywhere in the world, service can be routed through whichever satellite provides the better transmission. This type of diversity service provides very high availability for the user. The system is also designed with directed coverage to concentrate capacity into the regions where demand is the greatest. Less demand is expected in ocean regions, consequently the system provides only single satellite service at sea.

The proponents of the Odyssey system include TRW and Teleglobe. The satellite constellation includes twelve satellites in three orbit planes. The satellite inclination is approximately 50°, with the MEO altitude of approximately 10,350 km. The ground stations used in the Odyssey system are approximately eight. The communication access method is CDMA, with a communication spectrum of approximately 1.6/2.5 GHz, and feeder links operating at approximately 20/30 GHz. Special features of the Odyssey satellite system include directed coverage, and diversity service, generally from either of two satellites.

Inmarsat P (or I-CO Global)

Inmarsat P's Medium Earth Orbit (MEO) satellite system uses satellites operating inside the Van Allen Belts using the TDMA communication method. The Inmarsat Affiliate system is very similar to the Odyssey constellation and ground infrastructure. I-CO has adopted the same altitude, nearly the same inclination, multibeam antennas, and service features, as the Inmarsat P system. Both systems orbit twelve satellites, but I-CO only operates ten satellites, and has two nonoperating spares in orbit.

Inmarsat has elected to use TDMA access, the 2.0/2.2 GHz frequencies (which require a larger number—163 smaller beams). Ample capacity is available in ocean areas. Inmarsat P is funded by many of the same signatories that have operated the treaty based Inmarsat monopoly for the part 16 years. The satellite constellation includes at least ten satellites in two orbit planes, with a satellite inclination of approximately 45° at an altitude of approximately 10,350 km. The Inmarsat satellite system includes approximately eight to twelve ground stations with feeder links operating at approximately 5/15 GHz. Special features of the Inmarsat system include diversity service or redundant satellite coverage area.

Teledesic

Teledesic's Low Earth Orbit (LEO) satellite system uses satellites operating under or providing wideband data communication using TDMA communication method. Teledesic is considered to be the most ambitious service. This system would provide wideband data from LEO. The Teledesic constellation requires the largest number of satellites proposed to date. The system as proposed would provide high data rate digital communications. The constellation of 840 satellites provides service at elevation angles that always exceed 40°.

The system is planned for operation of the communication spectrum at approximately 20/30 GHz. Transmission data rates of 1.2 Mbps (E-1) to 2 Gbps are under consideration for this system. The satellite inclination is approximately 98.2° with an altitude of approximately 700 km. Approximately sixteen ground stations are used, with feeder links at approximately 20/30 GHz. Special features of the Teledesic system include a minimum satellite elevation angle 40°.

Spaceway and Cyberstar

A Geostationary Earth Orbit (GEO) satellite system for Spaceway and Cyberstar, includes satellites using TDMA communication method. The Spaceway system has been proposed by Hughes Communications and has the same objectives as Teledesic. This system operates from GEO, and may encounter some time delay limitations in the case of interactive communications, such as video conferencing. Transmission data rates of 1.544 Mbps (T-1) are under consideration for this system.

Recently Loral filed for a similar system called CyberStar. Both applications have been accepted for processing by the FCC. The satellite constellation includes eight satellites in one orbit plane, with an inclination angle of 0°, and altitude of 35,000 km. The Spaceway and Cyberstar systems include two ground stations, utilizing the TDMA access method. The communication spectrum is approximately 20/30 GHz, with feeder links operating under approximately 20/30 GHz. Special features of the Spaceway and Cyberstar systems include the use of two GHz of bandwidth at Ka-band.

The above description of the various satellite systems is described in more detail in "The Market and Proposed Systems for Satellite Communications," by Roger Rusch, in Applied Microwave & Wireless, pp. 10–34 (Fall 1995), published by Noble Publishing, Tucker, Ga. 30084, the details of which are incorporated herein by reference.

The present invention provides point-to-multipoint circuit switched connections between mobile terminal subscriber stations and a central base station. Mobile users are able to listen to two-way conversations and to transmit.

Figure 6:
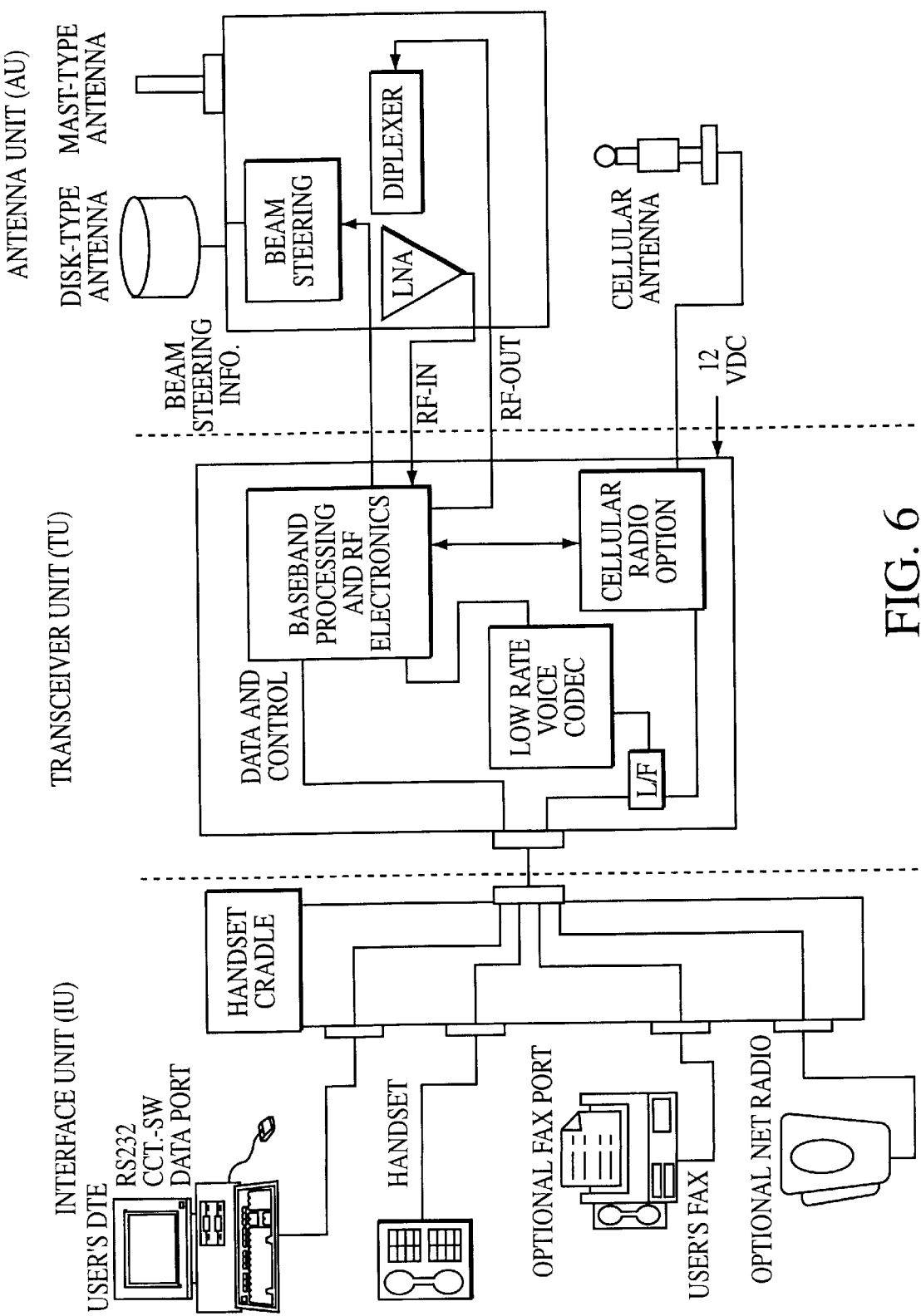
FIG. 6 is a basic block diagram of the physical architecture of the mobile earth terminal.
Figure 7:
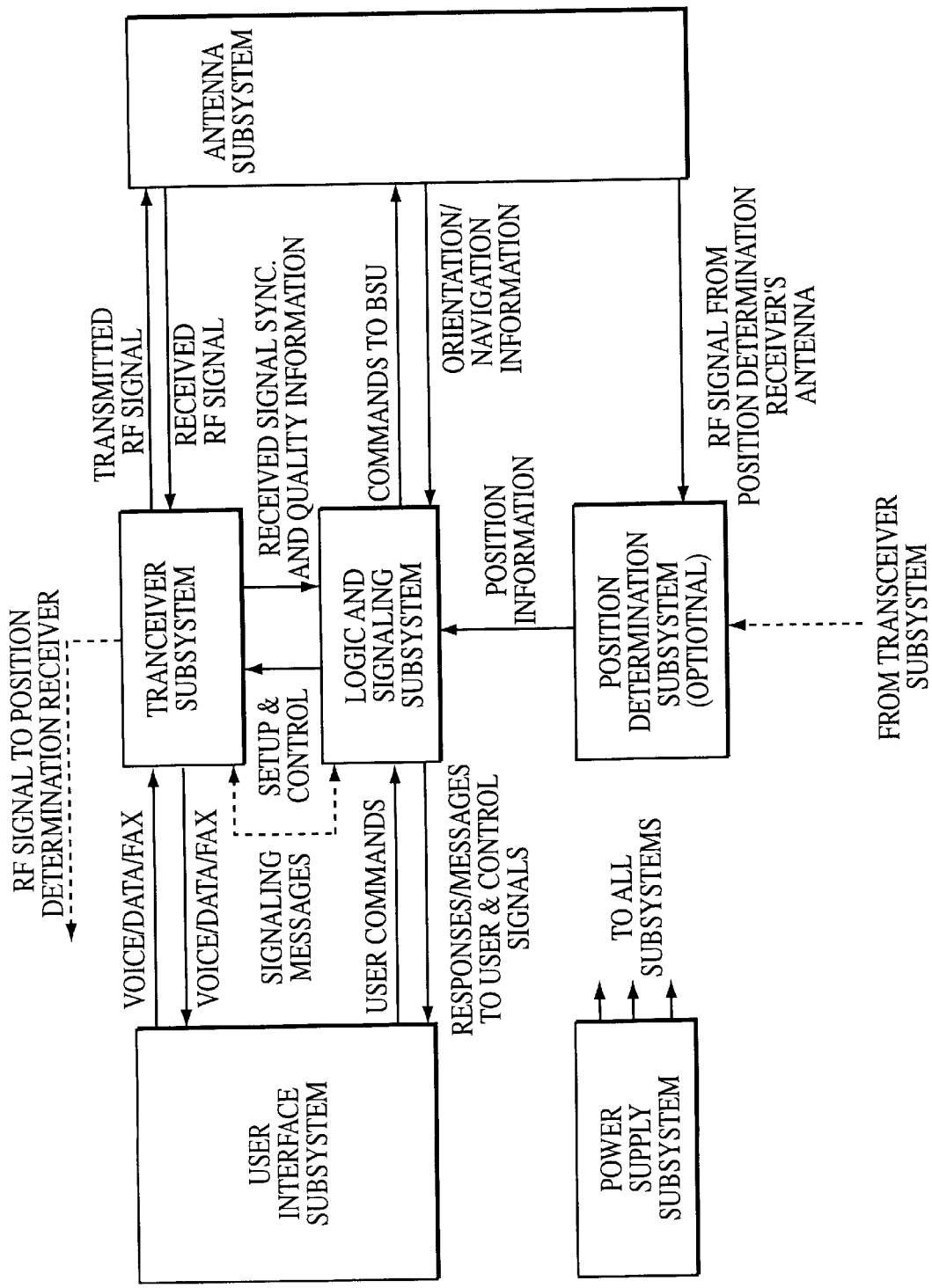
FIG. 7 is a basic block diagram of the functions of the mobile earth terminal.

The MET includes all of the communication and control functions necessary to support communications from a vehicle or fixed remote site using the resources of the satellite network system. FIGS. 6 and 7 are basic block diagrams of the physical architecture and functions of the mobile earth terminal. The basic functional diagram of FIG. 7 is implemented by baseband processing and RF electronics of FIG. 6. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA) and output signals for transmission using the diplexer of the antenna unit. Baseband processing and RF electronics also outputs signals for use with beam steering antennas as will be discussed blow. Advantageously, the mobile earth terminal is functional with antennas that are either steerable or nonsteerable.

The functional subsystems comprising the MET are shown in FIG. 7 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller.

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundance Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any) in the antenna subsystem, and monitors and tests all the other subsystems. In case of fault detection, it informs the user about the failure and take the appropriate measures needed to prevent harmful interference to the satellite network or other systems.

The power supply subsystem provides power to all other subsystems. The external voltage source to which this subsystem interfaces depends on the type of vehicle on which the MET is mounted (e.g. 12/24 Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

The MSS signaling system provides the communications capability between network elements required to set up and release communications circuits, provide additional enhanced services, and support certain network management functions. The network elements discussed above include group controllers (GCs), feederlink earth stations (FESs), and mobile earth terminals (METs). The seven different channel types are:

| | |
|---|---|
| GC-S | Outbound TDM signaling channel from the GC to the METs. |
| MET-ST | Inbound TDMA signaling channel from the MET to the GC. |
| MET-SR | Inbound random access signaling channel from the MET to the GC. |
| FES-C | Outbound communications and inband signaling channel from a FES to a MET. |
| MET-C | Inbound communications and inband signaling channel from a MET to a FES. |
| GC-I | Interstation signaling channel from the GC to an FES. |
| FES-I | Interstation signaling channel from an FES to the GC. |

The basic element of communication for signaling and control for the MSS signaling system is the Signaling Unit (SU). The SU consists of 96 bits organized in 12 octets of 8 bits each. The first 80 bits comprise the message, and the last 16 a parity check, computed using the CCITT CRC-16 algorithm. For transmission, the SU is convolutionally encoded at either rate ¾ or ½, adding an additional 32 or 96 bits respectively.

The various fields are as follows:

Message type: A 7 bit code which identifies the meaning of the SU; in this case a request for access to the MSS system for call placement.

MET-GC Signaling Protocol (MGSP) Header: A 8 bit field comprised of several sub-fields giving particular information related to the protocol: message type (command, response, message), message reference identification, and the number of times the message has been retransmitted.

RTIN: Reverse Terminal Identification Number—the MET's Electronic Serial Number, by which it identifies itself in transmissions on the MET-SR channel.

Digits 1–10: The first 10 digits of the addressed telephone number in the PSTN or private network, in hexadecimal. If the 10th digit is set to "C", an address of greater than 10 digits is indicated.

CRC: The 16-bit error detection code (Cyclic Redundancy Code).

The frame formats used in the GC-S, MET-SR and MET-ST channels are closely related, and are based on a common 360 millisecond superframe established on the GC-S channel. All timing relationships in the MSS system signaling scheme are determined from the GC-S frame structure. The GC-S is operated in the QPSK mode at an aggregate rate of 6750 b/s. The stream is divided into superframes of 360 ms, comprising three 120 ms frames. Each frame is in turn comprised of a 24-bit unique word (UW), six SUs, eight flush bits and 10 unused bits, for a total of 810 bits and 120 ms. The first frame of a superframe is identified by inversion of the UW.

Mobile terminals throughout the area covered by any beam receive GC-S channels with a total uncertainty of approximately 32 ms, primarily due to their geographical locations. The received superframe boundary establishes the four 90 ms "slots" in the MET-SR random access channels, which operate in the BPSK mode at 3375 b/s. The actual random access burst is comprised of a 24-bit preamble, a 32-bit UW, a 128-bit SU (96 bits rate ¾ coded), and eight flush bits, for a total of 192 bits in 56.9 ms. This allows a 33.1 ms guard time between bursts. Mobile Terminals select a MET-SR channel and slot at random from among the permitted choices.

The MET-ST TDMA channels, which also operate in the BPSK mode at 3375 b/s, are comprised of bursts which are equal in length to the GC-S frame, and which are also timed on the received frame boundary. The TDMA burst is made up of a 24-bit preamble, a 32-bit UW, a 192-bit SU (96 bits rate ½ coded), and eight flush bits. The total length of the TDMA burst is 256 bits in 75.9 ms, which allows a guard time of 44.1 ms. Mobile Terminals always respond to commands received on the GC-S on a MET-ST channel which corresponds in number to the position of the command SU in the TDM frame. For example, the MET will respond to a command in SU slot 2 on MET-ST channel 2, and so forth. The response is always transmitted in the second frame time after receipt of the command, so that there is a minimum of 120 ms in which the MET can prepare its response.

The initial phase of establishing a call is handled by out-of-band signaling on the GC-S, MET-SR and MET-ST channels. This phase culminates in assignment of a pair of communication channels to the MET and FES. When these elements receive and tune to the communication channels, further signaling and control functions are accomplished using inband signaling. The communication channels, FES-C and MET-C, use a variety of related TDM formats which are determined by the intended use of the link, i.e., voice, data, or facsimile and one of three possible primary modes: call setup (entirely signaling), communication (no signaling), or in-band signaling (an occasional subframe of 128 bits is used for signaling/control).

The same 96-bit SU described above is used to accomplish in-band signaling. The outbound TDM, inbound TDMA, and inbound random access channels provide signaling between the GC and each of the METS in the associated control group. All communications on these channels will be passed in the form of 96 bit (12 octet) messages known as signaling units. Each signaling unit will begin with a 1-octet messages type field and end with a two-octet cyclic redundancy check. The MET to CC Signaling Protocol (MGSP) serves as the layer two protocol for these channels.

Communications from the group controller (GC) to the mobile terminals is provided by the Outbound TDM or GC-S channel. The primary function of this channel is to carry frequency assignments from the GC to individual METs. In addition, the Outbound TDM channel carries network status information which is received by all METs in a particular beam and control group. The outbound TDM channel operates at a rate of 6750 bits/s with rate ¾ FEC. QPSK modulation and nominally 6.5 kHz channel spacing (other spacings are under investigation) is employed. These parameters are identical to those of the communications channel and were chosen to reduce MET complexity.

Inbound TDMA (MET-ST) channels are used by the MET to respond to actions initiated by the GC, such as responding to the call announcement issued by the GC to check a MET's availability to receive a PSTN originated or MET to MET call. The Inbound Random Access (MET-SR) channels are used by METs to request frequency assignments and for other MET initiated actions. The inbound random access and TDMA channels each operate at a rate of 2400 bits/s with rate ¾ FEC. DPS modulation and nominally 7.5 kHz channel spacing is employed. This modulation scheme has been selected because of its robust performance in the presence of frequency offset and timing errors. It also exhibits superior performance relative to conventional BPSK in the presence of band-limiting and hard-limiting.

Each control group has associated with it a number of L-band beams over which it operates. In each of these L-band beams a control group has associated with it a distinct set of outbound TDM, inbound TDMA, and inbound random access channels. The number of signaling channels of each type in each set is determined based on the level of signaling traffic flowing between the GC and the METs in that control group in that L-band beam. As signaling traffic levels change, new signaling channels of each type are allocated to or deallocated from a particular set of channels. The frequencies used for outbound TDM, inbound TDMA, and inbound random access channels are included in the status information carrier in the bulletin board signaling units transmitted on the outbound TDM channel.

Each MET is assigned to one of the outbound TDM channels in the control group and beam to which it belongs. Each control group supports up to 16 outbound TDM channels in each beam. Each outbound TDM channel has associated with it up to 6 inbound TDMA channels. An inbound TDMA channel will only carry messages that are responses to messages received on the outbound TDM channel with which it is associated inbound random access channels will not associated with a particular outbound TDM channel. A MET chooses a inbound random access channel at random from among those associated with its control group and beam each time a message is to be transmitted. Each control group can support up to 64 inbound random access channels in each beam. Up to 64 of these channels may be used system wide to meet the signaling requirements of a fully loaded system supporting 5000 circuits.

Inband signaling channels (FES-C and MET-C) are provided between the FES and the MET. These channels are used to provide signaling for call setup and call release, and also provide the capability to pass other signaling information while a call is in progress. The FES-C and MET-C channels are operated in two separate modes in "call setup mode" only signaling messages are carried by the channel. In voice mode voice frames are carried by the channel, but the capability to inject signaling messages by occasionally dropping voice subframes exists. Frames containing inband signaling messages employ a unique word different from that used for frames containing only voice subframes.

Interstation signaling channels (GC-I and FES-I) are used to pass signaling information between the GC and each of the FESs. These channels operate at a rate of 9.6 to 64 kbit/s and are implemented using either the available 5 MHz Ku-band satellite capacity or terrestrial links. The LAP-F protocol will be employed on those links to ensure reliable transfer of variable length signaling and network management messages.

When a MET is idle (powered on and ready to receive a call) it will continuously receive an Outbound TDM channel in order to receive call announcements associated with incoming calls and obtain status information from bulletin board signaling units. Each MET will be capable of transmitting signaling information to the GC on any of the inbound random access channels or on any of the inbound TDMA channels associated with the outbound TDM channel that it is receiving. During a call a MET will receive and transmit all signaling information via the In-Band signaling channels. No signaling information will be sent to a MET via the outbound TDM channel during a call. Any signaling messages from the GC to the MET will be sent to the MET via the FES through the GC-I and FES-C channels.

Each group controller supports at least one outbound TDM channel in each of its associated L-band beams. Each outbound TDM signaling channel is continuously transmitted and carries frequency assignments and networks status information from the GC to the METs. The outbound TDM channels are also used to poll idle METs to see if they can accept incoming calls. As this channel is the only way to signal information to a MET not engaged in communications, it must be as robust as possible under harsh fading and shadowing conditions.

Another key element in the MSS system is the need for the METs to be as inexpensive as possible. Towards this end, the outbound TDM channel will have the same rate and modulation as the communications channels. This will maximize the commonality of the receive chain of the MET for communications and signaling. Note that as the demodulation process is much more complex than the modulation process, the inbound random access and inbound TDMA channels do not really require this level of commonality with the communications channel.

The number of outbound TDM channels assigned to each set of signaling channels is determined by the traffic supported by the group controller in that L-band beam. Assignment of METs to outbound TDM channels is made based on a special identifier assigned to each MET as commissioning. This identifier is called the GC-S Selector Identifier code (GSI). The MET selects the outbound TDM channel to be used by dividing the GSI by the total number of outbound TDM channels available in the given beam. The number of TDM channels available is given in the BB of each TDM channel. The remainder of the four bit binary division process will form the number of the channel to be used. Each MET will receive only the outbound TDM channel assigned to it. This method allows METs in the same logical grouping to be assigned to the same outbound TDM channel as is needed for the Virtual Network Service provided by the MSS System. It also allows the load on the outbound TDM channels to be redistributed quickly if a channel fails or a new channel is added.

The 120 ms frame length was chosen because it would support 6 messages per frame and correspond to the slot size requirement (>120 ms) of the inbound TDMA channel. This allows a direct correspondence between outbound TDM frames and inbound TDMA slots for the purposes of TDMA synchronization and scheduling responses to outbound messages. Eight flush bits are included at the end of each frame to allow the decoder to reset to a known state at the beginning of each frame. This allows more rapid reacquisition following channel fade events. The modulation scheme and transmission rate for this channel will be the same as for the transmission channel, namely QPSK modulation at a transmission rate of 6750 bps. Signaling units within each frame will be coded with a rate ¾ constraint length K=7 convolutional code.

The outbound TDM superframe has a duration of 360 ms and is made up of three outbound TDM frames. The superframe duration is the basic time interval over which message repetitions are done. Repetitions are used to increase the reliability of outbound TDM signaling units. Messages can be repeated in consecutive superframes. Studies by AUSSAT have shown that L-band fade events typically have durations ranging between 10 ms and 100 ms (2). Because the 120 ms frame would not provide adequate separation between message repetitions, the 360 ms superframe is used to reduce the chance of losing two copies of a message during the same L-band fade event. This repetition method is similar to that used in the AUSSAT system. Different numbers of repetitions may be used for different message types to provide different levels of reliability. The number of repetitions used for a particular message type will be a part of the signaling protocols and can be varied by the system operator. In addition to message repetitions, interleaving will be used to protect against burst errors. The interleaving is provided over a TDM frame and provides improved performance in the presence of short burst errors.

The bulletin board is a set of signaling unit (SUs) that are periodically transmitted by the MCC on all outbound TDM channels. The bulletin board contains global information such as current network status, signaling channel frequencies and inbound random access channel congestion control parameters. Every MET processes the information in the bulletin board METs, on startup, and acquires the entire bulletin board before attempting to use the MSS system. At least one bulletin board SU is transmitted in every outbound TDM frame. Bulletin board SUs are also sent as "filler" SUs, i.e., sent when there are no other SUs pending on the outbound TDM channels. Bulletin board SUs do not occupy any fixed position in the outbound TDM frame.

Bulletin board SUs are grouped into pages of related SUs. Each Bulletin Board page has an update number associated with it, which will be sent with each SU of that page. This number will be incremented by the NCC whenever the information in that page is updated. METs are required to build a local data structure that contains the contents of the bulletin board. Whenever a change in update number is detected for any page, the MET will update the entire data structure for that page with the contents of the bulletin board SUs that follow.

The inbound TDMA channel is used by the METs to transmit responses to call announcement messages and for responses to other messages received on the outboard TDM channel. Each of the inbound TDMA channels is assigned to a particular outbound TDM channel. The number of inbound TDMA channel assigned to a particular outbound TDM channel depends on the traffic supported by that outbound TDM channel and is selectable by the network operator. The TDMA channel is divided into slots of 120 ms duration. Inbound messages consist of 96 bits before coding and 128 bits after rate ¾ convolutional coding. The resulting burst will occupy 80 ms of the slot, allowing 40 ms of guard time.

This guard time arises due to the uncertainty in round trip transmission time between the satellite and a mobile terminal. Mobile terminals derive their inbound frame timing (for both the TDMA and random access channels) from the outbound TDM frames. Inbound TDMA slots have the same duration as an outbound TDM frame. At a MET each TDMA slot boundary occurs at an outbound TDM frame boundary. If MET A is nearer to the satellite than MET B, MET A will receive the outbound TDM channel $\Delta t$ sooner than MET B, where $\Delta t$ corresponds to the difference in propagation times to the satellite for the two terminals. As a result, if both METs synchronize their transmit timing to their reception of the outbound TDM channel, MET B's responses to messages will take $2\Delta t$ longer to reach the satellite than MET A's responses. As additional guard time of 1 symbol time also must be included to account for the $\pm\frac{1}{2}$ symbol synchronization uncertainty in the MET. This results in a total guard time requirement of $2\Delta t+1$ symbol time.

TDMA scheduling is done using a fixed relationship between outbound TDM channel time slots and inbound TDMA channels and slots. The response to a message received in the nth slot of the outbound TDM frame is transmitted on the nth TDMA channel assigned to that outbound TDM channel. The frequencies of the assigned inbound TDMA channels are contained in one of the bulletin board signaling units periodically transmitted in the outbound TDM channel. The response to an outbound message is transmitted in the TDMA time slot that begins 120 ms after the end of the TDM frame in which the outbound message was received. This should provide adequate time for message processing in the MET.

The inbound random access channel is used by the METs to transmit call requests to the GC. It is also used to carry other inbound messages for MET originated actions. The number of inbound random access channels assigned to a particular control group in a particular L-band beam depends on the traffic supported by that control group in that beam and is selectable by the network operator. To provide reasonable call setup times and call loss probabilities these channels are typically be operated at a throughput of approximately 25% or less. As the random access channel is operating at a relatively low efficiency, one of the prime goals in its design is that it be bandwidth efficient.

The frequencies used for the random access channels are transmitted in the bulletin board signal units. For each transmission, METs choose at random among the inbound signaling channels assigned to their control group. After transmitting a message, the MET waits a given amount of time for a response. If no response is received within this amount of time, the MET retransmits in a slot selected at random over some given number of slots. This procedure is repeated until either a response is received or a maximum number of transmissions is reached. The bursts on the random access channel are identical to those on the TDMA channel (i.e., modulation, coding, preamble, etc.).

The MET-GC Signaling Protocol (MGSP) procedures send signaling units between GCs and METs via the GC-S, MET-ST and MET-SR channels. This protocol encapsulates functions such as channel selection, channel access, slot timing, error recovery and congestion control. Higher layer functions, such as call processing, use the protocol for communicating among themselves between the METs and GCs.

A transaction consists of a command message that is sent from an originating application to a destination application, to which the destination application replies with a response message. Each command and response consists of a signaling unit. The MGSP performs functions such as channel selection, error recovery using retransmission, and repetition of SUs to improve channel reliability. The MGSP at a MET also implements congestion control procedures for the MET-SR channels. Only one outstanding transaction exists between a MET and a GC in a given direction. However, two simultaneous transactions, one in each direction, are supported between a GC and a MET. MGSP also provides a only-way message service, that does not require a response from the receiver.

Figure 8A:
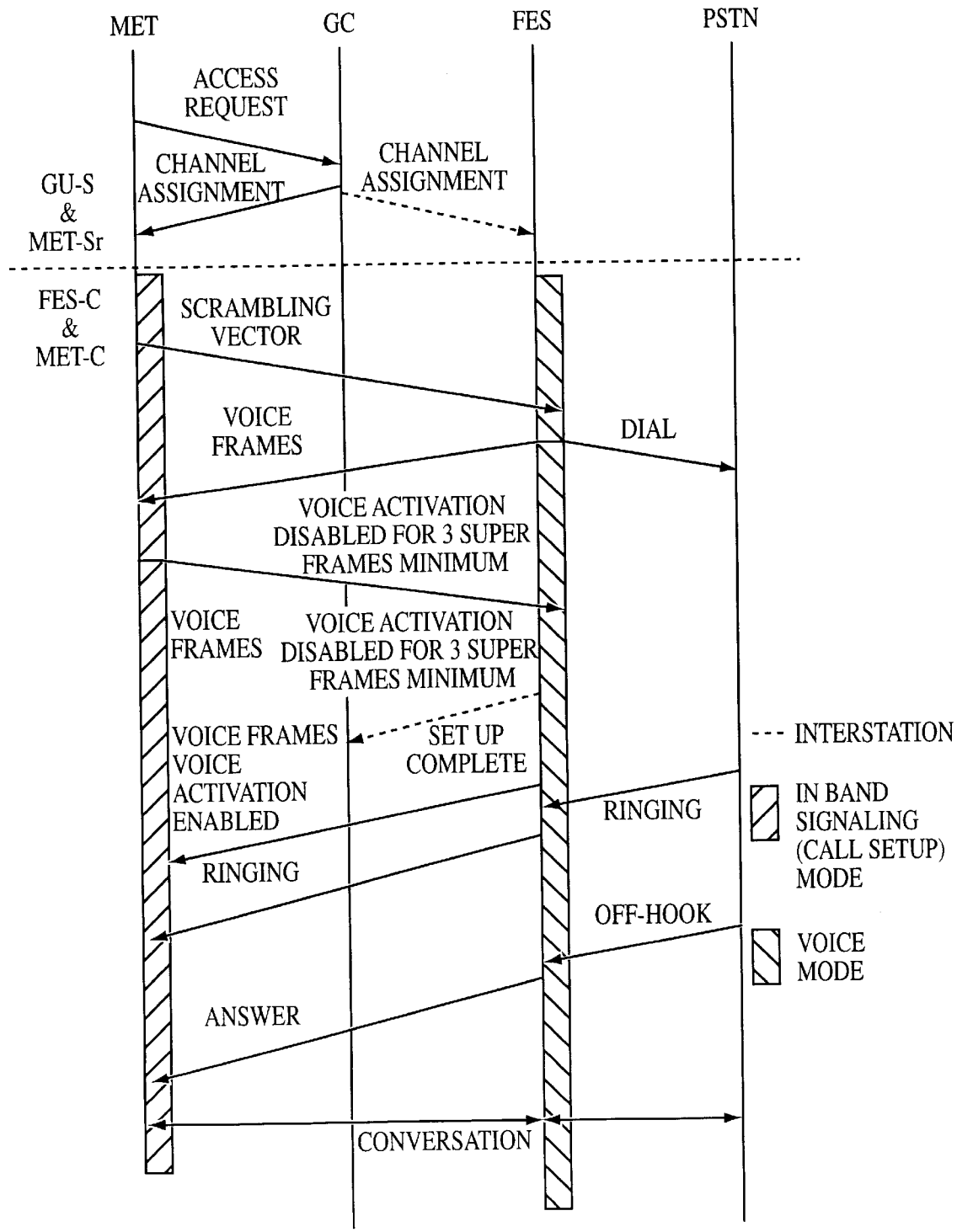
FIGS. 8a–8b are diagrams of the improved call setup protocol used to establish a MET originated voice call.
Figure 8B:
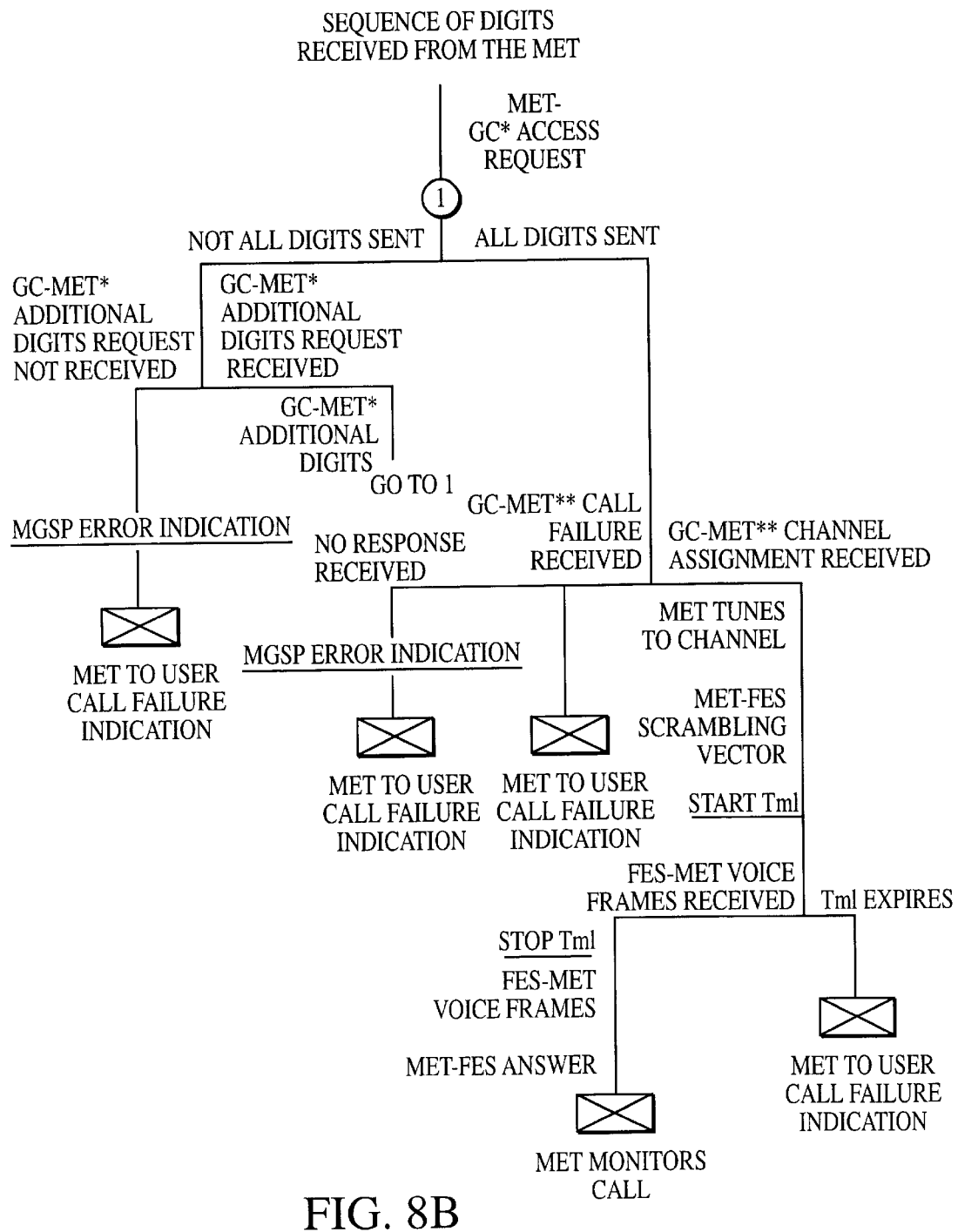

The improved call setup protocol used to establish a MET originated voice call is shown in FIGS. 8a–8b. When a MET user initiates a call, the MET formats and transmits an access request message via a random access channel. This message includes the call type and the destination phone number. The group controller chooses an FES to handle the call and sends frequency assignments to the MET via the TDM channel and to the FES via the interstation signaling channel. The FES frequency assignment also includes the call type, the destination phone number to allow the FES to complete the call, and an access security check field used to verify the METs identity. The access security check field is generated by the group controller using the MET frequency assignment and the MET key which is known only to the MET and the group controller.

After the MET receives the frequency assignment, it transmits a scrambling vector message to the FES. This message contains the initial vector to be preloaded into the FES scrambler at the beginning of each voice channel frame. Letting the MET randomly pick this vector provides some degree of privacy on the Ku to L-band link. The scrambling vector message also contains an access security check field generated by the MET using its frequency assignment and its key. The FES compares this field with that received from the group controller to verify the identity of the MET. When the FES receives the scrambling vector, the FES will check the validity of the METs identity. If the check fails, the FES will initiate a call release.

After receiving the scrambling vector message and successful authentication of the MET (see U.S. application Ser. No. 08/565,036, filed Nov. 30, 1995, entitled FRAUD DETECTION AND USER VALIDATION SYSTEM FOR MOBILE EARTH TERMINAL COMMUNICATION DEVICE," incorporated herein by reference), the FES and the MET switch from call setup mode to voice frame mode and the FES completes the call to the terrestrial network user. The FES transmits voices frames to the MET to effectuate voice communication. We have discovered that the coder/decoder which is used in the MET imposes certain constraints described below that require the signalling architecture to be adapted thereto.

Specifically, it has been determined that the voice coder/decoder performs the following functions that impact on the signalling architecture in the context of our mobile satellite system. The voice coder/decoder receives coded messages from the baseband processing and RF electronic system and decodes the message received from the satellite antenna unit for delivery to the interface unit that includes standard user interfaces. The voice coder/decoder processes speech to produce 6400 bps output. The inherent speech coding rate is 4150 bps, to which 2250 bps of error correction and detection is added. The coder/decoder encodes 160+/−4 samples of speech and converts it to 128 bits. The encoding function is called approximately every 20 ms to produce the 6400 bps bit stream. The coder/decoder decodes 128 bits of speech and produces 160+/−4 samples of speech. The encoder/decoder also performs voice activity detection.

In accordance with the coder/decoder functions and operations, the coder/decoder includes a voice activation timer or synchronizer that is used to determine and insure that a caller is present during the call setup process. The encoder determines that the voice communication is active when valid data appears at the output within two sub-frames or approximately 40 ms. The encoder determines that the voice communication is not active when no voice activity occurs for 3 sub-frames or approximately 60 ms. The decoder sets the voice activity to active when voice activity is detected, and to inactive when no voice activity is detected.

In accordance with the above constraints of the coder/decoder, it has been determined that the protocol used by the mobile satellite system must be adapted for use with the standard encoder/decoder used for voice communication. In particular, it has been determined that the inherent delays in the mobile satellite system are incompatible with the voice activation timer used in the coder/decoder. In this connection, it has been determined that it is beneficial to eliminate usage of the voice activity timer during the voice mode prior to completion of call setup. Once call setup has been completed, the voice activity timer can then be re-enabled and used for its intended purpose, i.e., to determine whether the call is still active or whether the call has terminated, thereby freeing up satellite resources more expediently.

Accordingly, once voice frames have been transmitted from the FES to the MET in the voice mode, and once the FES transmits the destination number to the PSTN, the FES also transmits a voice activation disable signal to the MET to disable the voice activation timer in the MET. The voice activation timer is then disabled for at least 3 super frames. After the FES has completed call setup with the GC, the FES transmits a signal to re-enable the call activation timer in the MET.

The PSTN provides ringing tones to the FES indicating that the call is being placed to the destination, and the FES in turn transmits the ringing tones to the MET. When the destination telephone answers the MET originated call, an off-hook signal is transmitted from the PSTN to the FES, and the FES in turn transmits same to the MET indicating that the call has been answered by a user connected to the PSTN. Voice communication between the MET and the PSTN destination via the FES is then commenced until either party terminates the MET originated call.

Figure 9A:
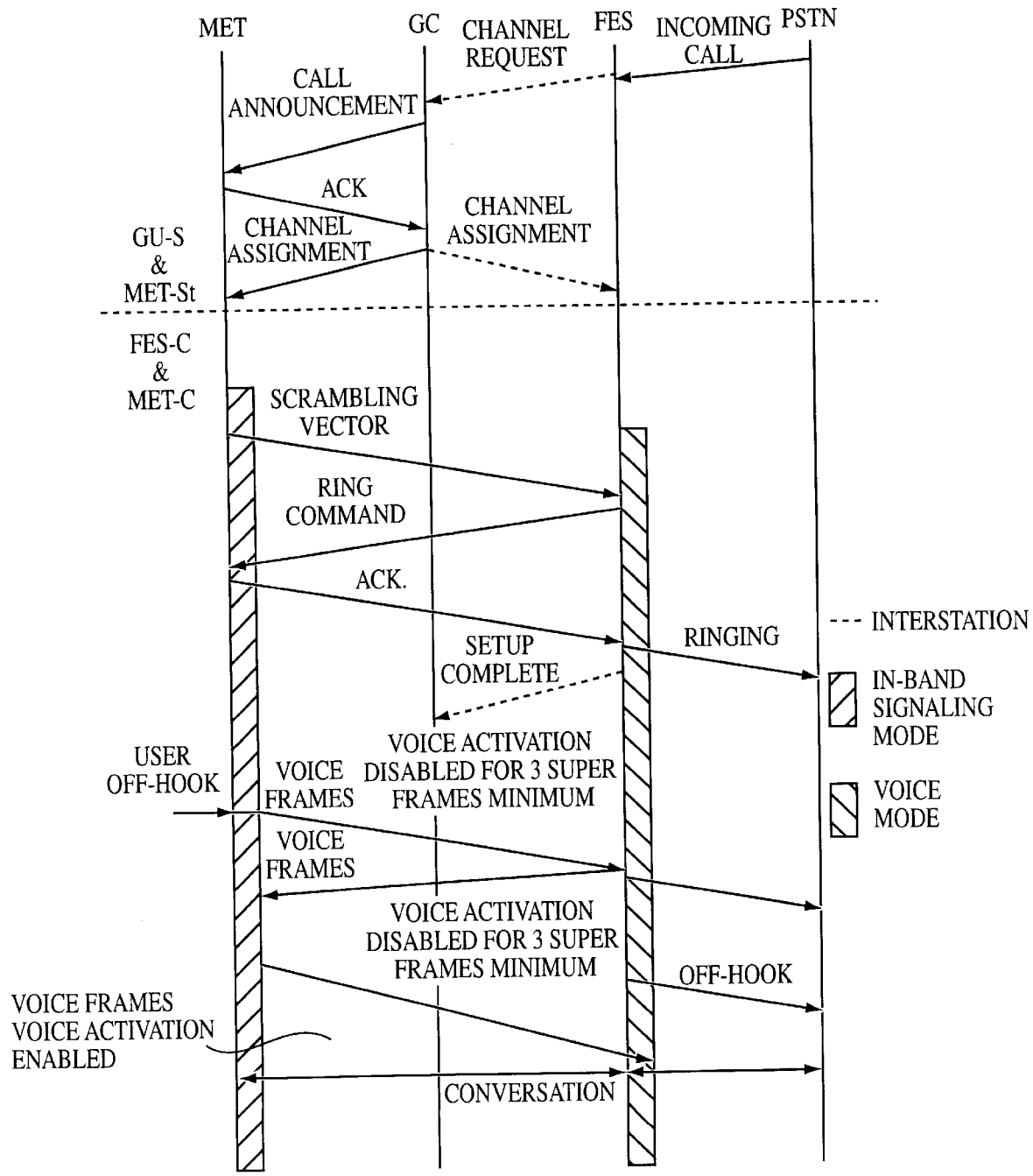
FIGS. 9a–9b are diagrams of the improved protocol used for PSTN originated calls.
Figure 9B:
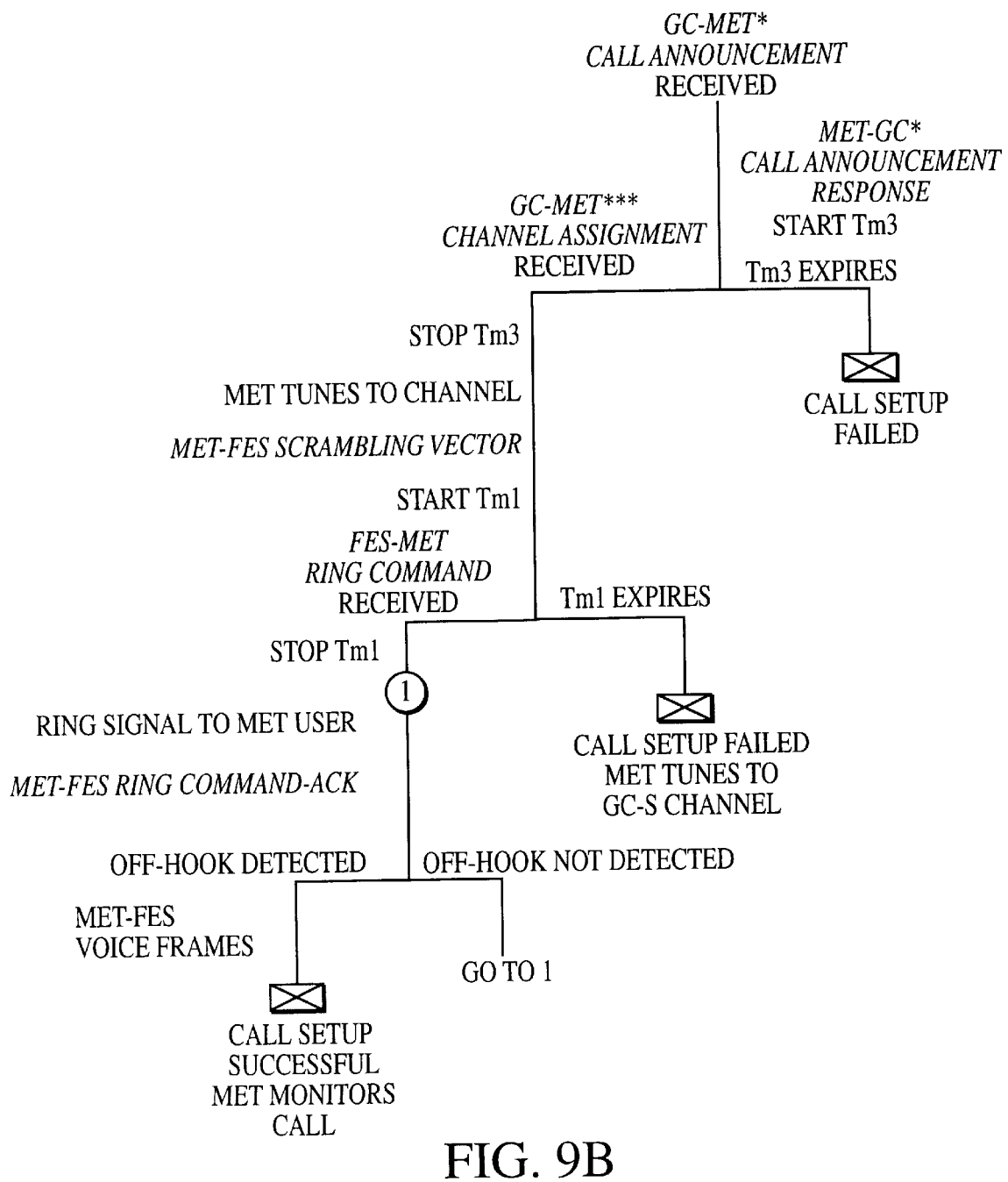

The improved protocol used for PSTN originated calls is shown in FIGS. 9a–9b. When a call from a terrestrial network user arrives at an FES, the FES makes a channel request using interstation signaling. This request contains the phone number received from the terrestrial network user. The group controller determines the MET identity based on the phone number and transmits a call announcement via the TDM channel. The MET acknowledges this announcement via the TDMA channel. This exchange allows the group controller to verify that the MET is available before assigning bandwidth to the call. Frequency assignments are then made and the scrambling vector is transmitted by the MET once the MET tunes to the assigned frequency.

Upon successful reception of the scrambling vector, the FES checks the validity of the MET's identity. If the check fails, the FES initiates a call release procedure. If not, the FES transmits the ring command to the MET. Upon reception of the ring command by the MET from the FES, the MET generates a ringing signal to the MET user and transmits a ring command acknowledgement. The ring command acknowledgement is repeated by the MET until the MET is taken off-hook by the MET user or until the call is cleared. Upon receipt of the acknowledgement from the MET and once the call setup is complete, the MET begins transmitting voice frames to the FES and also transmits a voice activation disable signal as described in connection with MET originated call setup procedure. Once the MET is taken offhook the MET switches to the voice frame mode. Upon detection of the MET switching to the voice frame mode, the FES stops transmitting null signal units, switches to the voice mode, transmits a voice activation enable signal and commences voice communication between the MET and PSTN.

MET to MET calls are set up using a double hop connection through an FES. These calls are set up by the group controller and the FES as a MET to PSTN call setup concatenated with a PSTN to MET call setup. As a result the METs require no additional call processing for MET to MET calls. That is, the procedures at the MET for receiving a MET-MET call are the same as procedures for reception of PSTN-MET calls, and the procedures at the MET for originating a MET-MET call are the same as procedures for origination of MET-PSTN calls.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989 "Cellular System Mobile Station—Land Station Compatibility Standard"; EIA/TIA-557; EIA/IS-54B.

Figure 10:
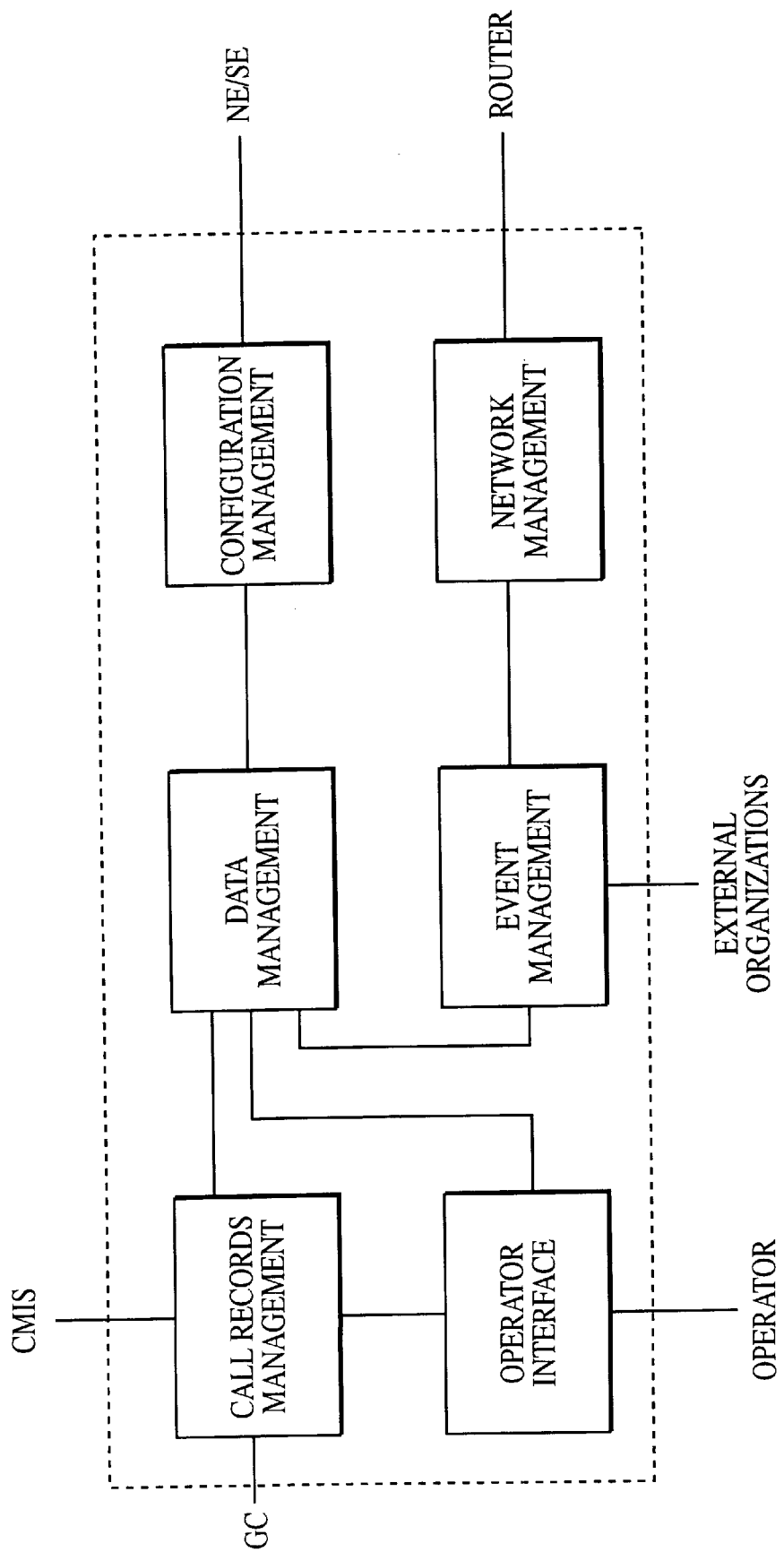
FIG. 10 is a block diagram of an improved NOC functional architecture.

The improved NOC functional architecture is shown in the block diagram of FIG. 10. The NOC collects information pertaining to the utilization of resources and distributes information to appropriate destinations such as CMIS and NE/SE. The NOC is involved in network security to prevent unauthorized use. The blocks shown in the figure broadly represent the functions that the NOC performs or oversees. The network management is a framework for the NOC basic functions. The configuration management implements and allocates resources in cooperation with plans formulated with NE/SE. The operator interface serves a fault management function. Problems in the system are isolated and reported to give operations personnel the ability to see when problems occur and react to them. The operator interface is a man-machine interface (MMI) to present alarms and events to the operators. Information as to system configuration is also made available. Call records management serves as an accounting functionality. This function accepts MET registration records and other information sent by external entities for storage in appropriate NOC database tables. Usage data sent by the individual GCs and FESs are assembled into Call Records. Data management serves as a data base repository for transmission and receipt of information gathered by the other components of the network operations center.

Figure 11A:
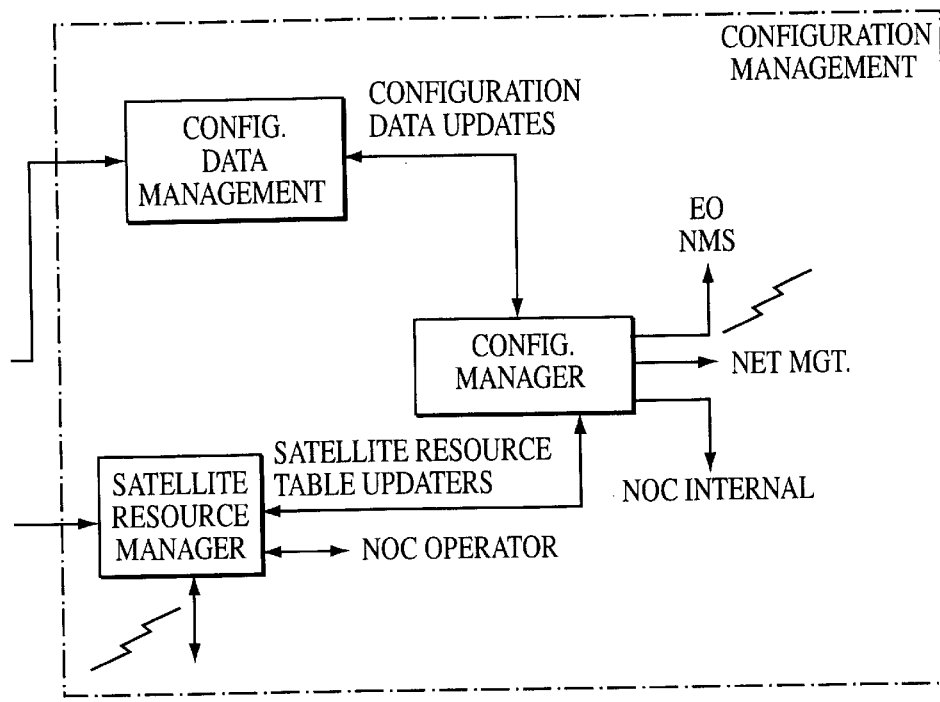
FIGS. 11A–11C are diagrams of the NOC architecture in more detail.
Figure 11A:
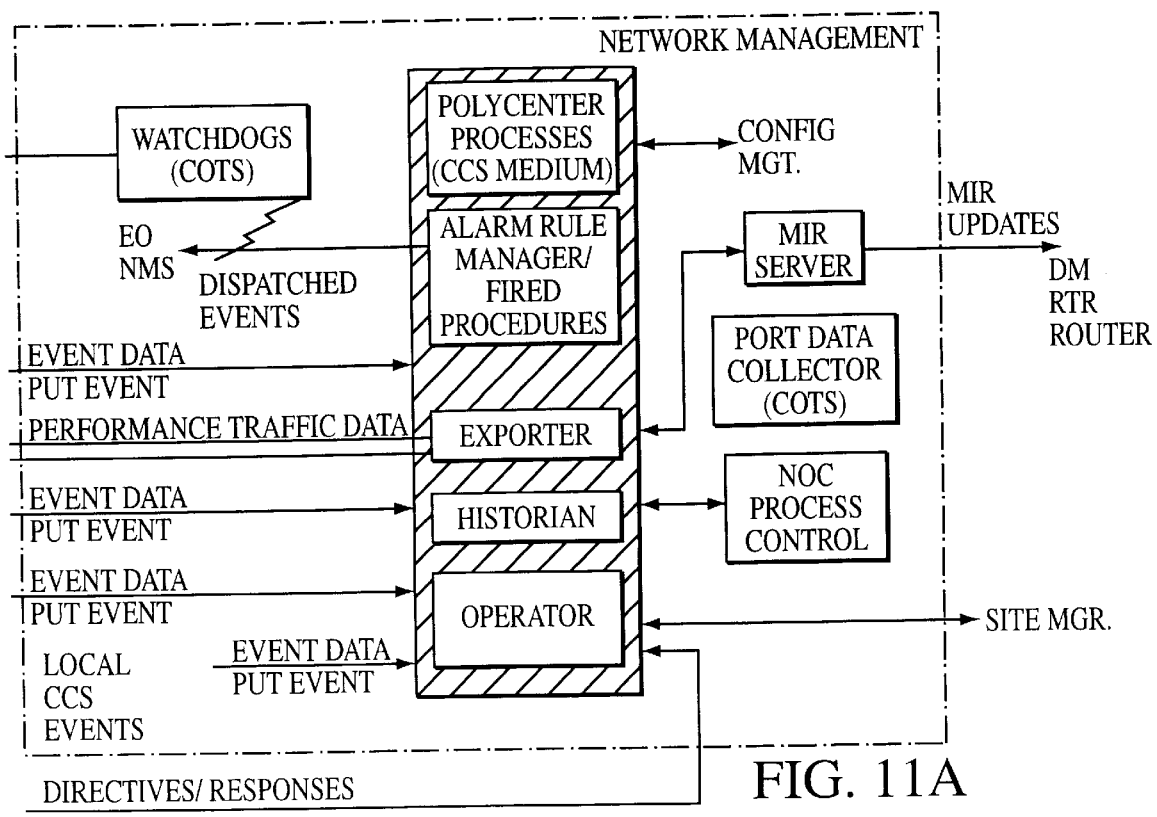
Figure 11B:
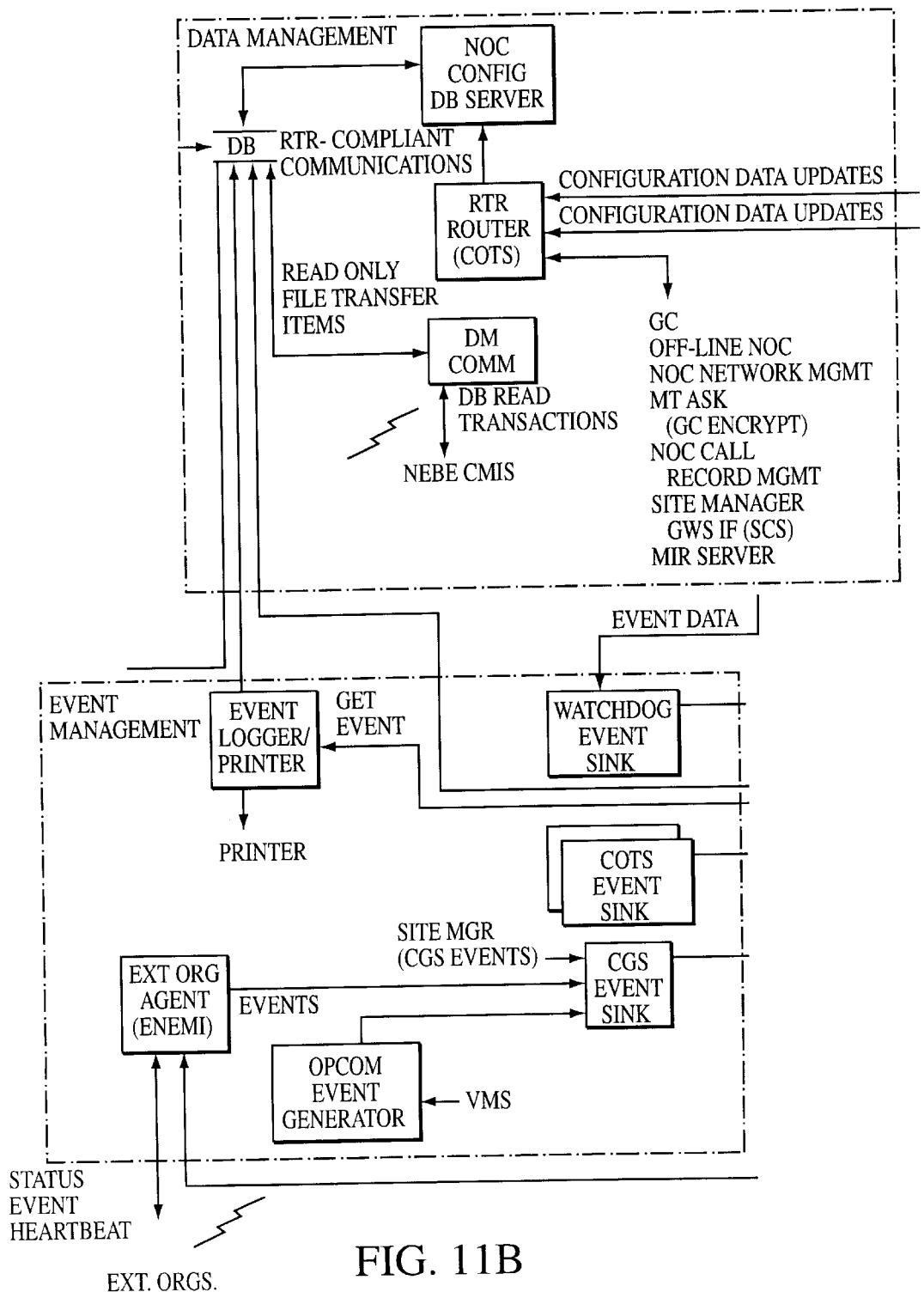
Figure 11C:
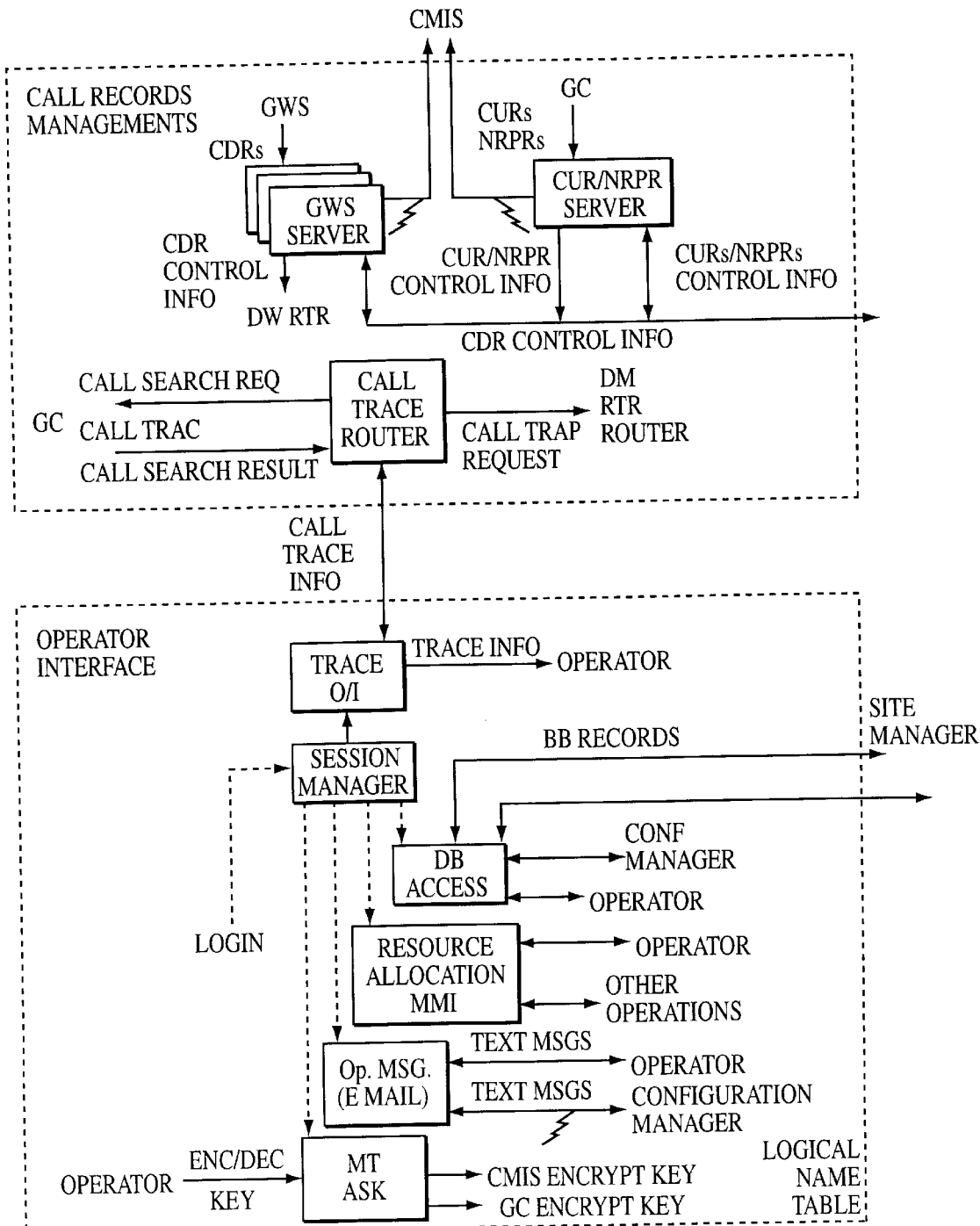

FIGS. 11A–11C set forth the NOC architecture in more detail, the elements shown corresponding to the blocks of FIG. 10. As shown in FIG. 11A, the network management block contains Polycenter Processes modules that serve alarm manager, exporter, historian and operator control functions. The historian records performance of the network over time, collecting at suitable intervals statistics regarding resource utilization, calls in progress. The management information repository (MIR) server interfaces with the exporter. Network update requests are received from the router. When transactions come in from NE/SE or CMIS, they need to be distributed to different parts of the system. Updates are distributed to the MIR server so that it can update the internal data base. After all elements of the system are set up, network updates are communicated back to the router for network implementation. Exporter transmits collections of information, including performance traffic data, to the database in the data management block. The NE/SE system is described in detail in U.S. application Ser. No. 08/601,749 filed on Feb. 15, 1995, incorporated herein by reference. The CMIS system is described in detail in U.S. application Ser. No. 08/598,556 filed on Feb. 8, 1996, incorporated herein by reference.

The alarm rule manager sets thresholds for adverse conditions and executes set up procedures for the event management block. For example, if customer service center sends out a commissioning request and the commissioning fails, an alarm is generated and the NOC sends a message to CMIS describing the failure and the cause of the failure. The watchdog looks for events, such as the system disk becoming fully utilized and other fault conditions, and sends an alarm to NMS to the operator screen. The performance data collector samples resource utilization, collects statistics and provides feedback. NOC process control is involved with custom processes such as NOC startup and shutdown.

Configuration updates are received by the configuration management block, shown in FIG. 11A. A routing table is used to distribute messages to the appropriate components of the NOC.

The data management block, illustrated in FIG. 11B, includes servers to interface with the NOC main data base (DB). The RTR router receives RTR requests from either satellite resource manager or configuration management. The NOC configuration DB server decides from polling NOC components whether the request for update is to be accepted. If so, the NOC data base (DB) is updated and confirmation is sent to other components to update local data bases. The request is basically distributed to all other components to vote on the appropriateness of the requested change. For each transaction there is a specific set of data bases that are to be updated. DC Comm exports information from the database to NE/SE and CMIS. As read transactions do not need to go through this voting to update process, accessing for reading is easily available to any of the system components. Performance data, collected in the network management collector, previously described, is periodically exported directly to the data management DB, as no updating of other module databases is needed. Such data is not related to the overall configuration.

The call records management block is shown in FIG. 11C. The functionality of this component accounts for customer usage to enable billing preparation by the configuration management information system (CMIS). Call detail records (CDRs) relating nonsatellite usage are received from the gateway switch (GWS) and call performance records (CPRs), or call usage records (CURs) relating satellite usage are received from the group controller (GC). These records are logged into files at the GWS and CUR/NRPR servers to be forwarded to CMIS and saved as backup in the data base. The call trace router sends RTR requests for call tracing and trapping to and from the GC. Call tracing requests are sent to the trace operator, shown in the operator interface block of FIG. 11C. Call trace information is received by the call trace router from the trace operator.

The operator interface includes the session manager. After logging in to the session manager, each of the functions represented by the other blocks within the operator interface block is available. When the system is started or restarted, the encryption/decryption code is established. The MT ASK (Access Security Key) block, essentially a separate data base, contains specific keys specific to each telephone and is checked in real time for each call. The mobile telephone (MT) key is set up when the new MT is added to the system. MT ASK is also used for storing CMIS and GC encryption keys used for encrypting request transactions. The operator message (Op. Msg.) block is an interface for E-mail. Resource allocation MMI permits the NOC operator to modify the system for day to day operations, such as taking resources off line or on line. The DB access permits the operator to read the data base DB. Bulletin Board records containing transmit and receive frequency information about the METs are available to the operator from the Site Manager location.

The event management block, involved with fault management, is shown in FIG. 11B. All messages are received in the event logger, logged to a file, sent to a printer and displayed at the NOC MMI. Where necessary, files are forwarded to external organizations such as CMIS or NE/SE. CGS (communications ground segment) event data are sent to the CGS event sink. The COTS (Commercial off the shelf) software sink receives other events, such as VMS events. The watchdog event sink receives events from the watchdog block in the network management block, described above. The operator communication (OPCOM) generator converts VMS events into a common format.

Figure 12:
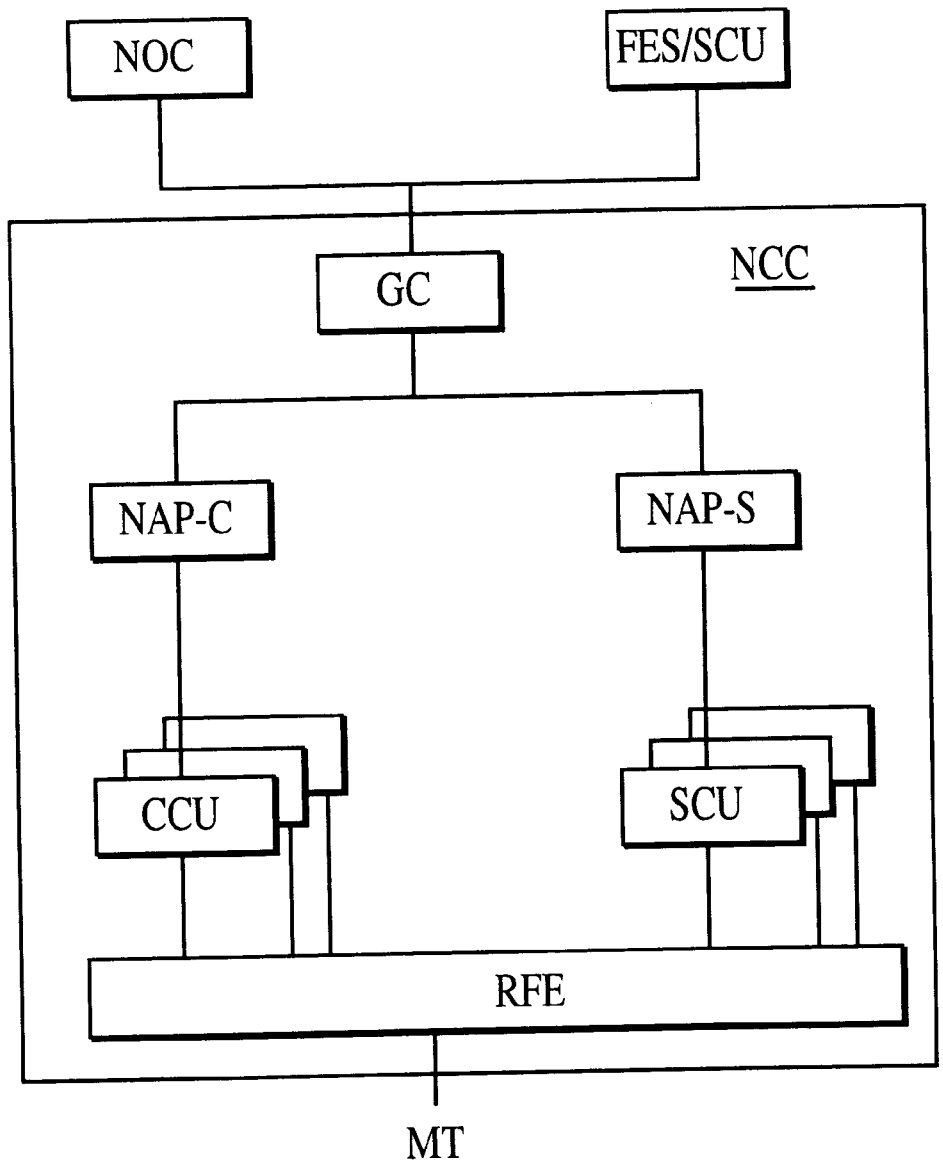
FIG. 12 is a basic block diagram of the basic components of the NCC showing the included GC.

FIG. 12 illustrates the Network Communications Center (NCC) and the elements contained therein. The Group Controller (GC) resides in the Network Communications Center (NCC) system element within the CGS and provides call control and satellite resource management for:

Circuit-switched voice, FAX, and data calls;

Integrated Voice and Data MT (IVDM) voice calls;

Satellite trunked radio calls.

The GC controls setup, monitoring, and cleardown of calls between MTs, IVDMs, VN MTs, and terrestrial users. It also provides AMS(R)S Provisioning, Control Group Reconfiguration, MT and FES PVT and Commissioning support, and Performance and Status Monitoring.

The primary function of the GC is the management of customer Control Groups. Control Groups identify groups of MTs/IVDMs which have access to CGS, the satellite and network resources that have been allocated to them for sending/receiving calls, and the service permissions and calling restrictions that apply to each MT/IVDM. Control Groups also contain Virtual Networks (VNs) discussed below, which define the routing options that apply to each MT or IVDM in the Control Group and Circuit Pools, which control the allocation of use of satellite circuits for circuit-switched calls.

Figure 13:
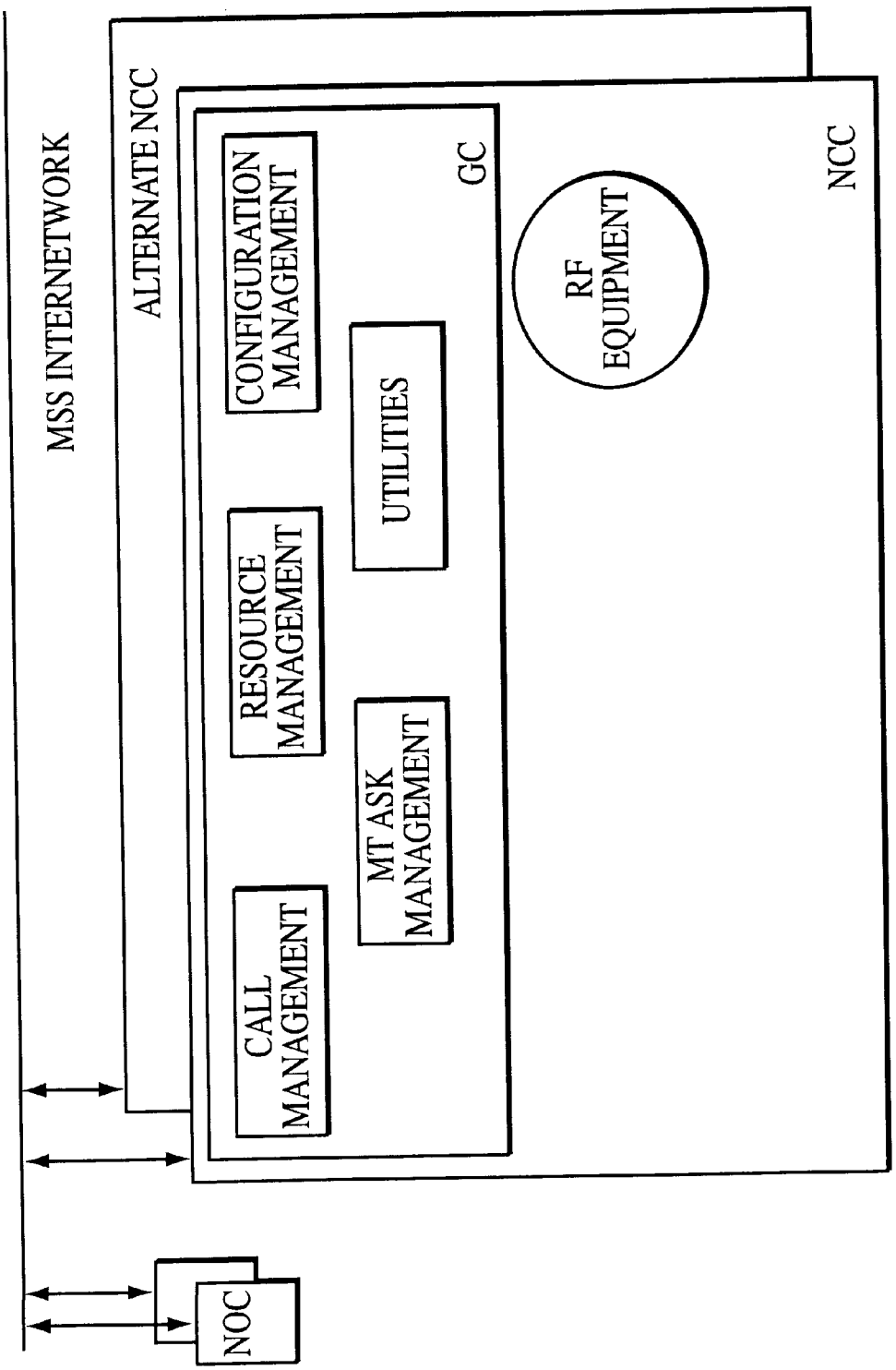
FIG. 13 is a diagram of the NCC logical architecture.

FIG. 13 illustrates the NCC logical architecture. The Group Controller consists of five top level components which perform the following functions:

1. Call Management

This component performs:

Call setup/monitoring for:

a. MT-to-MT, MT-to-PSTN/PN, PSTN/PN-to-MT calls b. MT initiated VN Calls c. Dispatch initiated VN, Private Mode, Broadcast, and Priority 1 calls.

MT Management, including:

MT Logon, GC-S Change, MT Shutdown, and MT Parameter Update, Visitor Registration;

Preemption of calls for AMS(R)S provisioning of satellite bandwidth and power.

MT Commissioning and PVT.

2. Resource Management

This component performs resource management and reconfiguration, including:

allocation/deallocation of satellite resources during call setup/cleardown incremental/complete reconfiguration of local Control Group databases address screening MT authorization call routing Virtual Network configuration 3. Configuration Management This component performs executive control for:

Control Group configurations;

AMS(R)S requests

4. MT ASK Management
   This component performs:
   secure MT ASK database management
   real-time check field generated for call processing
   ASK generation after completing commissioning/PVTs for Enhanced Fraud
5. Utilities
   This component is the common utility set for the GC including:
   MGSP
   Call Record Management
   Performance and Traffic Statistics generation
   Congestion Control
   Memory Management
   X.25 interface.

The NCC provides real time call processing for users of the CGS by assigning resources on a per call basis. The NCC operates under the administrative control of and is monitored by the NOC. The NCC manages access of users of the space resources allocated to the NCC by the NOC. The NCC provides system monitoring and testing functions to support FES and MT commissioning and periodic performance verification testing. A single NCC provides these functions for an entire network carrying the full traffic load. In the event that the NOC is not available, the NCC contains a backup operator interface capable of monitoring and controlling the ongoing provision of services to customers and which is capable of providing emergency AMS(R)S provisioning.

Logically, the NCC is divided into two functional groupings, namely RFE and processing/management functions. Physically, the NCC is similarly divided into RFE and terminal equipment which performs the processing and management functions. The NCC terminal equipment is composed of an integrated set of hardware that is shared with the NOC and FES elements. From the NCC perspective, the hardware is composed of three sets of equipment which include the Circuit Switched Management Processor (CSMP), Network Access Processors (NAPs), and Channel Units (CUs). The NAP functions for the NCC consist of Network Access Processors for Signaling (NAP-S), Network Access Processors for Communications and Testing (NAP-C(Test)), and Bridges Modems for Interstation Signaling Channel Units. Both the NAP-S and NAP-C (Test) have channel units associated with them. The NAPs, Bridges and Channel Units together form the NAP-CU HWCI. There are two styles of NAPs, namely, the Circuit Switched NAP and the Data NAP. The Circuit Switched NAP performs the out-of-band signaling (NAP-S) functions or communications (NAP-C) functions.

Figure 14:
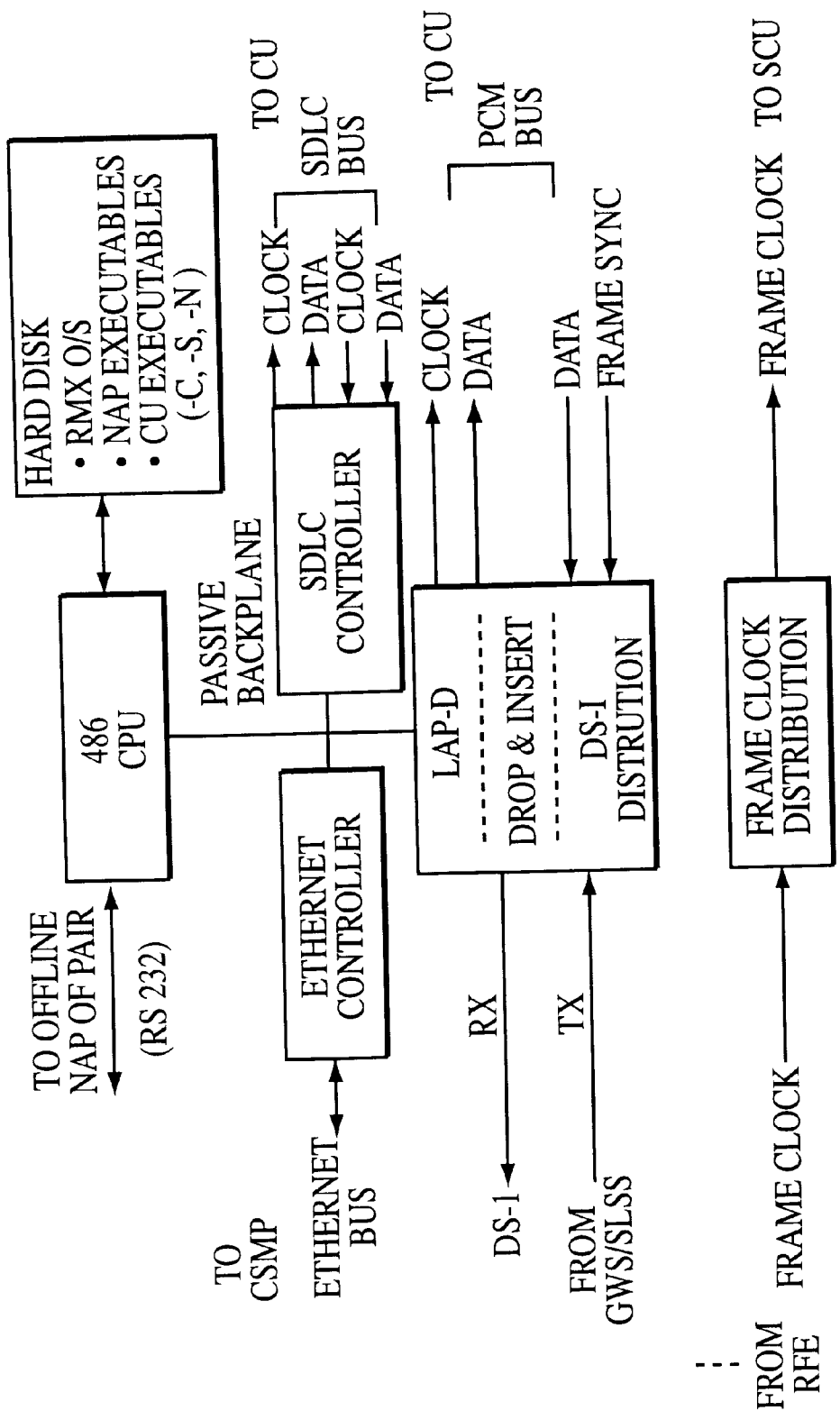
FIG. 14 is a basic block diagram of a circuit switched NAP.

A block diagram of the circuit switched NAP is shown in FIG. 14. The NAP is PC-based and contains a processor card, and SDLC card forming the interface with up to 24 channel units, an ethernet card providing the interface to ethernet B in the CSMP, and a distribution card. The distribution card provides a DS-1 interface between the gateway or base switch in the FES and the communications channel units, and a frame clock distribution function between the RF equipment and the out-of-band signaling channel units. NAPs are used in pairs for redundancy with an on-line and an off-line NAP or NAPs A & B. Each NAP monitors the condition of the other and takes over processing when a failure is detected or by operator (NOC or backup NCC) command via the system common software CSCI Site Manager function. The NAP-S and NAP-C connect to a channel unit of the same type which forms the interface to the RFE for signaling and communications. The CUs are hardware identical and take on their operational personality (S or C) with a software download when they are initialized.

Figure 15:
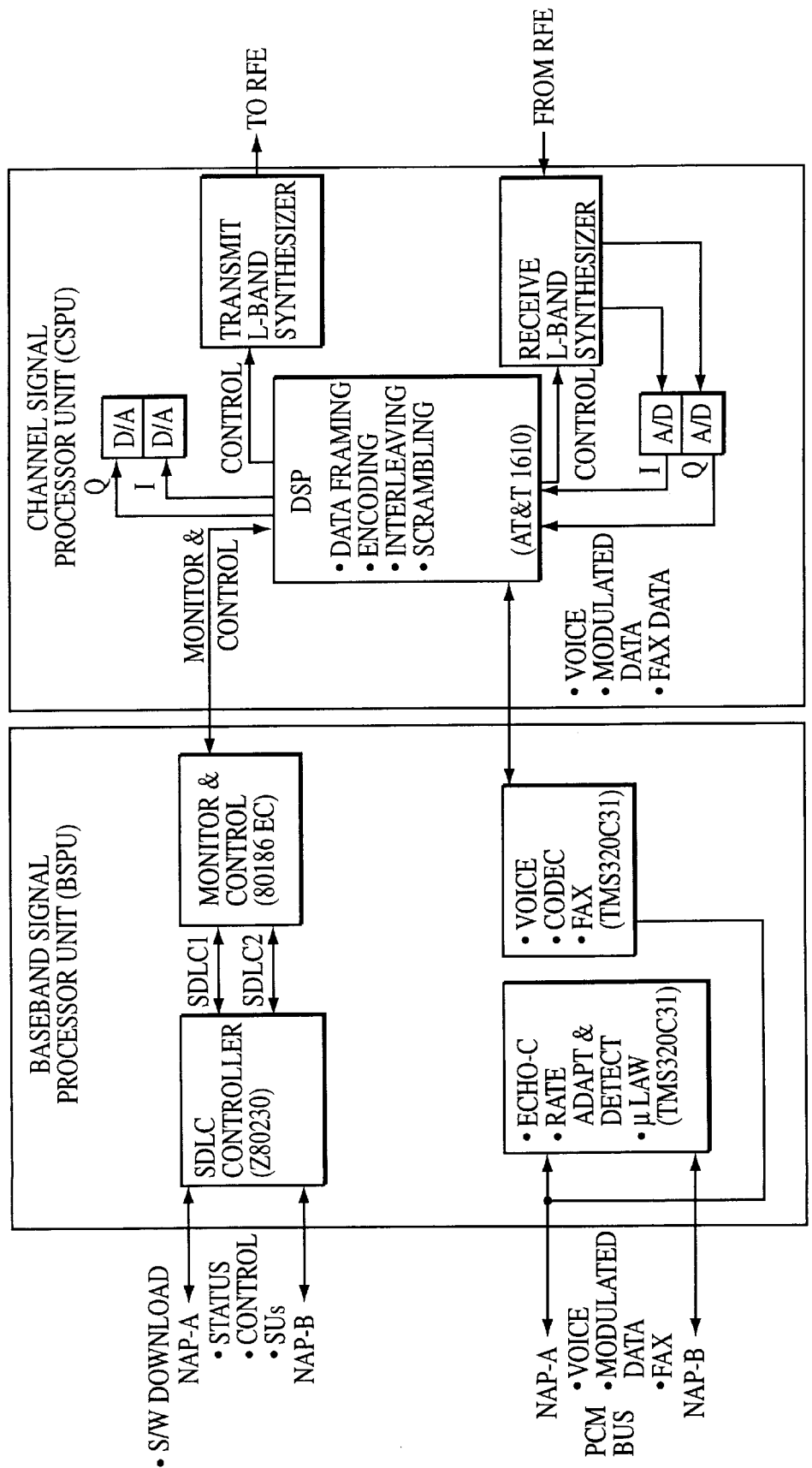
FIG. 15 is a block diagram showing the channel unit (CU) architecture.

A block diagram of the CU is shown in FIG. 15. The CUs are composed of two major sections: the Baseband Signal Processor Unit (BSPU) and the Channel Signal Processing Unit (CSPU). The CU interfaces to the NAP are shown on the left and the interfaces to the RFE are shown on the right. The sub-element processor types are noted in the diagram.

The BSPU is composed of three major functions: the SDLC Controller (Z80235), Monitor & Control (80186EC) and the voice/modulated data processing (twin TMS320C31). The SDLC Controller provides the interface between the main and redundant NAPs. The Monitor & Control function provides the central control and status focus. This processor also supports the software downloads to a given CUs set of processor sub-elements. The pair of TMS320C31 processors provide the functional processing for echo cancellation, rate adapting and detection, mu-law linear decompression, CODEC, voice, voice modulated data, FAX.

The CSPU is composed of a DSP, I/Q channel A/Ds & D/As, L-Band transmit synthesizer and L-Band receive synthesizer. The major functions performed by the DSP include data framing, encoding/decoding, interleaving, scrambling/descrambling. The DSP operates on digital data from the receive synthesizer A/Ds and supplies digital data to the D/As for transmission via the transmit synthesizer. As noted earlier, there are up to 24 CUs controlled by a single NAP pair (i.e., main/redundant).

The NCC element is composed of a GC CSCI hosted on the CSMP, a NAP CSCI hosted on the NAP processor and the CU CSCI hosted on the set of CU processors as shown in FIG. 15. The NCC element also requires some portions of the SCS CSCI which is hosted on the CSMP. Both the NAP CSCI and the CU CSCI require a communications version and a signaling version of these SCS CSCIs. Both versions execute on the same physical H/W configuration type. The functions of the NCC element are implemented by a set of software processes as follows:

CSCI ProcessMajor Function
GC CSCICallCall Processing
  Config
  GC Database Configuration Management
  Monitor
  Call record/statistics manager
  ASK Config
  ASK Configuration Database manager
  Check Field
  Check Field Generation
  GC Router
  GC message router
  GC Router Config
  GC router DB Configuration Manager
  Config Requester
  Configuration access by call processing
  ASK RequesterASK database access SCS CSCI
  VAX, NAP message
  Distribute NAP oriented messages
  VAX, VAX message
  Distribute VAX to VAX messages
  Process Control
  Monitors VAX processes
  Site Manager (NR)
  Non-real time network management
  Site Manager (R)

Real time network management
NAP CSCI
BB-PDU
Bulletin board processing
NAP-PM
Collect/report performance data
NAP-I/O
Process I/O in and out of NAP
CU CSCICU-CM
Perform MT PVT & commissioning tests
CU-SM
Perform signaling channel functions
CU-LIB
Common CU support functions The SCS CSCI is primarily responsible for network management functions. Software and hardware objects are managed and status and events reported to the NOC.

The NAP CSCI performs both call processing and network management functions. Interaction with the GC is established for receiving the GC-S signaling units for transmission via the SCU to the MTs. The NAP also returns to the GC the SUs received from MTs via the MT-SR and MT-ST channels.

The GC CSCI includes the following databases:
MT Database
MT Basic Data Table
MT VN Memberships Table
MINData Table
MT Restrictions Table
DN Data Table
MT VN Memberships Table
MT Class Table
Virtual Network Database
VN Data Table
Routing Lists Table
VN NPA Table
Circuit Pool Database
Circuit Pool Table
Freq. Segment Table
Frequency Table
CP Beam Table
CP Queue Table
Power Table
Beam Table
FES Status Tables
FES Table
CUP Table
Call Process Event Timers
Control Group Operational Parameters Table
Hash Tables
MT Database Hash Tables (RTIN, MIN and DN)
Virtual Network DB Hash Table
Routing List DB Hash Tables
Circuit Pool DB Hash Table
Net DB Hash Table
FES Status DB Hash Table
Virtual Network Counters Table
TDM Change Requests Table
Circuit Pool Status Counters Table
Circuit Pool Counters Table
Circuit Pool Queue Table
Spacecraft Power Table
MTs-on-Beam Table
MTs-commissioned Table
MT-SR Message Retries Table
MT-SR Congestion Events Table
GC-S Message Retries Table
IS Signaling Channel Stats Table
Call Record/Activity Tables
Call ID Activity Table
RTIN Activity Table
MTS Call Record
MT Management Call Records In the preferred system configuration, the Group Controller resides on one VAX ft 810 and executes in multiple concurrent asynchronous VMS processes which timeshare the CPU. The functionality of each GC process is as herein described.

The GC is made up of the VMS processes listed below. There are two Process Groups: the GC Controller (GCC) group, and Control Group Management (CGM) group. The GCC and CGM Process Groups are described below.

| Process Name | Priority | Process Group |
| --- | --- | --- |
| Configuration Process | Non-real-time | Control Group Mgmt |
| Call Process | Real-time | Control Group Mgmt |
| Monitor Process | Near real-time | Control Group Mgmt |
| Check Field Generator Process | Real-time | GC Controller |
| ASK Configuration Manager Process | Non-real-time | GC Controller |
| Router Process | Real-time | GC Controller |
| Router Configuration | Non-real-time | GC Controller |

Highest priority is given to the real-time processes for call handling. Second priority is given to near-real-time processes, which support call handling by forwarding call records and supplying call traffic and performance data to the NOC. Third priority is given to the non-real-time processes which support ASK and Control Group reconfiguration at the GC.

The GC processes are event-driven; between events, a process waits for input on a queue. To reduce system load, waits are non-CPU-intensive. The highest priority processes are driven by call events; the lowest priority processes are driven by NOC requests, Call Process requests, and internal timers set to configurable monitoring intervals. In addition to input from its queue, a process may use memory tables or disk files, as shown on the Process Diagrams, for data required to process an event.

The GC architecture accommodates a move to multiple processors. The GC is divided into GC Controller (GCC) processes, and Control Group Manager (CGM) processes. In a distributed environment, there would be one GC Controller, consisting of the GC Router and both ASK Manager processes, supporting one to 16 Control Group Managers. CGMs function independently and can be distributed on multiple processors. A CGM can manage 1 to 16 Control Groups, so there can be one CGM for all Control Groups (the current configuration) or up to 16 distributed CGMs (one CGYM for each Control Group). All processes for a CGM must be co-resident. The GCC can share a processor with one or more CGMs, or can reside on a separate processor. The ASK Manager is stand-alone, and can be hosted on a separate processor in any GC configuration.

Figure 16:
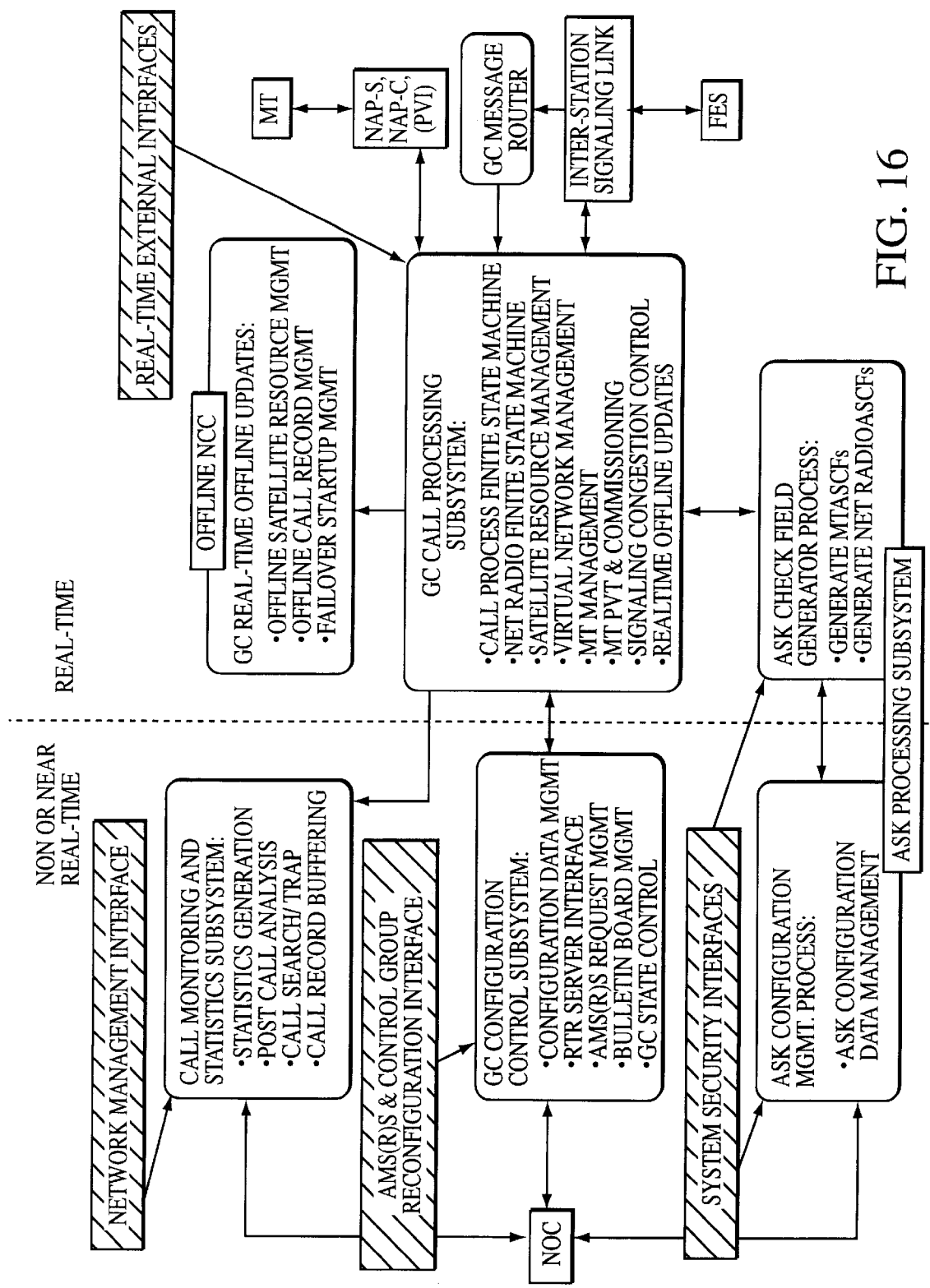
FIG. 16 shows the GC subsystems which manage a call in progress.

GC Subsystems illustrated in FIG. 16 comprise the component subsystems in the Group Controller and indicate where call processing and network management interfaces occur.

Configuration Process

The Configuration (Config) Process has multiple configuration control tasks. The Config Process controls the GC processing of Control Group reconfigurations. It receives database transactions from the NOC via the DEC COTS product Reliable Transaction Router (RTR), prepares the update, loads the new data into memory, and coordinates with the Call Process to complete the update. The processing and synchronization of the Config and Call processes during a configuration change is designed to minimize interference with active calls. ASK reconfigurations are handled by the ASK Configuration Manager.

The Config Process performs dual RTR roles. It performs as a server in NOC-initiated updates (#1, above) and a requester (client role) in GC-initiated database updates. As an RTR requester, the GC initiates RTR transactions to distribute changes that originated in the GC Call Process. One example of a GC initiated update is the change of a MT state following commissioning; another is the GC's initiation of a bulletin board update for congestion control.

Config receives AMS(R)S circuit requests, sends circuit blocking commands to the Call Process, and returns the requested circuits to the NOC when they become available.

The Config Process has one RTR queue for reconfiguration messages from the NOC, including AMS(R)S requests. It also has a VMS mailbox for the CGS Software Backplane Process Control interface, and a mailbox for internal timer notification.

Call Process

The Call Process is the heart of the real-time GC processing. It incorporates the Finite State Machines (FSMs) for Call Processing, MT Management, AMS(R)S Provisioning, and PVT/Commissioning. It also contains resource database access routines, error handlers, timers and utility functions that support the FSMs.

The input queues are prioritized as indicated on the GC CGM Inter-process Communications Diagram. Incoming messages from each queue are processed in order. When an FSM message/event is processed, the Call Process maps the message or event to its state data, performs the state transition processing, and establishes the next state. Errors occurring in a state transition are handled by error routines associated with the current state in the FSM. State data is maintained in the Active Call Record Table, which allows shared read-access for use by support functions in the Monitor process.

The Call Process has one input queue established via the CGS Backplane for signaling units, and Access security Check Fields (generated by the ASK Manager). It also has VMS mailboxes for the CGS Software Backplane Process Control interface, internal time notification, internal messages (such as Circuits Available), AMS(R)S requests, and control group reconfiguration requests from the Configuration Process.

Monitor Process

The Monitor Process provides the following Call Process support functions:
 1. Forward Call Records to the NOC
 2. Buffer Call Records on disk
 3. Save the MT Access Event History on disk
 4. Generate call traffic statistics
 5. Respond to Call Search Requests
 6. Respond to Call Record Leftover Requests Items 1–3 above are performed when a Call record is terminated. The monitor process receives the Call Record from the Call Process, in a Call Termination message. This process forwards the final Call Record data to the NOC, increments counters for call statistics, stores the Call Record on disk for backup in case the NOC goes down, and stores the MT Access Event History on disk. the MT Access Event History buffers that last ten accesses by MT by storing the time stamp of the end of the call, termination reason, and access type (such as MT Management, Call, NR, etc.).

Statistics (Item 4) are generated by the Statistics Manager and polled by the Site Manager (DECmcc Agent) at configurable time intervals. These data are derived from the Call Process (via the terminated Call Records), and stored in shared memory tables for the Site Manager (DECmcc Agent).

Call Search requests (Item 5) are sent by the NOC to request the current Call Record (if one exists) of a specific MT, and its Access Event History. The Monitor has read-access to the Active Call Record Table maintained by the Call Process for retrieving the call ID and call record, if it exists, for a MT.

Call Record Leftover requests (Item 6) are sent by the NOC when they are back online after some period of down-time. The request contains the ID of the last Call Record received by the NOC. The Monitor Process retrieves later records which it buffered on disk while the NOC was down.

The Monitor process has one input queue, established via the CGS Backplane, to receive Call Record Requests and Call Search Requests from the NOC. It has a VMS mailbox to receive terminated call records from the Call Process, a mailbox for the CGS Software Backplane Process Control interface, and a mailbox for internal timer notification.

GC Router Process

This process routes Call Process messages which do not have a Control Group ID. The GC Message Router Process has one input queue established via the CGS Backplane to receive incoming SUs for internal routing. It also has a VMS mailbox for the CGS Software Backplane Process Control interface, and a mailbox to receive reconfiguration messages from the GC Router Configuration Process.

GC Router Configuration Process

This process is an RTR server process to accept reconfiguration transactions from the NOC. This server is only notified of updates when the change affects the Control Group ID of a MT/MIN, IVDM. It cooperates with the router process in the same manner that the Config Process cooperates with the Call Process to complete a transaction.

Router

This Process has an RTR input queue. It also has a VMS mailbox for the CGS Software Backplane Process Control interface.

ASK Configuration Manager Process

The ASK Configuration Manager Process configures the ASK database, based on NOC inputs. The ASK Config Process has one RTR input queue. It also has a VMS mailbox for the CGS Software Backplane Process Control interface.

Check Field Generator Process

The Check Field Generator generates MT Check Fields in response to Call Process requests. It also receives ASK reconfigurations from the ASK Config Process, which it stores in the memory-resident ASK database. This process has one input queue established via the CGS Backplane to receive check field requests from the Call Manager. This interface is via the Message Layer because the ASK Manager may not be co-resident with the Call Process it serves. It also has a VMS mailbox for the CGS Software Backplane Process Control interface, and a mailbox to receive configuration messages from the ASK Config Process.

GC Queues Inter-Process Communications Sequence

Example: MT-PSTN Call

1. When a MT Access Request is received on the real-time CALL event queue, the CALL process sets up the call record, establishes a MT Activity Table entry for the call and determines whether the dialed digits in the Access Request SU are complete.

2. If additional digits are required, the CALL process sends out a request to the MT (see following Note 1 and the following referenced notes) and sets a timer for the expected response.

3. When the additional digits are received, the CALL process cancels the Additional Digits Request timer.

4. The CALL process validates the MT, performs address screening, service permission checks, and routing. If all checks succeed, it allocates circuits and updates the OFFLINE GC CALL UPDATES process.

5. The CALL process requests the Access Security Check Field from the CHECK FIELD process. It sets a timer for the expected response. When the Check Field is received, the CALL process cancels the timer for the request.

6. The CALL process sends out Channel Assignments to the MT and FES. It sets a timer and waits for the Setup Complete message.

7. When the Setup Complete is received from the SLSS, the CALL process cancels the Setup timer, updates the OFFLINE GC CALL UPDATES process, and sets a timer for the Call Status Monitoring interval.

8. When the Call Status Monitoring timer expires, the timer in the CALL Process notifies the Call Manager which sends out a Call Status Request and sets a timer for the response. When the Call Status Reply is received, the CALL process resets the monitoring interval timer.

9. When the Channel Release is received, the CALL process cancels the Monitor timer and closes out the call by releasing resources, clearing the activity table, and sending a call termination event to the MONITOR process.

10. The MONITOR process closes out the call record, updates the OFFLINE GC CALL UP-DATES process, performs any Statistics generation required, sends the call record to the NOC, and Buffers the call record to disk.

Note 1: All messages to/from the MT are sent via the NAP-S.

Note 2: If the response has not been received before the timer expired, the timer in the CALL process would have notified the Call Manager, which would have performed appropriate error handling.

Note 3: The CALL process can process other calls while it awaits for a response from another process on any given call.

GC Queued Inter-Process Communications Example

Incremental Reconfiguration

1. When a distributed database transaction from the NOC is received on the GC's RTR queue, the CONFIG process reads the transaction and prepares an update to the Local GC Configuration database. When the preparation and validation are complete, the CONFIG process waits for a vote request from the NOC. The CALL process cannot access the new data until the distributed transaction is complete.

2. When the CONFIG receives a vote request via RTR, it returns the GC vote. The GC will return VOTE/COMMIT if its local database validation and update preparation were successful, or VOTE/ABORT if an error occurred while processing the update. After casting the GC vote, the CONFIG process waits for a return code from RTR, indicating the final status of the transaction. Final status is determined by RTR from the votes cast by all participants.

3. If the final status of the transaction is COMMIT, then CONFIG sends a message to CALL informing it of the reconfiguration. CALL updates its links to the reconfigured data and acknowledges the completion of the update. CALL can now access the data.

4. When the update is complete, the CONFIG process sends a Reconfiguration Event to the NOC via the DECmcc AGENT process.

Both the Online and Offline GC's participate in a Control Group reconfiguration since the Offline GC serves as another RTR partner in each distributed Control Group transaction. The processing is the same cases.

NCC On/Off Line Switchover Process

As noted earlier, the fully expanded CGS system includes a second NCC or alternate NCC. This separate physical copy of the NCC maintains near real-time communication with the active on-line NOC and the active on-line NCC via the MSS Internetwork using the TCP/IP protocol. The MSS Internetwork communication path allows the alternate NCC to be geographically separated from the on-line NOC and the on-line NCC. The near real time communication allows the off-line NCC to maintain a "hot" standby status such that it could become the active on-line NCC with a minimum amount of elapsed time and "lost processing" once the switch between NCCs is initiated.

In order to maintain an up-to-date status at the off-line NCC, the applicable database updates at the on-line NOC will be issued as RTR transactions to maintain lock-step database concurrence across the two NCCs. The categories of message sent to the off-line NCC include:

MT Customer Configuration

Virtual Network and Routing Configurations

FES Configuration

Channel Unit Pool Configuration

Satellite Resource Configuration

Control Group Operation Parameters

Bulletin Board Data

To maintain lock step with ongoing real time call processing, the off-line NCC receives call processing information from the on-line NCC on a call-by-call basis. The major categories of information moving from the off-line NCC to the on-line include the following:

Call records with frequencies allocated to a call setup

Call records for a call after setup is complete

Call record for a call after the frequencies have been released.

The off-line NCC uses this information to maintain call records and frequency allocations dynamically such that the off-line NCC can immediately assume control of the in-process active call suite and is completely aware of the current in-use frequencies to continue with new call setups and "old" call releases.

The on-line to off-line NCC switch over may occur as scheduled activity (e.g., periodic maintenance, major NCC H/W or S/W configuration upgrade, etc.) or as a result of a failure of the current on-line NCC.

The scheduled switch over process is the following:

The on-line NOC or local NCC operator alerts the on-line NCC to initiate processing phase out and suspend active communication with its associated CGS internal element.

The on-line NCC alerts the off-line NCC that all processing has been suspended and all elements associated with the NCC are waiting for a communication restart.

The off-line NCC commands the on-line NCC to go to passive standby under its own local operator control. At this point the previous off-line NCC is now the new active on-line NCC.

The new on-line NCC begins a communication restart sequence with its associated CGS elements.

This completes the scheduled switch over from an active on-line NCC to the off-line NCC.

The fail over process is initiated by the on-line NOC. The process flow is the following:

The on-line NOC commands the on-line NCC to go to passive standby under local operator control. This is an insurance command to attempt to eliminate the failed NCC from active participation in CGS processing.

The on-line NOC commands the off-line NCC to go active.

The on-line NOC commands all NCC associated elements to suspend communication with the old on-line NCC and wait for an NCC communications restart command.

The on-line NOC commands the new on-line NCC to begin a communications restart with all of its associated elements.

The new on-line NCC begins a communications restart sequence with all of its associated elements. This completes the fail over sequence. If the original active on-line NCC is not capable of fulfilling its role in the fail over sequence, the switch over will be accomplished via NOC operator to NCC operator communication to suspend the operations of the original on-line NCC and then via NOC MMI to command the on-line NOC MMI to command the on-line NOC to pick up the remainder of the failover sequence.

The Gateway Switch (GWS) is the communications hub for Feederlink Earth Stations (FESs) to provide call processing services to MT users and handles cellular Intersystem Handoff (IHO), Automatic Roaming (AR) and Call Delivery (CD).

The GWS provides the following interfaces:

Public Switched Telephone Network (PSTN)

Private Network (PN)

Cellular Terrestrial Network (CTN)

Network Operations Center (NOC)

Station Logic and Signaling Subsystem (SLSS)

Network Applications Processor (NAP)

The GWS acts as a gateway between the users of the satellite system and the Public Switched Telephone Network (PSTN), Private Networks (PN), and Cellular Terrestrial Network (CTN). Within the FES, the GWS connects through Communication Channel Units (CCU) and the satellite system for bearer channel connections to Mobile Terminals.

The GWS also connects through a Station Logic and Signaling Subsystem (SLSS) for a control path to and from the Network Control Center (NCC). The GWS views the MSS call processing resources as cell site(s). The cell site emulation performed by the GC, SLSS, NAPs, and CUs allows the satellite system to be configured into the DMS-MTX as an analog cell site.

With respect to the MSS, the basic functions of the GWS are:

manage the PSTN/PN interfaces manage CTN interfaces receive and process connections and feature control messages from the SLSS processes provide various operational and administrative support for the switching operations of the network provide various Call Service Features to the MT user.

Figure 17:
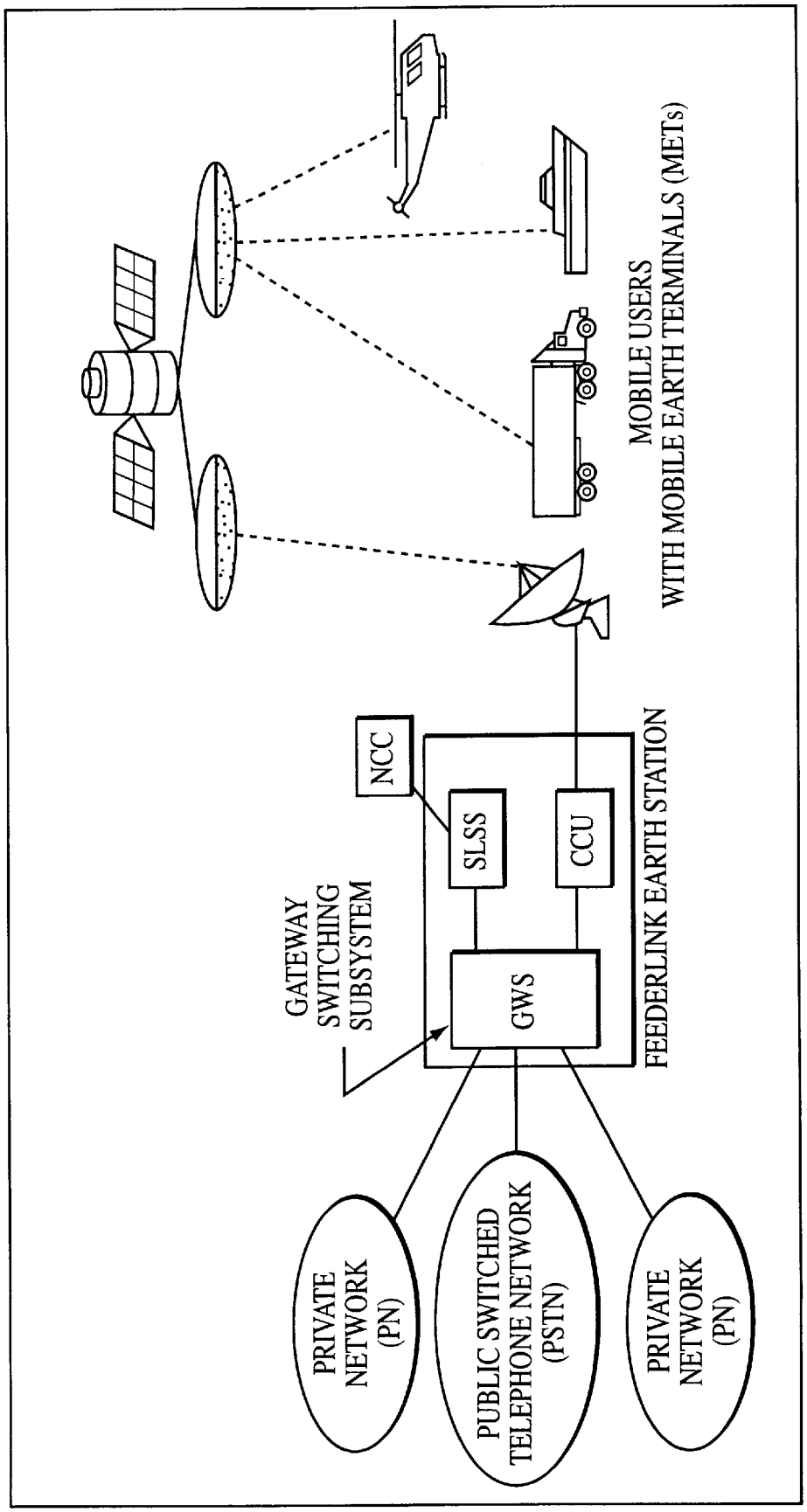
FIG. 17 is an illustration of the basic role of the GWS within the Mobile Satellite Services (MSS) system.

The basic role of the GWS within the Mobile Satellite Services (MSS) system is shown in FIG. 17. As indicated, the GWS acts as a gateway between the users of the satellite system and the Public Switched Telephone Network (PSTN) or Private Networks (PNs). Within the FES, the GWS connects through Communication Channel Units (CCUs) and the satellite system for bearer channel connections to Mobile Earth Terminals (METs). The GWS also connects through a Station Logic and Signaling Subsystem (SLSS) for a control path to and from the Network Control Center (NCC).

Figure 18:
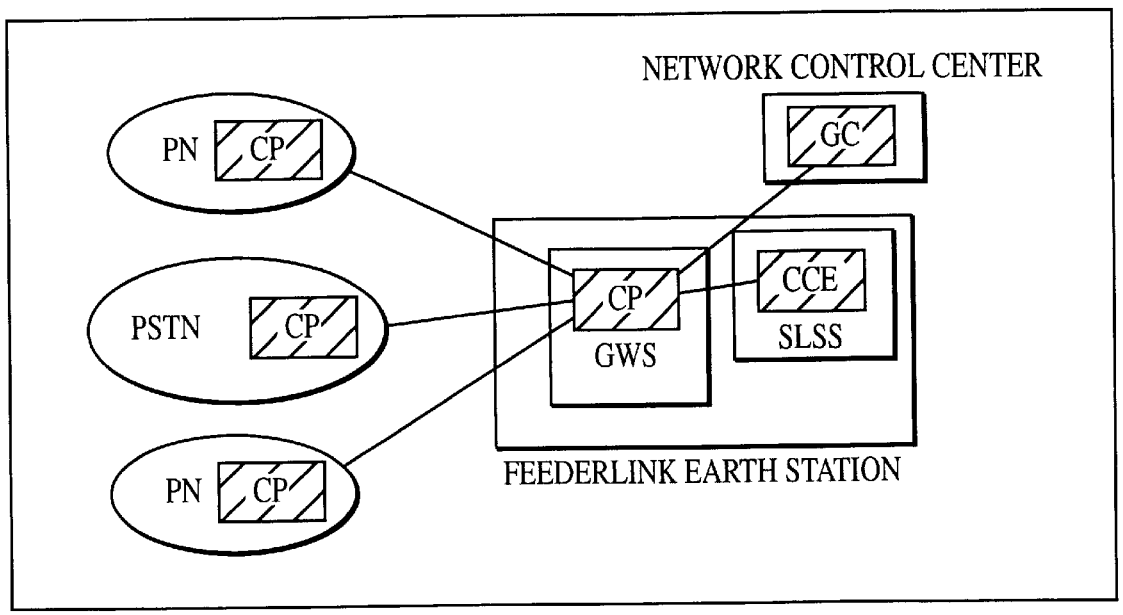
FIG. 18 depicts the basic call processing interaction between the GWS and other elements within and outside of the overall MSS system.

In contrast to the hardware interfaces shown in FIG. 17, FIG. 18 depicts the basic call processing interaction between the GWS and other elements within and outside of the overall MSS system. As indicated, standard Call Processing (CP) software within the GWS interfaces with a Call Control Element (CCE) process in the SLSS and with a Group Controller (GC) processing the NCC.

With respect to the MSS, the basic functions of CP in the GWS are: to manage the PSTN/PN interfaces, receive and process connection and feature control messages from the CCE and GC processes, and provide various operational and administrative support for the switching operations of the network.

In addition to the internal interfaces of the MSS, the GWS CP also interfaces CP control elements of the PSTN or the PNs. In the most basic applications the various CP processes only exchange addressing (dialing) information for call routing. In more advanced applications involving SS7 or ISDN networks, the CPs exchange information for advanced features such as calling number identification, terminal characteristics, calling restrictions, subaddressing, routing requirements, etc.

Note that since the GWS is expected to be a variant of a public network switching system, there will be functional similarities between the GWS CP and the PSTN CP and PN CP.

The GWS physically resides as part of the Feederlink Earth Station (FES) (see FIG. 17). The FES is the network interface point for the interconnection of satellite resources and terrestrial resources. The GWS can best be envisioned as an end-office, connecting to Mobile Earth Terminals (METs) in lieu of subscriber telephones. The METs are special purpose terminal sets communicating, via satellite, to the Feederlink Earth Station.

The METs, in conjunction with other functionality of the FES, can provide circuit switched voice, data and facsimile services. A highly compressed method of voice encoding is used over the satellite channel. Likewise, the satellite channel can accommodate 4800 bps digital data which is converted to voiceband modulated data (in a Hayes compatible modem format) in the CCU which interfaces to the GWS. In addition, the system supports facsimile traffic complying with the Group 3 standard. Not withstanding the above, services appear at the GWS via 64-kbps (DS-0) bearer channels contained within T-1 physical links. Signalling related to MET originated calls is handled via separate signaling links from the SLSS as described subsequently.

The GWS supports the MSS network provision of Mobile Telephony Service (MTS). MTS is defined as voice, circuit switched data, and Group 3 FAX. At the highest functional level, the following telephony functions shall be supported in the MSS.

Establish, maintain and disconnect Mobile Earth Terminal (MET) circuit switched connections.

The generation and reporting of Automatic Message Accounting (AMA) events to be used for subscriber billing and operations purposes.

Support of Operations, Administration and Maintenance (OA&M) functions and interface to external support systems.

Support and interface to voice messaging systems for the network provision of value-added features.

Circuit switched connections may be any one of the following:

MET to MET
MET to/from PSTN (IEC or LEC)
MET to/from Private Network
MET to Alternate Operator Services
MET/PSTN/PN to Voice Messaging System AMA records of call events shall be maintained and reported by the GWS. The basis for this functionality is LSSGR AMA compliant with some unique MSS data collection required.

The functionality of the Gateway Switching Subsystem has been specified, to the extent possible, to be a generic PSTN, digital switching system. It is desirable to minimize the non-recurring engineering effort imposed on potential switch vendors. Toward this objective, the functional requirements are functionally similar to Bellcore's LATA Switching System, Generic Requirements (LSSGR) document, incorporated herein by reference.

The one area recognized as requiring customized engineering is the interface to the satellite resources, as described below.

The GWS interfaces are grouped into four categories: the Telephone Network Interfaces, Mobile Access Interfaces, the Operations Support Interfaces and the Ancillary Equipment Interfaces. Communications Channel Unit connections are bearer circuits (64-kbps DS-0) carrying voice, circuit switched data or facsimile. The connections to the Station Logic and Signaling Subsystem and the Network Control Center are signalling interfaces.

Operations, maintenance and administration interfaces are to the Network Operations Center. Ancillary interfaces, for example, to Voice Messaging systems are also provided. Telephony network interfaces are shown to the left side of the GWS. PSTN interfaces will be to both the Local Exchange Carrier (LEC) and one or more Inter-Exchange Carriers (IEC). Multiple Private Networks must also be accommodated.

Alternate Operator Services (AOS) provided by other companies may be used initially for the support of Calling Card/Credit Card billing and operator assisted calling. This function may also be accommodated using so-called "robot operators" which are a specialized version of an Interactive Voice Response (IVR) system.

Trunk access to the PSTN is required. Physical access shall be via T-1 facilities. Extended Superframe format T-1s with ANSI recommended alarms and performance reporting is highly recommended. PSTN access shall support in-band, multi-frequency signaling to and from one or more IECs and the LEC.

Trunk access is also required to Private Networks. Again, physical access shall be via T-1 facilities with analog interfaces, if required, being accommodated with channel banks outside the scope of this specification. Again, ESF format T-1s are recommended.

Alternate Operator Services may be used in the network for the provision of operator assisted calls and credit card billing validation. Physical access to the AOS service provider shall be via T-1 facilities. Collectively, the resources required to support satellite communications are referred to as the Satellite Resources. These resources include the Communications Channel Units, Signaling Channel Units, the Station Logic and Signaling Subsystem and the Network Control Center. Functionally, a GSM 'A' interface is recommended because it best accommodates the fundamental requirements of the satellite interface.

The GSM Recommendation 'A' interface provides the two fundamental characteristics necessary to support the MTS requirements; 64-kbps bearer channels and out-of-band signaling channels. Out-of-band signalling is required to support the interactive nature of call processing between the GWS and the NCC. The NCC has responsibility for three primary functions, as related to the Gateway Switching Subsystem and call processing functionality.

Management and allocation of the Satellite Resources
Interworking with Cellular networks for Mobility Management
Real-time management and administration of the subscriber database Because of this parsing of functionality, the GWS must interwork with the NCC (via the SLSS) on all call attempts. As originating attempts are presented at the Communications Channel Units, signalling and subscriber information, necessary for the handling of the call attempt, will be communicated across the SLSS signaling interface.

Likewise, terminating attempts from the PSTN or private networks, to a MET subscriber cannot be handled until the GWS and NCC have communicated to identify the satellite resources to be used, and any subscriber-related data necessary in processing the call.

The Communications Channel Unit interface shall be via DS1 cross connect facilities. Each DS1 cross connect signal provides 24, 64-kbps (DS-0) PCM channels. Communications Channel Units have no fixed association with MET terminals or subscribers. This association is supplied to the GWS on a per call basis by the NCC.

Note: A DS1 cross connect signal is functionally equivalent to a T-1 signal that is used for equipment interconnections between equipments in a building.

Because of the integral role that GWS/NCC communications (via the SLSS) plays in call processing, the SLSS interface must be redundant, be traffic dimensionable, provide for reliable communication of messages, provide reliable communication subsystem recovery in the event of hardware or software failures, and support the OSI model for open systems interconnection. Signalling System 7 (SS7) is recommended as the most robust signaling protocol available to satisfy these requirements.

The primary function of the Network Operations Center (NOC) is the non real time management and control of MSS resources. The GWS is required to interface with the NOC for the following functions.

System surveillance and monitoring
Error logging and tracking
Control of diagnostic testing and result analysis
Management of network restoration procedures
Accumulation of AMA call events
Database management and administration
Accumulation and reporting of network performance statistics
Accumulation and reporting of network configuration data
Security Management The Gateway Switching Subsystem shall interface to the NOC for its internal Memory Administration, AMA Teleprocessing, Network Management, Measurements and Statistic reporting and System Status Monitoring and Surveillance.

The NOC interface(s) shall meet OSI requirements for Open Systems Interconnection, such as X.25. The interface (s) shall support multiple physical or logical channels for each function. If multiple logical channels are provided on a single physical interface, each logical segment of the interface shall be dimensionable based on the data throughput demands placed on it.

The Traffic Data Collection System is referenced as the interface for the communication of traffic measurements and statistics to the NOC. This interface is specified in LSSGR FSD 45-09-0100. The GWS interfaces with the NOC to provide remote memory administration functionality. The Memory Administration Interface shall be provided per the requirements stated in LSSGR FSD 45-01-0701.

The GWS AMA Teleprocessing Interface is provided in the form of an AMA Transmitter (AMAT), permitting the store, poll and forward transmittal of GWS collected AMA records to the NOC. This interface meets generic requirements of an AMAT. Network management messaging is defined in Bellcore LSSGR, FSD 45-18-0403 and FSD 45-09-0100.

Remote Switching Maintenance Interfaces is provided in either synchronous or asynchronous form. Bellcore LSSGR FSD 35-08-0100 and FSD 35-08-0200 provide details of those interfaces. The synchronous interface is preferred. This interface supports a Voice Messaging System with the capability of delivering original called number identification for forwarded numbers so the voice messaging system can provide personalized greetings.

Figure 19:
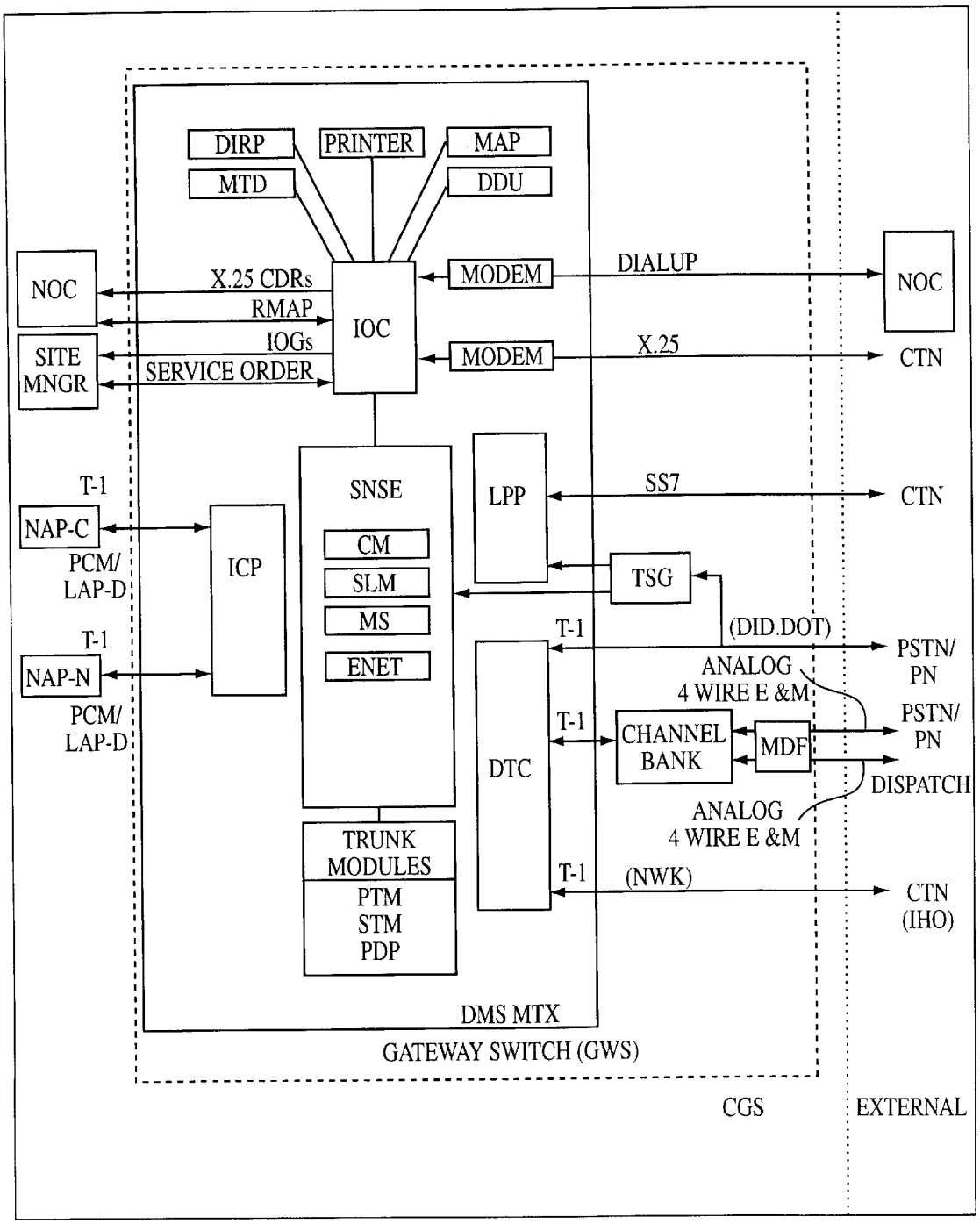
FIG. 19 is a functional illustration of the Gateway Switch.

The Gateway Switch consists of multiple items illustrated in FIG. 19. The DMS-MTX SNSE is the main component of the GWS. This component provides the control to perform call management and system control functions. The SNSE was chosen for the optimal cost and size. This configuration supports a 16K port switch. The delivered hardware is Motorola 68020/20 MHz based. The SNSE consists of the following sub-components:

Message Switch (MS)—This component is commonly referred to as the DMS-BUS. The DMS-bus is the messaging hub of the system. The message switch is a fully duplicated entity that provides message routing between system components. A 32 bit MC68020 microprocessor, supported by 6 megabytes of memory, manages the overall performance of the DMS-bus.

Enhanced Network (ENET). The third shelf of the SCC cabinet contains the ENET. The ENET is a conventional matrix timeswitch designed to achieve high density at low power consumption. The ENET provides a duplicated, junctorless, nonblocking network. The ENET Cross-points are optimized for a 16K channel network.

Computing Module (CM)—The bottom shelf of the SCC cabinet contains the CM. The CM is fully duplicated, synchronized, computing module. The CM utilizes the 32 bit Motorola MC68020 microprocessor. There are 216 megabytes of call and program store capacity (maximum growth) in each CM.

System Load Module (SLM)—The bottom shelf of the SCC also contains the SLM. The SLM provides for rapid loading of office images and updates. It consists of a 600 megabyte hard disk and a 150 megabyte high-speed streaming tape drive to permit fast memory loading. There are two SLMs. Each is directly connected to its corresponding CM.

The Intelligent Cellular Peripheral (ICP) is a dual shelf (ICP 0 and ICP 1) peripheral designed to provide the necessary functions for supporting a call processing interface for cell site communications. The dual shelves operate in hot standby mode. That is, one shelf is active, providing the necessary processing and control functions, while the adjacent shelf is in hot standby mode, able to take over if a fault occurs on the active shelf. The call processing interface handles all signaling between the DMS-MTX and the NAP/SLSS to support incoming and outgoing calls, and intersystem handoff. The ICP interface to the NAP/SLSS is done via cell site emulation. The satellite resources (GC, SLSS, NAP, CU) emulate cell site(s) for the ICP. Each "cell site" communicates to the ICP via LAPD communications on a DS0 of the T1 connecting the satellite resources to the GWS. The ICP views the satellite resources as multiple analog cell sites.

The communicating to and from a cell site is done using a Layer 3 proprietary Northern Telecom cell site protocol. In addition to providing the necessary mechanism to allow the MSS to interconnect to the GWS and provide call processing services, the emulation of a cell site presents some situations that are applicable to cellular telecommunications, but do not have any meaning to satellite telecommunications. These situations are handled by the SLSS and NAP in a manner to satisfy the ICP protocol.

The following list outlines the hardware support that an ICP provides for connecting to the MSS.
10 T1s per ICP
240 DS0 Channels
2 DS0s per Cell Site used for LAP-D Communication (1 Active, 1 Standby)
118 DS0 Voice Connections per Cell Site (Maximum)

The ICP connects to the DMS-MTX via one DS 512 fiber link. The DMS-MTX can accommodate seven ICPs providing 1512 channels between the GWS and the NAP/SLSS.

The Digital Trunk Controller (DTC) is a dual shelf (DTC 0 and DTC 1) peripheral designed to provide the necessary functions for supporting trunk terminations to the outside networks. The dual shelves operate in hot standby mode. That is, one shelf is active, providing the necessary processing and control functions, while the adjacent shelf is in hot standby mode, able to take over if a fault occurs on the active shelf. The DMS-MTX will accommodate thirteen DTCs to provide for 255 T-1 connections. (150 CTN, 105 PSTN/PN—max configuration)

The DTC provides the following:
T1 trunks to process incoming and outgoing call processing (DID and DOT trunks)
T1 trunks to provide an interface to private network PBXs.
T1 trunks to Voice Mail systems (Option)
T1 trunks for Intersystem Handoff voice connections to the CTN (AMSC)
T1 trunks to PBX to provide support for administration
T1 trunks to a Channel Bank for four wire E&M connections The DTC connects to the DMS-MTX via one DS512 fiber link. The DTC can support up to twenty T1s. This provides 480 channels per DTC.

The Link Peripheral Processor (LPP) in the DMS-MTX provides an interface to Northern SS7 networks to provide the following:
CTN SS7 network to provide point to point IS-41 interface over an F-link to another SS7 CTN node.
CTN SS7 network to provide IS-41 messaging interface to an STP over a standard A-link.

The LPP connects to the DMS-MTX via sixteen DS30 links. The Input/Output Controller (IOC) provides the interfaces for the microprocessor based Input/Output Device (IOD) controllers. The IOC relays messages to IOD controllers.

The IOC in the DMS-MTX provides the interface for the following devices:

Maintenance and Administration Positions (MAP)—The MAP is used for overall maintenance and administration of the DMS office. The MAP is a standard VT100 format that provides access to switch table sand configuration.

Printers—The printers connected to the IOC are utilized to dump log reports and operational measurements to paper.

Disk Drive Units (DDU)—The DDU consists of a disk drive and power converter card. The purpose of the DDU is to provide storage for CDRs, log files, and other switch output files.

Magnetic Tape Drive (MTD)—The MTD is a 9-track tape unit used to store data for applications. These applications include OMs, trouble diagnostic data, CDRs, customer data modification, and office data modification.

Device Independent Recording Package (DIRP)—This is part of the IOD subsystems and operates under the control of the IOC. The main purpose of DIRP is to redirect output from switch processes to output devices such as printers and disk drives. DIRP controls the data flow from originating subsystems such as CDR, OM, of JF, and the recording devices on which the data is to be stored.

X.25 layer 2 and Layer 3 IS-41 to the CTN—The X.25 connections provided t the CTN provide the carriage of IS41 signaling to and from other Mobile Switching Centers (MSC)s. This connection can operate at 9.6 kbps, 19.2 kbps, or 56 kbps depending on the card and type of X.25 connection/modem.

Call Detail Record (CDR) Interface—The CDR interface provides the mechanism for the transfer of billing records from the switch to a peripheral device at near real time. For the MSS this peripheral device is the Network Operations Center (NOC).

Dial up Connection Interface—The Dialup Connection allows the transfer of switch data over a telephone line. These interfaces are commonly used as remote MAPs.

Operations and Maintenance Connections—The O&M interface is provided by a connection through the IOC to an external device for the transfer of Logs and OMs from the switch to a device for processing.

The DMS-MTX contains additional devices used for trunking. The MCAM cabinet type contains the following DMS-MTX devices:

Package Trunk Module (PTM)—The PTM is a system peripheral module that encodes and multiplexes incoming speech from a maximum of 30 analog trunks into 8-bit pulse code modulation format. The PTM combines information with internal and supervisory control signals for transmission at 2.56 mbs to the network.

Service Trunk Module (STM)—The STM is a reduced size Maintenance Trunk Module (MTM). The MTM primary function is to interface service, test, and maintenance circuits. Each STM operates independent of the other and functions as a separate peripheral module. The STM accepts analog trunks, digital service circuits, or both, and processes the signals to a common PCM format. One type of STM is the Digital Recorded Announcement Machine (DRAM). The DRAM provides recorded announcements that have been stored in digital format. The DRAM can provide fully digitized voice announcements for up to thirty separate channels simultaneously. A fully configured DRAM can provide up to sixty-four separate announcements.

Power Distribution panel (PDP)—The PDP performs the power source distribution for the DMS-MTX.

The DE-4E Smart Terminal is the chosen Channel Bank for CGS. This Smart Terminal is an intelligent microprocessor based EMI compliant system designed to provide point to point private lines. The single-digroup DE-4E Smart Channel Bank is capable of housing up to 24 "service adaptive" channel units. The channel units are available for two wire or four wire circuits and various signaling including E&M type 1, 2 and 3.

The Timing Signal Generator (TSG) is used to derive system clocking for SS7 signaling. The TSG derives its timing from T-1s connected to a toll office with a stratum three or higher clock. The TSG then distributes timing to the various components. Note that the TSG is only used when SS7 signaling is required. The DCD-400 from Telecom Solutions is the chosen model for the GWS TSG.

When the TSG is not used to provide system clocking, a standard clock card in the SNSE cabinet is used to distribute clocking to the DMS-MTX.

To provide the ability to patch T-1s from the DTC and ICP to various other pieces of hardware, Channel Banks, MUXs, and MAPs for example, the MTX is equipped with two Digital Signal Crossconnection Patch Panel (DSX) patch panels, such as the DSX-29/56 model manufactured by ACD Telecommunications. The patch panel provides the following:

56 connections total

Wire-wrap rear cross-connects

Horizontal and vertical rings

Flush 3" or 4" mountings

Jacks numbered A 1–28, B 1–28

Red flashing LEDs

Bantam jack monitoring and patching

The Main Distribution Frame (MDF) is the demarcation point for four wire E&M trunks.

The GWS software and hardware will provide for the following Voice Service Features in addition to the basic call processing.

Call Forwarding Unconditional—The GWS will control the forwarding of calls made to MT users that have activated this call forwarding feature. When this feature is activated, calls are forwarded to the CFU number without attempting to contact the MT user.

Call Forwarding Busy—The GWS will control the forwarding of calls made to MT users that have activated this call forwarding feature. When this feature is activated, incoming calls to a MT are forwarded if the MT is involved in another call. Note that the incoming call must be to the same MIN that the MT is currently using.

Call Forwarding No Reply—The GWS will control the forwarding of calls made to MT users that have activated this call forwarding feature. When this feature is activated, incoming calls to a MT are forwarded if the MT either does not respond to the page request, or times out ringing.

Call Waiting—The GWS will control this feature. If a MT user is involved in a call and receives another call to that MIN and has Call Waiting, the DMS-MTX puts the incoming call on hold and applies a 440 Hz tone to the voiceband to notify the MT of the other call. If the MT user decides to toggle to the other call, the DMS-MTX connects the second call to the MT and puts the original call on hold.

Conference Calling—The GWS will control this feature. If a MT user decides to add a third party to a call (the DMS-MTX supports a maximum of three parties in a call), the MTX puts the first call on hold, allocates a conference port and routes the second call. Once the MT user signals the MTX to conference the calls, the MTX connects all three parties together. If the MT who originated the first call was the originator of the conference, and he hands up, all parties are disconnected.

Call Transfer—The GWS will control this feature. If a MT was called by another party and wishes to transfer the call, the MTX puts the first call on hold and allocates a conference port and routes the second call. At this point there are three options for the MT.

Option 1 —Hang up before the party answers. In this case the MTX will transfer the call.

Option 2 —Wait for the other party to answer, talk and hang up without ever conferencing in the other party from the first call. At this time, the MTX will transfer the call.

Option 3 —Wait for the other party to answer, conference in the other party. After conversing in a conference, hang up. At this time, the MTX will transfer the call.

Call Forwarding Congestion—The GWS will control this feature. If the situation arises at the GWS where all of a particular trunk group is busy to or from a switch, the DMS-MTX has the capability to datafill a secondary route that will be used if the primary route is busy or out of service. There are two other possible call forwarding scenarios that the switch addresses. First, if there are no channel units available for a particular call, the MTX will send the call to an announcement. Next, if there are channel units available, but no satellite frequencies, the MTX will either send the call to the page timeout announcement, or reroute the call if the MT user has this feature activated for the particular MIN being called.

Call Barring—The GWS will control part of this feature. The GWS will validate the MIN and ESN of a MT either via a lookup in the HLR or by communicating to the Home MSC of the MT via IS41. The GWS provides line options in the HLR to allow restrictions such as denied originations (DOR), denied terminations (DTM), or suspended service (RSUS, SUS) to be placed on MT users.

Operator Assistance—The GWS will control this feature. The DMS-MTX provides the ability to route calls that request operator services to a route that will send the call to an operator switch.

Alternate Account Code Charging—The GWS provides the ability for users to append a digit code (Account Code) at the end of the dialed digit string to differentiate calls made from different accounts. This string is not validated by the MTX and is strictly for customer billing clarification.

The call detail record (CDR) system is used to record comprehensive billing and other data on all calls. The CDR system accepts call information data from the DMS system. The data is then recorded on a tape, disk, or sent to the NOC by using the standard Multi-Network Protocol (MNP) protocol manufactured by Northern Telecom used to transfer CDR billing data from a DMS-MTX switch to a remote billing processor at near real-time.

The CDR's are recorded on the hard disk at the GWS and sent to the NOC by the X.25 (MNP) using a V.35 interface. There is a redundant X.25 link that can be enabled in the event of a failure of the primary path to the NOC. Since the CDRs are written to the hard disk at the GWS, the transfer on the backup link can begin at the point where the transfer failed in the case of a redundancy switch. This method insures that CDR's are not lost in the event of a failure in the primary path from the GWS to the NOC. The CDR fields are described in Table A.

The message protocol used for MNP contains the following Protocol Data Units (PDU):

ACS-SFO: Access request message—Start file outgoing
This message contains the information necessary for the far end to begin establishment of a file transfer. (35 octets)

STS-ACK: Status message—Access request acknowledge
This message is sent in response to the ACS-SFO message when the NOC accepts the billing file request. (3 octets)

CNT-PRT: Control message—Set device to print mode
This message is sent to the NOC when the GWS is ready to transfer data. (2 octets)

CNT-RED: Control message—Set device to read mode
This message is sent by the NOC to start the file transfer. (2 octets)

STS-EOB: Status message—End of block
This message contains the sequence number of the previous sent data block. This message is sent by the GWS to describe the data block just sent. (8 octets)

CNT-RNB: Status message—Request next block
This message contains the sequence number of the received data block. This indicates that the data blocks up to the sequence number were successfully received by the NOC. (6 octets)

STS-EOF: Status message—End of file
This message is sent by the GWS when the entire billing file is transferred. (2 octets)

STS-CPL: Status message—Access complete
This message is sent by both the GWS and the NOC to wrap up the current session. (2 octets)

DATA: Application Data
This message is a 2K octet block of data, and is followed by the STS-EOB message. It contains billing information which is retrieved from the billing file on the disk.

The following describes the basic message flow between the GWS and the NOC for the transfer of CDRs via MNP.

Step 1: The GWS has a billing file ready to transfer. The SVC of X.25 at layer 3 has been established between the GWS and the NOC.

Step 2: The protocol messages have been exchanged for startup, and both ends have recognized the billing file. At this point, the file transfer is ready to start.

Step 3: The data blocks are sent from the GWS to the NOC. In the opposite direction, acknowledgement messages are sent back to the GWS to notify it of successful transfer of a data block. This example, shows a window size of one. This means that a CNT-RNB is expected before another data block is sent from the GWS. For applications with larger window sizes, i.e., greater than 1, the GWS will not wait for a NTR-RNB for a data block before transmitting the other data blocks contained in the window. The CNT-RNBs for each block are still expected, but can arrive back at the GWS in any order.

Step 4: When reaching the end of the billing file, the STS-EOFmessage is sent to the NOC to notify it of the completion of the file transfer. Subsequently, the STS-CPL message is exchanged to end the session.

Step 5: The GWS shuts down the X.25 SVC link between the GWS and the NOC.

Some MSS system users have voice communication requirements that are not met by MTS and Mobile Radio Service (MRS). They need to communicate in a virtual network arrangement that allows each member of the group to hear what any other user is saying. Each member of the group can also talk when needed. The system behaves like a radio multi-party line. Public services and law enforcement agencies are typical users of this service, which is normally provided by either traditional terrestrial radio networks or by the more recent trunked radio systems. These trunked systems, generally in the 800–900 MHz band, provide groups of end users with virtual private systems by assigning frequencies to CUGs on a demand basis. The virtual network service is meant to be the satellite equivalent of terrestrial trunked systems ("trunking" for short), and could be pictured as a "Satellite Trunked Radio Service", or "Satellite Trunking".

The virtual network service provides the capability described in the previous paragraph in a cost effective manner:

- as one shared satellite demand period circuit per virtual network is utilized rather than one circuit per mobile user, the cost per minute of a group conversation would be much less expensive to the owner of the group, and
- as the call set-up time for one shared circuit per virtual network compared to an MRS multi-user conference set-up time is likely to be more acceptable to a group end user/operator, who normally expects to be able to talk as soon as the handset/microphone is taken off-hook.

Figure 20:
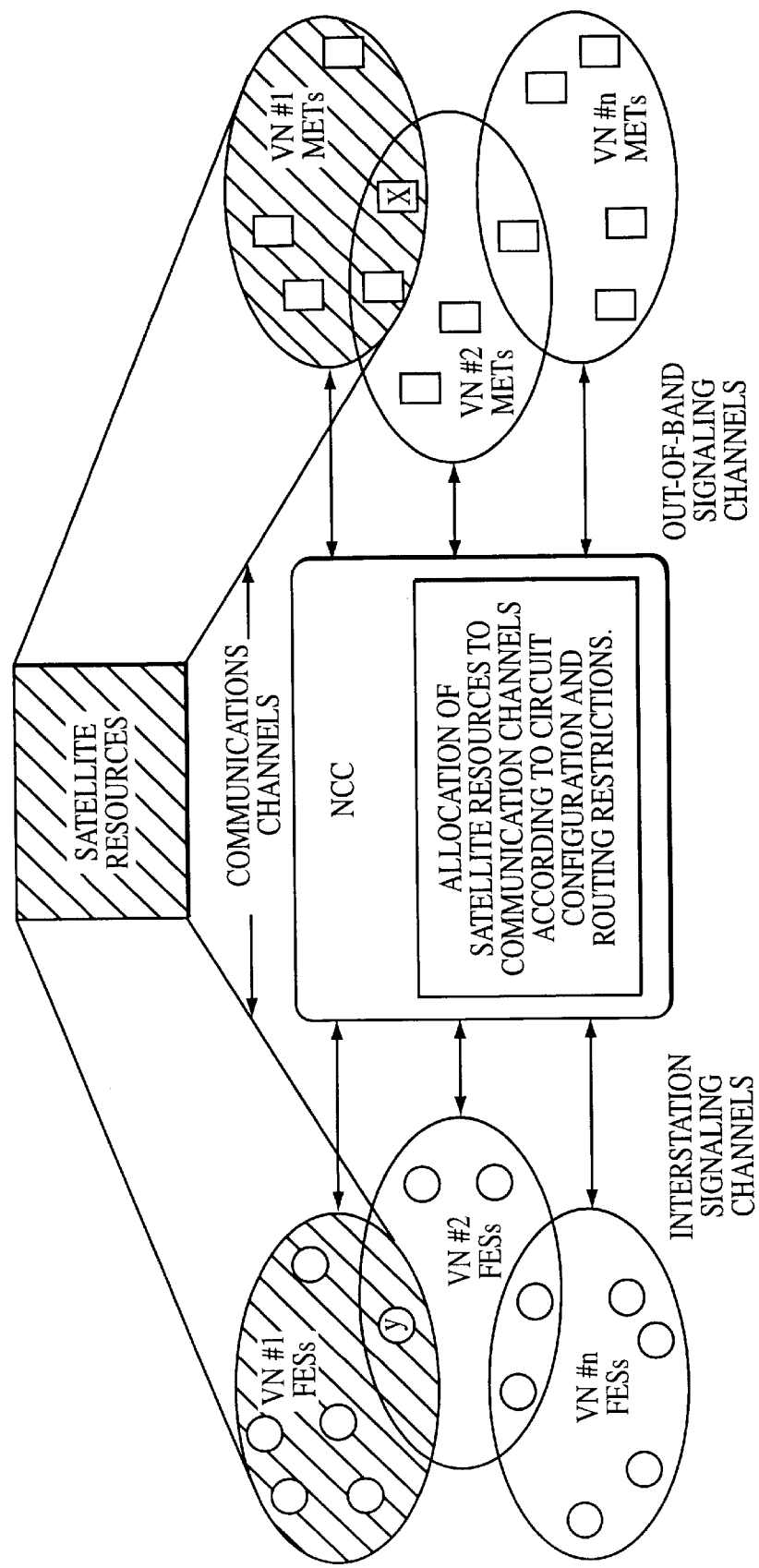
FIG. 20 is an illustration of a virtual network associated with a group of FESs and METs.

A virtual network is defined as a partition of METs and FESs within a control group having particular connectivity attributes. Each virtual network has a defined set of service features to which its users may subscribe as a whole or individually. As illustrated in FIG. 20, a virtual network is associated with a group of FESs and METs. It is possible for an FES to belong to a particular virtual network or be shared by multiple virtual networks. It is also possible for a MET to belong to a maximum of 16 different virtual networks. Interconnection between different virtual networks is supported by the MSS system.

The database files on the METs and the communications nets of a subscribing organization comprise a Virtual Network (VN) within the MSS system, and is assigned a Virtual Network identification number. All of the METs in a VN may communicate with each other.

Figure 21:
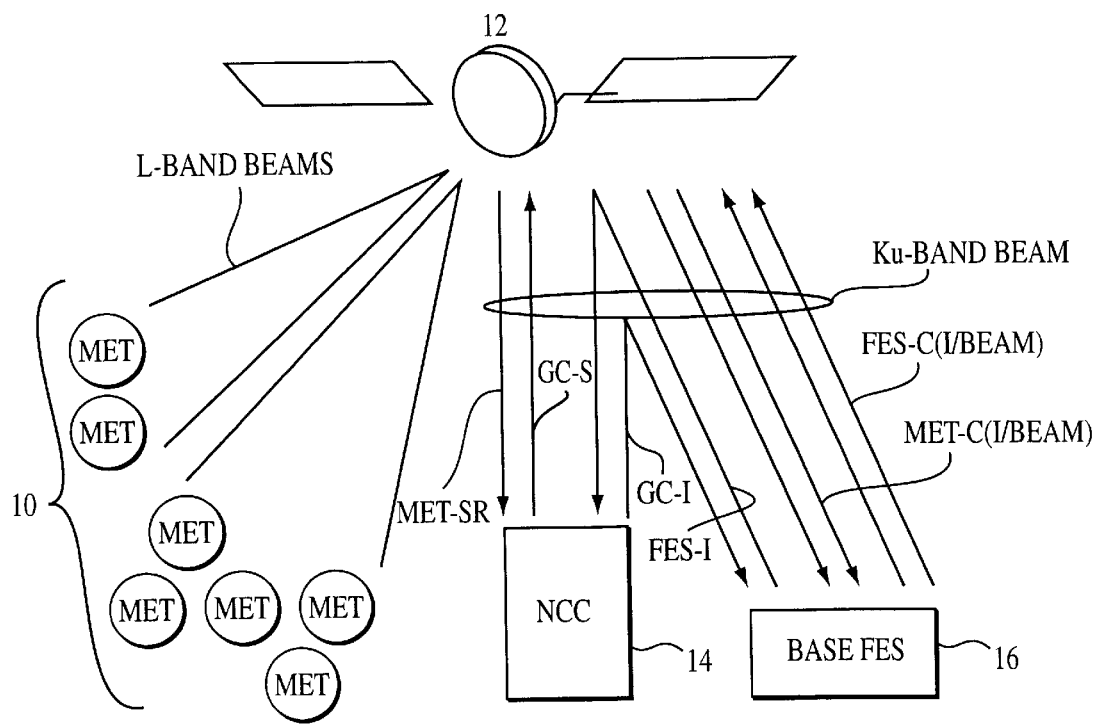
FIG. 21 illustrates the basic concept and elements involved in establishment of communications and control in the virtual network system.

An overview of the MSS system with the VN service is illustrated in FIG. 21. FIG. 21 illustrates the basic concept and elements involved in establishment of communications and control in the virtual network system. METs access the system via one or more L-band beams. Each beam contains one or more signaling channels for network control and call establishment and a number of communications channels for provision of virtual network services to METs.

The L-band frequencies are translated to Ku-band frequencies by the satellite 12. The Network Control Center 14 is responsible for the real time allocation of channels to support virtual network calls. The base Feederlink Earth Station 16 is responsible for re-transmission on the outbound channel of the MET transmissions received on the inbound channel, control of the virtual network call, and interfacing the virtual network call to terrestrial private networks.

Virtual network service is available to users in the virtual network group on subscription to MSS. A subscribing organization may comprise a number of METs grouped by their communication needs. A virtual private communication net is established for each of these groups or subgroups.

Figure 22:
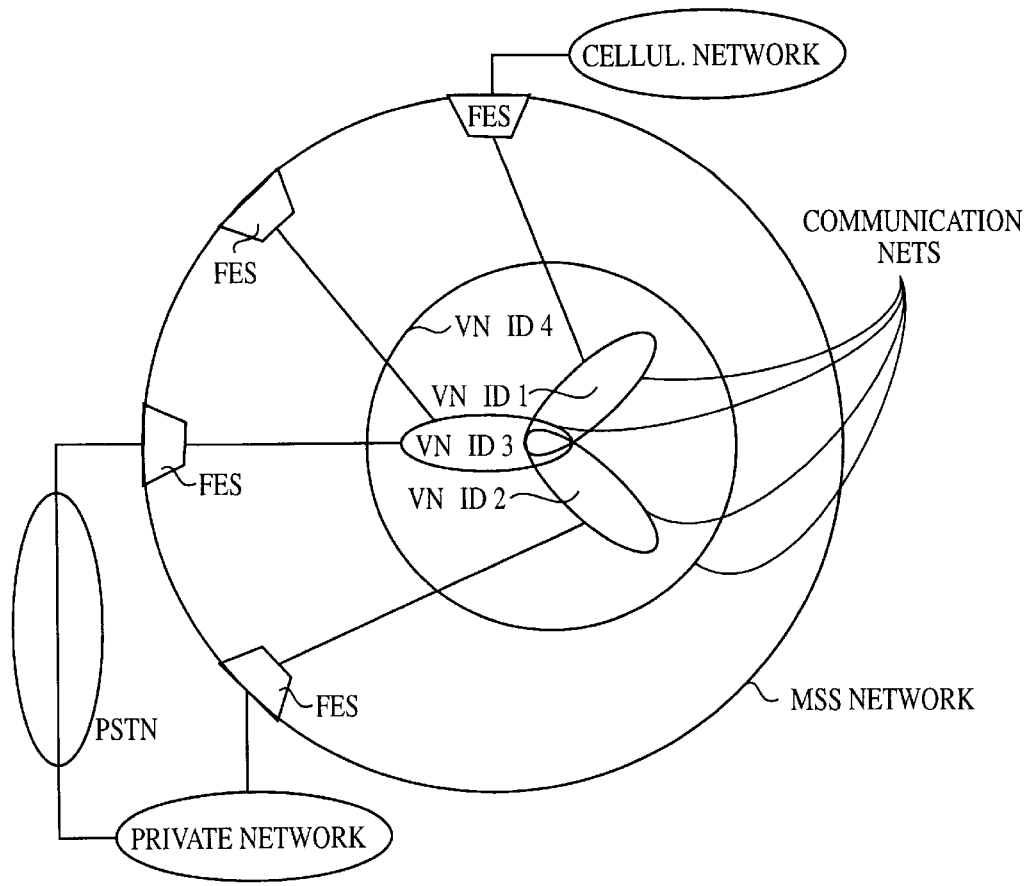
FIG. 22 illustrates an example of a virtual network service subscribing organization with several communication virtual networks.

The base FES 16 can interconnect the virtual network call to terrestrial private networks so that a dispatcher located within the private network can participate in the conversation. A dispatch facility may be directly connected to the base FES 16, or may use leased PSTN or dial-up access, or may use a Mobile Radio Service (MRSA) circuit. An example of a virtual network service subscribing organization with several communication virtual networks is depicted in FIG. 22.

The virtual network MET operates in a virtual network and receives voice transmissions from all other MET users in the same virtual network group, and the base FES. The MET supports virtual network service on a single demand period circuit per beam, which is shared by the entire group. The MET requiring communications will be given the virtual network (VN) ID for the net and since different VN groups may be necessary for different purposes, the MET may be given a number of different VN IDs.

VN IDs may represent organizational groups such as fleets or sub-fleets. VN IDs may represent functional groups such as a command unit which draws on mobile users from more than one fleet or sub-fleet. VN IDs may represent geographic configurations such as an east or west area, or both.

Virtual Network Configuration

Each GC receives from the NOC, via the NCC Controller, the Virtual Network configuration database from each customer network. The database is processed and organized to support and optimize all real-time call processing accesses for Virtual Network attributes and configuration data. During operation the GC shall support the incremental addition to, deletion from, or modification to, the Virtual Network configuration database, under direction of the NOC.

To support configuration changes each GC shall control the operating state of its Virtual Networks in accordance with NOC directives. Transitions between the following Virtual Network operational states shall be supported:

a. Inactive/initialized. Ready to become active.
b. Active—normal. Processing traffic normally.
c. Active—unloading. Blocking new calls and servicing disconnects to unload traffic.
d. Active—unloaded. Blocking new calls; traffic has been unloaded.

The NCC Controller is able to display each GC Virtual Network configuration and status tables locally via the NCCTE man-machine interface, or to transmit Virtual Network configuration and status tables upon request to the NOC via the MSS Internetwork.

Virtual Network Call Status

These tables contain call status data for each Virtual Network:

a. Call data records:
  i. Call Identifier
  ii. FTIN
  iii. RTIN
  iv. MET supplied dial digits
  v. Terrestrial network supplied dial digits
  vi. MET port id
  vii. Service type (voice, data, fax and expansion to new service types)
  viii. Connection type (MET to terrestrial, MET to MET, terrestrial to MET.
  ix. Control Group ID
  x. Virtual Network
  xi. Advanced features used
  xii. FES Terminal
  xiii. Circuit pool utilized.
  xiv. L-band beam accessed.
  xv. Forward link Ku-Band frequency used.
  xvi. Forward link L-Band frequency used.

xvii. Return link L-Band frequency used.

xviii. Return link Ku-Band frequency used.

xix. Forward link power level authorization.

xx. Queueing flag.

xxi. Priority for queueing.

xxii. Date/time of access request.

xxiii. Date/time of channel assignment.

xxiv. Date/time of setup complete.

xxv. Date/time of channel release.

xxvi. Call clearing reason code.

b. Aggregate calls in progress.

c. Current call processing completion rate.

d. Current call blocking rate.

Virtual Network Configuration Table

This table defines the configuration databases for each Virtual Network, served by the Control Group. The database provides a complete definition of each Virtual Network's service permissions, routing rules, and address screening constraints. This table also contains the NOC assigned operating state for each Virtual Network—Inactive/Initialized, Active-Normal, Active-Unloading, Active-Unloaded. The GC supports foreground and background Virtual Network Configuration tables to facilitate the network configuration change procedures.

Virtual Network Functional Characteristics

This section describes the virtual networking capabilities offered by the MSS. Generally from a functional perspective, a virtual network involves membership rules, a dialing plan, and a set of dialing allowances and/or restrictions.

Each MET is a member of at least one VN. A MET is optionally a member of up to 15 additional VNs. One VN of which a MET is a member be denoted as the default VN for that MET. MET VN membership(s) is provided on a subscription basis. Dual-mode METs (METs capable of both cellular and MSS operation) that are registered in the MSS shall constitute a specific VN denoted VN-C. No other METs is members of VN-C. VN MET addresses are selected from blocks of numbers allocated from the North American PSTN. Since MET numbers are selected from the North American PSTN, and no number translation is performed, MET and PSTN/PN numbers are disjoint. A MET user has the capability to select, on a call-by-call basis, the specific VN within which he/she wishes to act; this VN is denoted the "acting VN". The MET user indicates the acting VN by an optional suffix. If no suffix is presented, the acting VN is the default VN defined for the MET. The MET must be a member of any VN selected by the suffix.

Within an acting VN:

a. MET-to-MET calls utilize 7-digit (NXX-XXXX) dialing, or 10-digit (NPA-NXX-XXXX) dialing. Other dialing plans for MET-to-MET calling may be offered as options.

b. MET-to-PSTN/PN calls utilize 10 digit dialing, international dialing and dialing access to operators, carriers, etc., as offered by the connected PSTN/PN.

All dialed numbers are subject to screening based on the VN rules and the screening associated with the individual MET. In VN-C (for dual-mode METs registered in the MSS) registered dual-mode METs shall use their usual PSTN number.

For each VN, it is possible to define call screening (call barring) rules (restrictions and allowances) for every MET in the VN. Screening rules for MET originated calls are definable to govern the allowance of a call originating at every MET in the VN. Screening rules are definable to govern the acceptance of a call presented to every MET in the VN. In addition to screening rules defined for all METs in the VN, screening rules are separately definable for individual METs within the VN.

For MET-originated calls, the following general rules are available based on the called number.

A MET-originated call may be permitted to:

a. Any MET number in the VN.

b. No MET number in the VN.

c. Any PSTN/PN number.

d. No PSTN number.

e. Only domestic US PSTN numbers.

f. Only PSTN numbers within NPAs on a specified NPA list.

g. No PSTN numbers within NPAs on a specified NPA list.

h. Only to MET and/or PSTN/PN numbers on a specified list.

Figure 23:
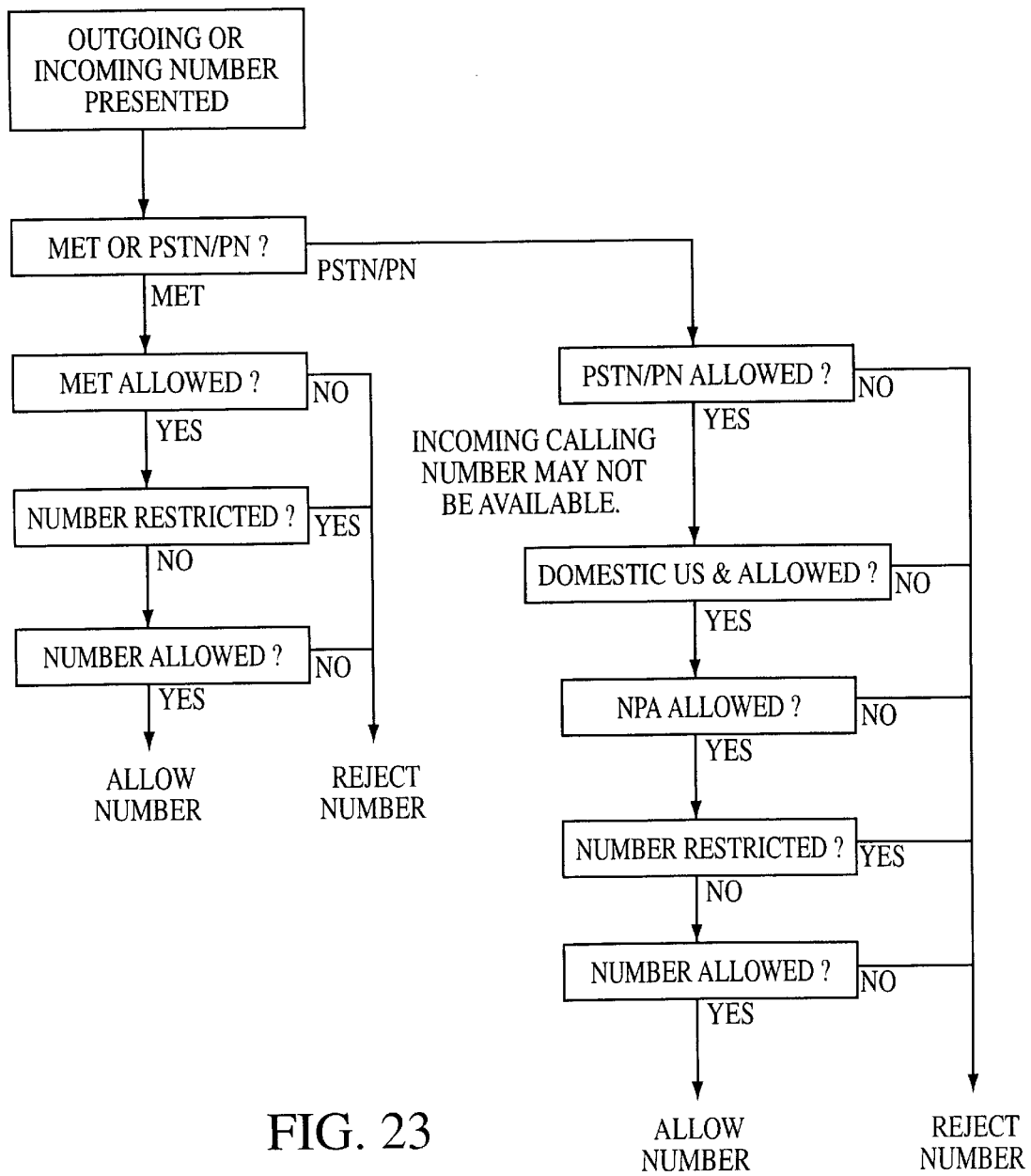
FIG. 23 is a decision tree of the order of application of the virtual network rules.

Order of application of these rules shall be as indicated by the decision tree in FIG. 23. For calls presented to METS, the following rules are available based on the call source (when available)

A MET-presented call may be permitted from:

a. Any MET number in the VN.

b. No MET number in the VN.

c. Any PSTN/PN number.

d. No PSTN/PN number.

If calling line identification presentation is available from the PSTN/PN, a MET-presented call may be permitted from:

e. Any domestic US PSTN number.

f. Only PSTN numbers within NPAs on a specified NPA list.

g. No PSTN numbers within NPAs on a specified NPA list.

h. Only from MET and/or PSTN numbers on a specified list.

Order of application of these rules are as indicated by the decision tree in FIG. 23. Additional call screening rules may be provided. For example, a MET restricted from making any outgoing call is restricted from Call Transfer since that feature involves outgoing call placement.

MET Features

This section provides a description of each feature available to MET users. Availability of a feature to a specific MET depends on the characteristics defined for the VN in which the MET is a member and the characteristics defined for the individual MET.

Connected Line Identification Presentation (COLP) is a service that is offered to the calling MET to provide presentation of the connected MET's number (when the call is established) to the calling MET. The GWS is capable of providing at least 10 digits for MET-terminated calls and at least 15 digits for PSTN/PN- terminated calls to the calling MET.

COLP is provisioned on a subscription basis collectively to each METs within the VN. COLP is withdrawn on request by the subscribing authority or by MSS for administrative reasons. COLP is active on subscription and inactive on withdrawal. COLP is automatically invoked by the GWS at call completion. When COLP is allowed and active, the GWS provides the calling MET with the connected MET VN number at call completion (answer) for all MET-originated incoming calls.

When COLP or equivalent service is provided by the PSTN/PN, and the connected PSTN/PN number is provided by the PSTN/PN, the GWS provides the calling MET with the connected PSTN/PN number at call completion (answer) for all PSTN/PN-completed calls. When COLP is allowed and active, the connected number is not presented if:

a. The connected MET has COLR activated, or b. The connected number is not available from the PSTN/PN.

Assume that a user A has an established call with user B and transfers this call with user B to user C. If user A has activated COLP, user A receives B's number when user A evokes the normal call transfer procedure. If user C has activated COLP, user C receives B's number at the transfer of user B to user C. A conference controller who has COLP activated is presented with the connected party's number when that party is either part of the initial activation of the conference or is added to an existing conference.

If the connected party has activated Connected Line Identification Restriction the connected number is not presented to the calling party. If the incoming call from a MET with COLP activated has been forwarded, the number presented to the calling party is the number of the final "forwarded to" party.

Connected Line Identification Restriction (COLR) is a service that is offered to the connected MET to restrict presentation of the connected MET's number to the calling MET or to the PSTN/PN. COLR is provisioned on a subscription basis collectively to each MET in the VN and/or individually to METs within the VN. COLR is withdrawn on request by the subscribing authority or by MSS for administrative reasons. COLR is active on subscription and inactive on withdrawal.

When COLR is allowed and active, the GWS does not provide the calling MET with the connected MET VN number for all MET-originated calls. When COLR is allowed and active, no connected MET number is provided to the PSTN/PN for any PSTN-to-MET calls.

Assume that a user A has an established call with user B and transfers this call with user B to user C. If user B has activated COLR, user A receives B's number when user A evokes the normal call transfer procedure. If user B has activated COLP, user C receives B's number at the transfer of user B to user C. If potential conferees have COLR activated, the conference controller is not presented with the connected party's number when that party is either part of the initial activation of the conference or is added to an existing conference.

If the connected party has activated Connected Line Identification Restriction (COLR), the connected number is not presented to the calling party. If the incoming call from a MET with COLP activated has been forwarded, and the "forwarded to party has COLR activated, the "forwarded to" party's number is not presented to the calling party.

The intent of sub-addressing is to allow the identification of separate ports and connected device that may be part of a MET. Examples include voice, facsimile and data ports/devices. Each usable port on a MET shall be assigned an VN number. The implication is that a MET port that is physically present but does not have an assigned number cannot be used. In the following, the term "MET sub-address(s)" is used to describe one or all of the set of (complete) VN numbers assigned to the ports of a given MET.

The general model adapted for the subaddressing description is a PBX telephone with multiple extensions associated with it. For example, a result of this model is that the various MET subaddresses can be forwarded separately—this (and other) results are appropriate for multi-device (multi-media) METs.

Subaddressing is provisioned and number assigned on a subscription basis individually to METs within the VN. Subaddresses is withdrawn on request by the subscribing authority or by MSS for administrative reasons. Subaddressing is active on subscription and inactive on withdrawal.

Features are subscribed to and activated for each MET subaddress separately (e.g., forwarding). It is assumed that some features (e.g., Forwarding, Hold, Transfer) will have utility for non-voice calls. Others are precluded by the nature of the communication devices (e.g., Conferencing, Call Waiting). For call completion purposes, a MET is considered busy if any MET subaddress is busy. Forwarding applies to each MET subaddress separately. However, for Call Forwarding Busy, the busy state applies as in 2 above.

Call Forwarding No Reply is interpreted to apply to a MET port that has a MET subaddress assigned but no device connected. In-channel Call Waiting indication is applicable to voice ports/devices only. Number Identification features shall apply to each MET subaddress separately. For example, CLIP can be activated for some MET subaddresses and not others. Call screening rules shall be definable for each subaddress separately.

The Call Transfer (CT) feature enables a MET user (the "served user" or "A") to transform an established call into a new call between the other party on the established call (user "B") and a third party (user "C"). The "normal" Call Transfer procedure is offered as a feature to MET users. The GWS may offer an additional "single step" Call Transfer procedure (see below) to MET users.

"Normal" call transfer (sometimes called "screened transfer") establishes a call between the served user and the third party that may be subsequently transformed into a call between the other party and the third party. Optionally, the GWS may offer "single step" ("unscreened") transfer where the transfer occurs without an established call between the served user and the third party.

CT is provisioned on a subscription basis collectively to each MET in the VN and/or individually to METs within the VN. CT is withdrawn on request by the subscribing authority or by MSS for administrative reasons. Each of the CT types offered is subscribed to separately. The "normal" call transfer procedure shall normally operate as follows:

a. An established call exists between A and B.

b. A invokes the "normal" CT procedure, providing the number for C.

c. B shall be placed on hold and a call shall be established between A and C.

d. During the established call, A invokes completion of the "normal" CT procedure.

e. B shall be connected to C; connection are removed between A and the other parties.

If, during the "normal" CT procedure, the call to C cannot be established, A shall be able to retrieve the connection to B. The "single step" call transfer procedure, if offered, normally operates as follows:

a. An established call exists between A and B.

b. A invokes the "single step" transfer procedure, providing the number for C.

c. A call is established between B and C. A is disconnected.

After the "single step" CT procedure has been invoked, B is considered the originating party of the attempted call to C; for example, B is informed of alerting at C and, if the call to C cannot be completed, B is informed.

Call forwarding allows the served or "forwarding" user to direct the GWS to send incoming calls to the served MET number to other numbers under specific conditions. Call Forwarding Unconditional (CFU) allows the forwarding user to direct the GWS to send all incoming calls to another number. Call Forwarding Busy (CFB) allows the forwarding user to direct the GWS to send incoming calls to another number if the forwarding user's MET is in the "busy" state (establishing a call or involved in an established call, on hold or invoking a feature).

Call Forwarding Congestion (CFC) allows the GWS to send incoming calls to a recorded announcement if the forwarding user's MET cannot be connected to MSS congestion. Call Forwarding No Reply (CFNR) allows the forwarding user to direct the GWS to send incoming calls to another number if the forwarding user doe not reply within a subscribed time interval.

Forwarding is provisioned on a subscription basis collectively to each MET in the VN and/or individually to METs within the VN. Forwarding is withdrawn on request by the subscribing authority or by MSS for administrative reasons. Each of the forwarding types offered is subscribed to separately. MSS may offer forwarding in "packages" containing one or more forwarding types.

The served user is able to activate each of the forwarding types offered separately. Activation of forwarding requires the served user to supply the forwarded-to number. The GWS validates the forwarded-to number to the extent possible before activating forwarding. When forwarding is active and forwarding conditions are met, forwarding is automatically invoked; incoming calls to the served user's MET is forwarded without being offered to the served user's MET.

A configurable limit is provided on the maximum number of forwarding invocations that result from a single original call. This is intended to prevent "infinite forwarding." The GWS may provide notification to the served user's MET when forwarding takes place. When a call is forwarded, the forwarded-to MET is provided an indication that the incoming call is offered as a result of forwarding. The GWS provides the originally called number and the condition for the last forwarding operation to the forwarded-to MET.

The GWS provides notification to the calling user that the call has been forwarded. The GWS provides the capability for the served user to review the MET's forwarding status. The forwarding user's MET optionally receives an indication that an incoming call has been forwarded. This may involve a separate subscribed service.

Call waiting (CW) is a service that is offered to a called MET that provides that MET indication of an incoming call, if busy. If it can be determined that the active call is a voice call, in-channel indication (tone) is provided. Otherwise, in-channel indication is not be provided. The number of waiting calls at a busy MET is limited to one. Additional incoming calls receive busy indication.

CW is provisioned on a subscription basis collectively to each MET in the VN and/or individually to METs within the VN. CW is withdrawn on request by the subscribing authority or by MSS for administrative reasons. CW is active on subscription and inactive on withdrawal. A procedure is provided to allow activation or inactivation on a call-by-call basis.

CW is invoked by the GWS automatically when a call is presented to a busy MET unless a waiting call exists at that MET. The MSS network may not be aware of the state where the MET users is entering digits for a call but has not yet invoked "send." During this state call attempts may ring rather than invoke CW or busy forwarding. Call Forwarding Unconditional takes precedence over CW. CW takes precedence over CFB. CW is presented if the called MET has CFNR activated.

The Call Hold (CH) service allows a served MET user to interrupt an existing active call and subsequently resume (retrieve) the active call. The bearer channel remains assigned to the served user to allow the origination or termination of other calls. The retrieve re-establishes the original (held) call on the bearer channel. CH is provisioned on a subscription basis collectively to each MET in the VN and/or individually to METs within the VN. CH is withdrawn on request by the subscribing authority or by MSS for administrative reasons. Call Hold is invoked by the served MET user by use of a control procedure.

The served user has the capability to invoke or hold any time after a call has been answered and before call clearing has begun. Call Hold allows either MET or both METs in an active call to invoke Call Hold. That is, it is possible for each party to have the other on hold. If a user invokes hold while held and makes an additional call, a new channel will be assigned.

Provision shall be made for providing the held MET user with in-channel indication ("comfort" tone, music, etc.) that the held state persists. This indication will also inform the user who retrieves a held call that has been placed on hold by the other party. If a MET becomes idle with a call on Hold, an indication is provided to that MET that the call remains on Hold.

Conference Calling (CONF) is a service that provides the served MET user the capability to establish simultaneous communications with more than two and up to five parties. Since MET voice traffic is presented to the GWS in a packetized, compressed encoding, it is not required that the GWS provide the capability to conference more than one MET. Thus, GWS provides the capability for conferencing among a single MET and up to five PSTN/PN parties.

CONF is provisioned on a subscription basis collectively to each MET in the VN and/or individually to METs within the VN. CONF is withdrawn on request by the subscribing authority or by MSS for administrative reasons. CONF is active on subscription.

CONF is invoked by the served MET user by use of a control procedure. The served user has the capability to request the conference as a new call or request that the conference be based on existing held calls. The served user has the capability to include the maximum number of conferees in the conference request or to accept a predefined default. Upon completion of the conference request, a conference is established among the served MET and the other parties.

After the initial conference establishment, the served user (the conference controller) has access to the following party management functions:

a. Add new party—the conference controller has the capability to add a held call or establish a new call which may be added to the conference.

b. Drop party—the conference controller has the capability to remove conferees from the conference. If the conferee is not explicitly identified, the last party added is removed. If, after the party is dropped, a single conferee remains, the GWS may establish a two-party call.

c. Split party—the conference controller has the capability to remove a specified party from the conference and establish an active (two-party) call with the specified party. From the perspective of the conference controller, the conference is on Hold. The conference controller has the capability to resume the conference after a split (i.e., return both parties to the conference).

A mechanism for supplying Conferee IDs for conference management features above (e.g., dropping a specific conferee) is provided. The conference controller has the capability to disconnect the conference. All conferees and the conference controller are dropped and the conference resource (bridge) is released.

Alternate Account Charging (AAC) allows a MET user to charge a call to an account other than the usual or default account. Alternate account charging provides the MET user the capability to supply an Alternate Account Number during call setup request. GWS records the Alternate Account number in the CDR. GWS is not required to verify or otherwise validate the Alternate Account Number.

AAC is provisioned on a subscription basis collectively to each MET in the VN and/or individually to METs within the VN. AAC is withdrawn on request by the subscribing authority or by MSS for administrative reasons. AAC is activated upon subscription. AAC is optionally invoked by the MET user at call setup request. The invocation includes the Alternate Account Number.

Call Queueing and Priority (CQP) are intended to be applied to MET-originated calls in the event of MSS network congestion. Note that the management of satellite resources is a function of the MSS Network Control Center (NCC) and not a function of the GWS. However, upon notification of satellite resource congestion by the NCC (via the SLSS), the GWS queues calls affected by that congestion. Similarly, upon notification by the NCC that congestion no longer exists, the GWS attempts to service queued calls as detailed below.

Priority and queueing are not intended to be applied in the event of a buy MET. Call Priority and Queuing may also occur as a result of congestion for PSTN/PN access. Congestion of MSS satellite signalling channels occurs as well as traffic channel congestion. Signaling access queueing occurs external to the GWS.

GWS supports traffic access queueing for MET-originated calls when traffic congestion is indicated by MSS. Determination of satellite congestion conditions is not a function of the GWS. GWS supports traffic access queueing for MET-originated calls when PSTN/PN access congestion exists. Traffic access priority is assignable to a VN and to individual METs. Call setup requests are queued under congestion conditions and are processed first-in, first-out within individual priorities.

CQP is provisioned on a subscription basis collectively to each MET in the VN and/or individually to METs within the VN. CQP is withdrawn on request by the subscribing authority or by MSS for administrative reasons. Specification of priority accompanies subscription. CPQ is active on subscription. If CQP is not subscribed to, calls receive a congestion indication but will not be queued.

CQP is invoked automatically by GWS upon indication of satellite congestion by the SLSS or detection of PSTN/PN access congestion by GWS. If CPQ is invoked, GWS provides the calling MET indication of congestion and queueing. When congestion is relived, GWS serves queued calls according to priority as follows:
a. originating a call to the MET that originated the queued call.
b. If this call is successful, GWS shall execute call setup procedures for the queued call.

Virtual Network Manager

Virtual Network Manager controls user access to a designated virtual network and its service features, provides communication circuits among member users on a call-by-call or full period basis, and manages a customer virtual network. The Virtual Network database entries for a given network shall specify the type of services, network features and call routing options that are available for use by member METs and FESs. Virtual Network Managers interact only with member METs an FESs.

The Virtual Network Management function interfaces with the Group Resource Management function and the Network Access processing function to carry out its responsibilities to receive call requests and issue satellite circuit assignments, to request, receive and return satellite circuits from/to the CG circuit pool, to return preempted circuits, and to transmit call records following each call cleardown.

To provide service connections for customers, Virtual Network Management provides functions for connection period control, call processing, call routing, circuit configuration, address screening, emergency preemption, and resource utilization auditing. The Virtual Network Manager maintains a record of which GC managed features are active. Features which are activated by subscription are active and perform the actions specified below for each active feature.

The GC supports VN configurations for virtual network service consisting of a set of METs, each with a MET Database File, and a set of virtual network communication groups, each assigned a VN ID with a VN ID Database File. The GC performs VN Management for each call request. Each GC supports multiple customer virtual network configurations in accordance with the virtual network definition.

As each MET or FES originated access request is received, the GC identifies which Virtual Network is being accessed, according to the procedures specified below, and utilizes the associated Virtual Network database and the Customer Configuration database to process and service the request. Virtual Network management is performed for each call request in accordance with the call processing specifications.

The GC supports the provision of advanced service features to MET. When Call Forwarding or Call Waiting has been activated the following Virtual Network call processing requirements for basic service shall be superseded at the appropriate points in the protocols.

Figure 24:
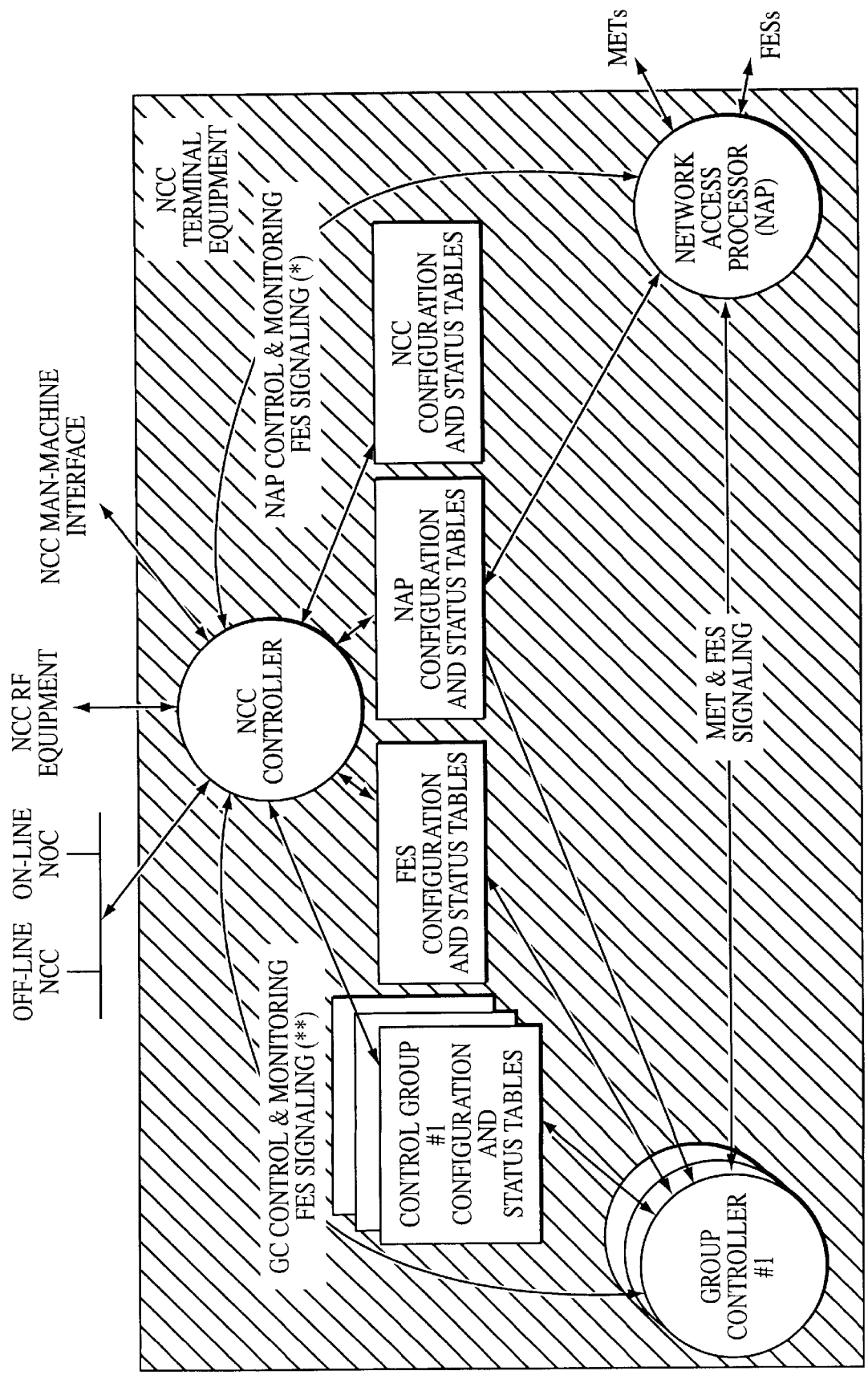
FIG. 24 is a more detailed illustration of the NCC terminal equipment.

The following describes the Virtual Network process requirements in the context of FIG. 24 which is a more detailed illustration of the NCC terminal equipment. MET originated access requests received by the Network Access Processor are routed to the GC to which the receiving MET-SR signaling channel has been assigned by the NCC Controller. The GC takes the following actions based on the GC operational state.

| GC Operational State | MET Request Disposition |
| --- | --- |
| Inactive/Initialized | Discard all requests |
| Active - Normal | Process all requests |
| Active - Unloading | Block new "Access Requests" with "Call Failure" - Services not available Discard all other requests |
| Active - Unloaded | Block new "Access Requests" with "Call Failure" - Service not available Discard all other requests |

In the Active—Normal state the GC examines the "Access Request" message to determine whether a Virtual Network identifier has been transmitted by the MET along with the dial digits. If a Virtual Network identifier has not been included in the request, the GC determines the METs default Virtual Network from the Customer Configuration database. If a particular Virtual Network has been requested, the GC utilizes the customer Configuration database to convert the logical Virtual Network identifier of the message to the internal Virtual network identifier. The GC then takes the following actions based o the Virtual Network operational state.

| Virtual Network Operational State | MET Request Disposition |
|---|---|
| Inactive/Initialized | Discard all requests |
| Active - Normal | Process all requests |
| Active - Unloading | Block new "Access Requests" with "Call Failure" - Service not available Discard all other requests |
| Active - Unloaded | Block new "Access Requests" with "Call Failure" - Service not available Discard all other requests |

FES originated channel requests received by the Network Access Processor are routed to the NCC Controller, based on the message destination address. FESs will address channel requests to the NCC Controller so the MET Control Group membership can be determined. The NCC Controller accesses the Customer Configuration database, using the MET telephone number dial digits included in the FES "Channel Request" message, and determines the identity of the GC to which the MET belongs. The NCC Controller then forwards the message to the identified GC. The GC shall take the actions as specified above based on the GC operational state.

In the Active—Normal state the GC accesses the Customer Configuration database, using the MET telephone number dial digits included in the FES "Channel Requests" message, and determines the identity of the Virtual Network which is being accessed. The GC then takes the actions specified above based on the Virtual Network operational state.

Whenever the NCC Controller determines that the GC cannot be successfully identified in the databases using received access signaling data, the access request is denied. Whenever the GC determines that a called or calling MET is registered but the Virtual Network cannot be successfully identified in the databases using received access signaling data, the access request is denied. When calls are so denied, a "Call Failure" message with the cause set to "Service not Subscribed" is sent to the requesting MET or FES, and the call data record is terminated with the cause indicated.

Upon successful identification of the Virtual Network serving the access request, the GC processes calls, using the associated Virtual Network database, in accordance with the Virtual Network management requirements specified in the following sections. Whenever a call record for an access request is terminated for any reason, the appropriate Virtual Network performance statistic is updated.

Access request processing consists of call screening actions using the Customer Configuration and Virtual Network databases, and the MET Status Table, to determine whether the requested service is a valid subscribed service for the MET and the Virtual Network, and whether the MET status is in a call state compatible with the access request. In performances of MTS access request processing, the GC processes dial digits for PSTN users in accordance wit the PSTN numbering plan. In performance of MRS access request processing the GC accommodates independent numbering plans, using fewer dial digits than the PSTN plans, which will be utilized by each private Virtual Network.

Upon each MET or FES access request, the GC evaluates the security authentication history for the associated MET. If a configurable number of authentication failures have occurred within a configurable time period from the time of access, the call is denied.

MET to Terrestrial Network Connection Requests

In processing MET originated call requests, the GC receives MET "Access Request" and "Additional Digits" messages, and shall transmit "Additional Digits Request" and/or "Call Failure messages when required. Upon receiving a MET "Access Request" the GC accesses the MET Status Table using the RTIN to verify the calling MET is in the "Operational" state and whether the MET is currently engaged in a call. The identity of the MET-SR channel receiving the request is used by the GC to verify whether the MET is currently logged on to correct L-Band beam as indicated in the MET Status Table.

Log-on errors result in a PVT for the MET with the event and results sent to the NOC and noted as anomalous events. When the PVT is successful the MET is logged on to the associated beam. If the MET is not in the "Operational" state the GC terminates the call record and sends a call failure message to the MET with the reason set to "Services not Available". If the MET is operational, the GC accesses the MET Status Table to evaluate the current MET call state.

If the MET call state indicates the GC is currently awaiting circuits or a MET call announcement response, for a prior FES channel request, the GC shall abandon the prior FES request in favor of the new MET access request, terminate the call record with the reason set to "Glare" and send a call failure to the FES with the cause set to "MET Busy". The GC shall proceed to process the MET "Access Request" as further described in this subsection.

If the MET state indicates the MET is engaged in a call-in-process, the reason is declared as an anomalous condition, the MET is sent a call failure message with "Network Busy" as the cause and the current call record is terminated with "Calling MET Busy—Anomaly" as the reason. The GC then immediately initiates a call auditing action to resolve the anomalous condition existing for the prior call. This action will clear the MET status and network resources so that subsequent service requests by the MET will be accommodated.

When a requesting MET is operational, and in the "MET Idle" call state, the GC collects additional dial digits as necessary, access the Control Group Customer Configuration data base and determine, based on the destination dial digits, whether the called destination is a MET user. If the destination is not identified in the Customer Configuration database as a MET user the GC declares the destination to be a terrestrial user. The GC accesses the operative Virtual Network Configuration database and performs the following Virtual Network service permission and address screening checks:

a. The type of service requested (voice/2.4 kbps data/4.8 kbps data/fax/alternate voice-data) is supported by the Virtual Network.
b. If the Virtual Network is configured with an explicit set of terrestrial user member telephone numbers, and the destination telephone number is included in the member list, then the call is permitted.
c. Outgoing calls permitted.
d. MET to terrestrial network calls permitted.
e. International calls permitted.
f. Calls to the specific destination NPA are permitted.

If the Virtual Network address screening and service permission checks pass, the GC accesses the Customer Configuration database using the RTIN and the destination dial digits, and perform the following MET address screening and service permission checks:
a. The type of service requested (voice/2.4 kbps data/4.8 kbpsdata/fax/alternate voice-data) is authorized for the MET.
b. Outgoing calls permitted.
c. MET to terrestrial network calls permitted.
d. International calls permitted.
e. Calls to the specific destination NPA are permitted.
f. If the MET is part of a VN group, the destination telephone number is a VN group member.

If all MET and Virtual Network address screening and service permission routing checks are successful, the GC updates the call record with the appropriate data and perform the call routing process. If a MET or Virtual Network address screening check or service permission check is unsuccessful, the GC terminates the call record upon finding the first check failure, and sends the MET a call failure message with the cause indicated as "Service not Subscribed". The call record encodes the specific failed check resulting in termination.

Terrestrial Network to MET Connection Requests

In processing terrestrial network originated call requests, the GC receives FES "Channel Request" messages, and transmits "Call Failure" messages. Terrestrial network access requests are preprocessed by the NOC Controller to identify the GC serving the called MET. Upon receiving a FES "Channel Request," the GC first evaluates the channel request message to determine whether this request is for the FES-to-destination MET connection of a MET to MET call.

If the request is not for a MET to MET connection, the GC accesses the MET Status Table, using access data provided by the NCC Controller, to verify the called MET is in the "Operational" state and whether the MET is currently engaged in a call-in-progress. If the MET is not in the "Operational" state, the GC terminates the call record and sends a call failure message to the FES with the reason set to "Service not Available". If the MET is operational and the MET call state is any state other than idle, the GC terminates the call record and sends a call failure message to the FES with the cause set to "MET Destination Busy".

If the MET is operational and not currently engaged in an active call state, the GC accesses the MET Status Table and evaluates the access event history data for recent unsuccessful call announcements. If there have been a configurable number of unsuccessful call announcements within a configurable time limit, from the current time, the GC sends a call failure message to the FES with the reason set to "MET Destination Not Available". The call record is terminated with "Excess MET Pages" as the reason.

When the called MET is operational, not engaged in an active call state, and an acceptable number of unsuccessful call announcements have been placed to the MET, the GC accesses the operative Virtual Network Configuration database and perform Virtual Network address screening and service permission checks:
a. The type of service indicated by the MET destination port (voice/2.4 kbps data/4.8 kbps data/fax/alternate voice-data) is permitted.
b. Incoming calls permitted.
c. Terrestrial network to MET calls permitted.
d. International calls are permitted (if the calling number is provided—otherwise connection is permitted by default).
e. The calling NPA is permitted (if NPA restrictions apply and the calling number is provided—otherwise connection is permitted by default).
f. If the MET is part of a closed user group (CUG), and the origination telephone number is both provided and recognized as a CUG member, then the call is permitted. If the calling number is not provided the connection is permitted by default.

If all MET and Virtual Network address screening and service permission routing checks are successful, the GC updates the call record with the appropriate data and perform the call routing process. If an MET or Virtual Network address screening and service permission routing check is unsuccessful, the GC terminates the call record upon finding the first check failure, and sends the FES a call failure message with the cause indicated as "Service not Subscribed". The call record encodes the specific failed check resulting in termination.

MET to MET Connection Requests for Originating MET

If the destination is identified by the dial digits as a MET user, the GC accesses the Customer Configuration database and determines if the destination MET is subscribed with membership in the Virtual Network being accessed by the origination MET. If the origination and destination METs are members of the Virtual Network being accessed by the origination MET, the GC performs Virtual Network service permission and address screening checks for the destination MET using its Virtual Network Configuration databases.

After identifying the proper Virtual Network database(s) the GC accesses the MET Status Table and verify the destination MET is operational and not engaged in an active call state. If the destination MET is not operational the GC terminates the call record indicating "Destination MET not Available". If the destination MET is in any call state other than idle, the GC terminates the call record indicating "Destination MET Busy", and the originating MET a call failure message with the cause indicated as "Destination MET Busy".

If the destination MET is operational and idle, the GC sets a MET to MET call pending flag in the destination MET status entry of the MET Status Table, accesses the MET Virtual Network Configuration database(s) and performs the following Virtual Network address screening and service permission checks:
a. The type of service requested (voice/2.4 kbps data/4.8 kbps data/fax/alternate voice-data) is supported by the origination and destination Virtual Networks.
b. MET to MET calls permitted.
c. Incoming calls permitted for the destination Virtual Network
d. Outgoing calls permitted for the originating Virtual Network.
e. Calls to any Virtual Network permitted by the origination Virtual Network.
f. Calls to selected Virtual Networks permitted and the destination Virtual Network is in the permitted set.

If the Virtual Network service permission and address screening checks pass, the GC accesses the Customer Configuration database using the FTIN of the origination and destination METs and performs the following MET address screening and service permission checks for the originating MET:
a. The type of service requested (voice/2.4 kbps data/4.8 kbps data/fax/alternate voice-data) is authorized for the MET.
b. Outgoing calls permitted.
c. MET to MET calls permitted.
d. Calls to any Virtual Network permitted.
e. Calls to selected Virtual Networks permitted and the destination Virtual Network is in the permitted set.

If the originating MET address screening and service permission checks pass, the GC performs the following MET address screening and service permission checks for the destination MET:
a. The type of service requested (voice/2.4 kbps data/4.8 kbps data/fax/alternate voice-data) is authorized for the MET.
b. Incoming calls permitted.
c. MET to MET calls permitted.

If all MET and Virtual Network address screening and service permission routing checks are successful, the GC updates the call record with the appropriate data and performs the call routing process. If an MET or Virtual Network address screening check or service permission check is unsuccessful, the GC terminates the call record upon finding the first check failure, and sends the MET a call failure message with the cause indicated as "Service not Subscribed". The call record encodes the specific failed check resulting in termination.

MET to MET Connection Requests for Destination MET

Upon receiving a FES "Channel Request" that indicates a FES-to-destination MET connection is being requested for a MET to MET call, the GC generates a separate call record for the Destination MET using the "Call Identifier" previously assigned during the originating MET call setup and provided in the request message. The call record includes MET ID data needed to complete the connection to the destination MET. The GC proceeds to route the call.

Call Routing

When a GC successfully completes MET and Virtual Network address screening and service permission checks for access requests, the GC attempts to route the call using the routing rules and the Virtual Network Routing database. The routing process selects:

a

The FES Terminal Equipment that will support a MET to terrestrial network call, or b The FES Terminal Equipment and destination MET port that will support a MET to MET call, or c The MET port that will support a terrestrial network to MET call.

The GC reports both MTS and MRS routing configurations. The GC accommodates, in any proportion, different routing rules for each member of a set of individual Virtual Networks and accommodates common routing rules for selected sets of one or more Virtual Networks.

MET to Terrestrial Connection Routing

To route a MET call to the terrestrial network, the GC accesses the Virtual Network Routing database and selects the FES Terminal Equipment based upon the destination dial digits. Each MTS Virtual Network Routing database is configured such that a variable number of the first n dial digits are processed to select the FES Gateway. The first n dial digits are comprised of the following:

a. Domestic call or destination country code for international calls—[x] digits.
b. The destination NPA—3 digits.
c. The local exchange within the NPA—3 digits.

For MTS it is possible to associate each set of 'n' dial digits with an ordered set of FES Gateway entries. The FESs is arranged in the order of preference for routing. The number of FES Gateway entries ranges from 1 to 7.

Each MRS Virtual Network Routing database is configured such that a specific range of numbers in the associated private numbering plan are processed to select a FRS Base Station. The dial digit ranges differentiate which FES base station is to be used. Each MRS dial digit number range is associated to an ordered set of FES base station entries. The FESs is arranged in the order of preference for routing. The number of numbering plan ranges are from 1 to 16 and the number of FES Base Station entries range from 1 to 3.

Once the GC has identified the routing FES entry set, it accesses the FES Status Table and FES Resource Pool for the most preferred FES. It then determines that FES's network availability and the availability of its communication and terrestrial interface resources to support the call. If the preferred FES is available to the network, the GC allocates communication and terrestrial interface resources from the pool for the call being routed. FES resources are allocated based on the specific service type requested by the MET.

If the preferred FES is unavailable or the communication or terrestrial interface resources are insufficient to support the call, the GC accesses the Customer Configuration and virtual Network Configuration databases to determine whether both the MET and Virtual Network are authorized for alternate FES routing or fixed FES routing. If fixed FES routing is required, the GC terminates the call record indicating "FES not Available" and sends the MET a call failure message with the cause set to "Network Busy".

If the preferred FES is unavailable or communication or terrestrial interface resources are sufficient to support the call, and alternate FES routing is authorized for both the MET and the Virtual Network, the GC sequentially repeats the procedure above for each FES in the set, in descending order of routing preference, until an available FES is identified with sufficient resources to support the call.

When an available FES with sufficient communication and terrestrial interface resources is identified, either under alternate routing or fixed routing procedures, the GC proceeds to allocate satellite circuits to the call. The call record is updated to show the FES selected and whether the alternate or fixed process was used. If alternate FES routing is authorized but an available FES with sufficient communication and terrestrial interface resources cannot be identified within the routing set, the GC terminates the call record indicating "FES not Available or Insufficient FES Resources", as appropriate, and sends the MET a call failure message with the cause set to "Network Busy".

In the event the Virtual Network Routing Table does not include any routing entries for the 'n' dial digits included in the request message, the GC terminates the call record indicating "Routing not Provided" and sends the MET a call failure message with the cause set to "Service not Subscribed".

Terrestrial to MET Connection Routing

To route a terrestrial network to MET call, the GC accesses the Customer Configuration database and identifies the MET port that is associated with the MET's destination telephone number received in the channel access request message. The GC updates the FES Communication and Terrestrial Interface Status tables to reflect the resource allocation made by the calling FES prior to signaling the channel request for this call. The GC proceeds to allocate satellite circuits to the call and updates the call record to show the destination MET port ID selected.

MET to MET Connection Routing for Originating MET

To route a MET call to another MET, the GC accesses the Virtual Network Routing database and selects an FES Terminal Equipment from an ordered set of FESs that have been designated to service MET to MET calls. Alternate routing is assumed automatically when more than 1 FES is included in the ordered set. The FESs are arranged in the order of preference for routing. The number of FES entries ranges from 1 to 7.

Once the GC has identified the routing FES entry set, it accesses the FES Status Table for the most preferred FES, and determines the FES's network availability and the availability of its communication and terrestrial interface resources to support the call. If the preferred FES is available to the network, the GC allocates MET to MET communication resources from the pool for the call being routed. FES resources are allocatable based on the specific service type requested by the MET.

If the preferred FES is unavailable or communication resources are insufficient to support the call, the GC sequentially repeats the procedure above for each FES in the set, in descending order of routing preference, until an available FES is identified with sufficient resources to support the call. When an available FES with sufficient communication resources is identified, the GC proceeds to allocate satellite circuits for the originating MET connection. The call record is updated to show the FES selected. Subsequent FES processing generates a channel request for the FES-to-destination MET connection.

If an available FES with sufficient communication resources cannot be identified within the routing set, the GC terminates the call record indicating "FES not Available or Insufficient FES Resources", as appropriate, and sends the MET a call failure message with the cause set to "Network Busy".

MET to MET Connection Routing for Destination MET

To route the FES-to-destination MET connection for a MET to MET call, the GC proceeds to allocate circuits for the destination MT connection as specified in the MET to MET Connection Routing for Originating MET Section.

Satellite Trunk Circuit Management

Only when all MET and Virtual Network service permission and connectivity checks for an access request have passed and network routing facilities have been determined available and reserved, the GC selects the required forward and return link trunk circuit frequencies and the FES forward link power level to service the call.

Each GC manages satellite trunk circuit resources using circuit pools. Channel center frequencies are identified in accordance with the separate L-Band and Ku-Band conventions.

Circuit Allocation

The GC accesses the Customer Configuration database to determine the required circuit configuration for the MET port which is being accessed by the call. The database indicates the bandwidth required for the forward and return links, the minimum MET frequency tuning increment, and the FES forward link power level authorization. For MET to MET connections, the GC identifies forward and return link circuit configurations for both the originating MET and destination MET and the following circuit and power allocation processing are performed for both METs.

The GC accesses the origination Virtual Network Configuration database to determine the connectivity period class authorized: demand period—free pool, demand period—reserved pool, or full period. The GC accesses the MET Status Table to identify the L-Band beam to which the MET is currently logged on. The GC then attempts to allocate the required circuit from the proper frequency pool, based on connectivity class and L-Band beam requirement.

The GC searches the pool to identify unused frequencies containing continuous spectrum sufficient to provide the MET channel bandwidth requirement. The GC determines each resulting channel center frequency for inclusion in subsequent "Channel Assignment" messages. If the required circuits are available, the authorized forward link power level is retrieved from the Customer Configuration database for the associated MET port and the FES nominal EIRP retrieves form the FES Configuration Table.

Satellite Trunked Circuit Queuing

When queuing is enabled for MET originated calls, and the requested circuit pool bandwidth or power resources are not immediately available, the GC accesses the Customer Configuration database to identify the MET priority associated with the Virtual network being accessed. The circuit request is then entered into the tail of the queuing system which is structured with separate queuing sets for each L-Band beam being served by the GC. The individual queues within each L-band beam queue set is allocated to each MET priority level.

Call Setup Processing

When all MET and Virtual Network service permission and connectivity checks for an access request have passed, network routing facilities have been determined available and satellite trunk circuits have been secured from the pool, the GC proceeds to the call setup procedure.

Off-Line NCC Virtual Network Updating

Each GC updates its counterpart GC in the Off-line NCC upon each transition of a MET call into the "MET Busy—Call in Progress" state or the MET Operational and Idle" state. Other state transitions are not reported to the Off-line NCCTE GC. Each Virtual Network update includes all call record, MET Status Table, Circuit Pool Status Table, FES Communication and Terrestrial Interface Pool data sets for the call being updated. The Off-line counterpart GC utilizes update reports to modify its associated tables and call records to reflect concurrency with the On-line GC. Upon NOC command to assume the On-line NCC role, the GC commences Virtual network management using the call and resource states at the time of switchover.

Priority and Preemption Architecture and Procedure

The mobile satellite system is licensed to operate in the bands 1545–1559 MHZ and 1646.5–1660.5 MHz, however, the priority and preemption feature is operable for any satellite related or wireless system. Portions of these bands are allocated within the U.S. to both AMS(R)S and mobile satellite service (MSS) subject to the condition that AMS(R)S has priority and real-time preemptive access to the whole portion of these primary allocations. AMS(R)S is to be given special protection from interference.

The present invention attempts to solve the following objectives:

To determine how a system designed to the standards will deal with internal failures that might jeopardize satisfactory operation.

To determine the criteria and methods used to prevent failures.

To determine how an AMS(R)S system might accommodate traffic fluctuations while meeting performance specifications.

To help in establishing the probability of, and performance criteria for, external resource provisioning to AMS(R)S from non-AMS(R)S systems.

To aid in determining the susceptibility of AMS(R)S to interference and how it recovers when it does happen.

To aid in establishing specifications for non-AMS(R)S systems that will ensure that a suitable preemptive capability for AMS(R)S is established and minimize the likelihood of interference.

The primary service objectives for AMS(R)S service are to deliver high quality, high availability, and high integrity service to users of the system. High quality is interpreted to mean low access and transit delay for messages, and reliable error free delivery of those messages. Packet mode services achieve error free delivery through use of error correcting feedback mechanisms. Voice links achieve consistent intelligibility and fidelity by using digital coding and decoding methods, and by maintaining satellite subnetwork error rates at a satisfactory level.

Maintaining the quality objectives requires adequate transmission capacity to minimize access delays, to handle load peaks and to minimize priority invocation. Minimizing priority invocation is important because the need to invoke priority or preemption implies that some users will suffer additional delays or outright interruption of service. Thus, I have determined that network capacity provisioning is a key part of meeting overall service quality objectives.

The FAA has established three levels of availability for air traffic services depending on the nature of the use of the service. These levels and the corresponding availabilities are as follows:

CRITICAL SERVICE 0.99999
ESSENTIAL SERVICE 0.999
ROUTINE SERVICE 0.99

Systems providing critical and essential service must have no single point of failure.

Meeting AMS(R)S availability objectives requires the use of multiple strategies. The priority and preemption process and system described herein makes provision at several levels for dealing with failures that might affect availability. Among the techniques contained in these standards are failure prevention measures, failure detection and restoral measures at the equipment and network level, and priority and preemption measures. A key component of the system design of the present invention is the networks through the satellite subnetwork.

Figure 25:
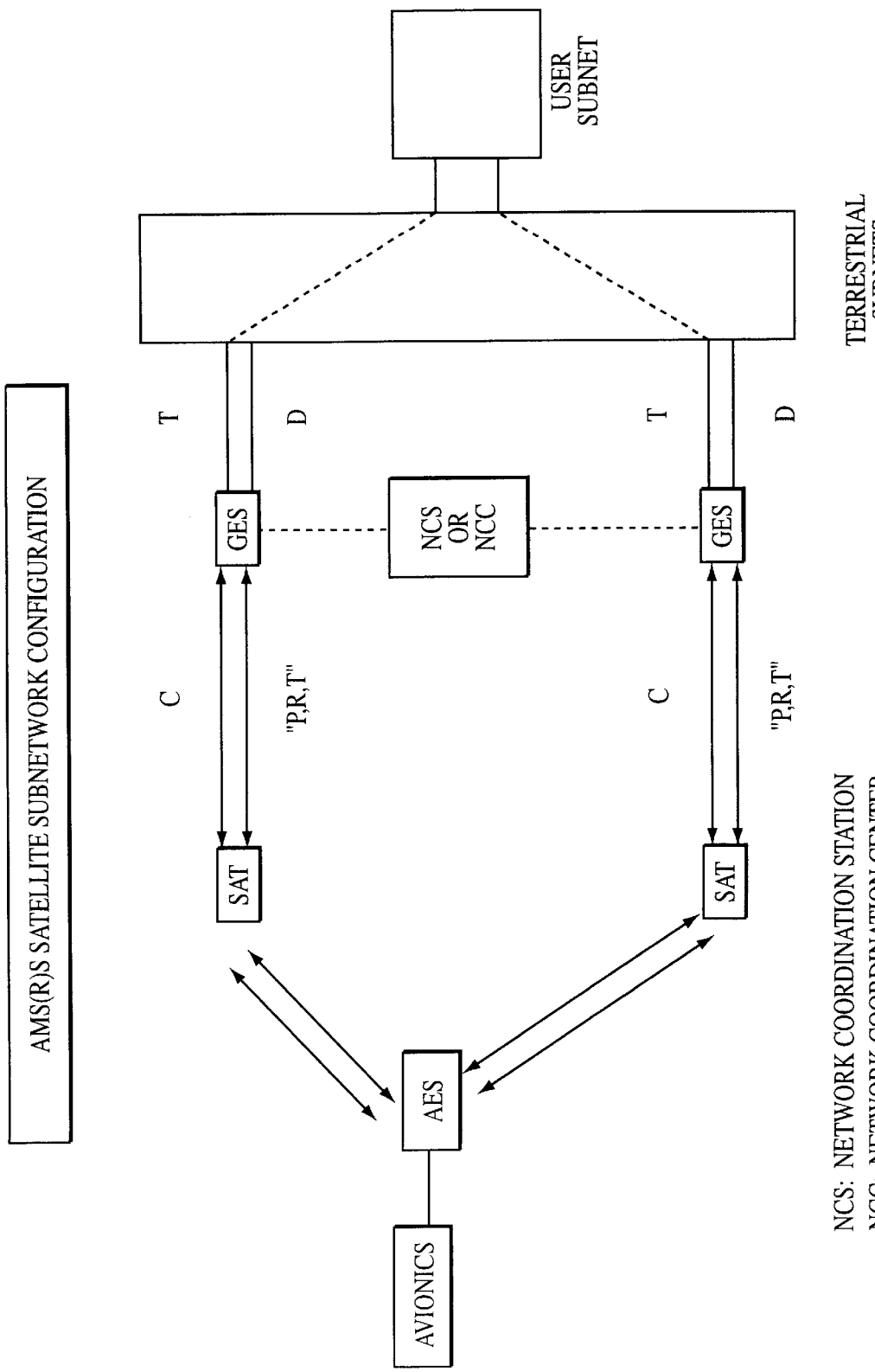
FIG. 25 illustrates a satellite subnetwork configuration that provides path redundancy which is used in connection with, or which is improved by the priority and preemption process of the present invention.

FIG. 25 illustrates a satellite subnetwork configuration that provides path redundancy which is used in connection with, or which is improved by the priority and preemption process of the present invention. There are at least two independent paths available between an (AES *********) and the terrestrial network. Each path employs a satellite and (GES ********) with one or more sets of P, R, T and C channels and corresponding data or voice path interconnection to the terrestrial subnetwork. The assignment of satellite resources (frequencies, power) to the GESs is managed by a Network Coordination Station (NCS) (INMARSAT terminology) or Network Coordination Center (NCC) (MOPS terminology).

The standards contain specifications and procedures for initially selecting a path for communication from and to an AES, and specifications and procedures for selecting an alternate path if the first choice path is unavailable. The procedures for reroute do not attempt to determine the cause of a failure; they are concerned only with recovery from a failure no matter what the cause. Hence, failures due to GES malfunction, satellite malfunction or RF interference are handled the same way.

Because AESs are likely to be able to communicate over only one path at a time due to equipage limitations, switching from one path to another may take tens of seconds. An AES must a) detect path failure, b) switch to and acquire the alternate path P channel, c) read the bulletin board for information on how to access the new path, d) log-on to the new GES and e) reestablish communications with its land users.

As described above, the ability of an AMS(R)S network to meet quality objectives is dependent on the capacity of the network relative to the traffic loads offered to it. If insufficient capacity is available, access delays will increase. Priority and preemption may need to be invoked to satisfy delay requirements for AMS(R)S, substantially increasing delays for low priority communications. AMS(R)S networks must generally meet the minimum quality and availability requirements as set forth in the AMSS MOPS, Guidance On End-To-End System Performance and Verification Requirements, Appendix A, Third Draft (2nd revision), Aug. 24, 1992, incorporated herein by reference.

The resources that determine network capacity are satellite radio channels, GES channel units and terrestrial interconnection ports. A GES is configured with a finite number of channel units of each required type (P, R, T channel units, C channel units) and each operating speed. The capacity of a given GES path is limited to this GES channel unit capacity. Since terrestrial ports are finite in number, they are another factor affecting GES capacity. Each GES conforming to the standards is assigned radio frequencies for use with each active channel type.

Since each GES normally operates autonomously, it is assigned a predetermined set of radio frequencies corresponding to its active channel unit equipage. That is, there is a radio frequency assigned to each active P channel modulator, each R or T channel demodulator and each C-channel modem. When the traffic reaches the carrying capacity of one or more of these channels, the GES is not generally able to accommodate the full demand and meet the quality objectives for the affected service. Requesting additional satellite channels from the NOC or NCS does not generally help unless the GES has the necessary channel units (and terrestrial ports) to make use of them.

Where the network has more than one GES, the ability of the network to carry traffic is a function of the combined capacity of all of the GESs. If a GES is overloaded, traffic can be diverted to another GES that has excess capacity, thereby relieving the overload. Note that overload can occur either because the offered traffic exceeds the GESs design capacity, or because there is some form of failure that diminishes its capacity.

Sizing the network and individual GESs is normally carried out through traffic engineering studies. Forecasts of demand are made based on historical data, estimates of changes in future demand and knowledge of events that may require special accommodation. Estimates are then made of the resources required to meet the demand consistent with quality of service objectives. Resource estimates will also include provision for accommodation of some level of partial network failure that affects a subportion of the network.

A well designed AMS(R)S network reflects conservatism in sizing design rules. Thus, it is likely that the probability of not having a C-channel available during a busy hour, for example, will be 0.001 or less (essentially non-blocking). Similarly, the probability of having to wait for packet mode access beyond acceptable limits is correspondingly small. I have determined that it should be rare at the network level to have to bring into service additional capacity to solve overload problems.

Prudent planning, however, should include provision for quickly bringing on-line additional capacity if needed. These provisions include spare GES and terrestrial network interconnect equipment and procedures for making them operational quickly.

Operational procedures for anticipating and responding to unplanned needs should also be put into place. For example, major weather events that might cause increased need for communications could be predicted several hours in advance of their occurrence, and resources marshaled in time to minimize any adverse effects. In a similar manner, resources could be deactivated in a controlled manner once the need has passed. The operational objective should be to have sufficient time to make adjustment in capacity in an orderly, manageable way that does not unduly strain the resources of the systems affected.

Priority and preemption management and the effects they have on resources are different at the AES and GES. Packet mode and circuit mode priority and preemption also have different effects.

Generally, AESs are resource limited. That is, they may have only one receiver and one transmitter. In these cases, priority may involve switching operating modes from packet mode to circuit mode or vice versa, or queuing of calls within a mode. The contention for service is expected to be over access to the physical equipment itself, not over the availability of radio channels (since there will usually be multiple radio channels available for simultaneous use by several AESs). Hence, I have determined that the majority of these conflicts may not have a significant effect on the total quantity of radio channels needed at a particular moment. As an example, a circuit mode in-progress call may be preempted by a higher priority call because there is only one C-channel modem available to be assigned to the call without preempting other calls. This preemption may be originated at either the AES or GES; the cause of preemption is the same.

GESs have multiple resources at their disposal, and therefore, I have determined it is much less likely that preemption must be invoked because of resource limitations at the GES. If AES resources are not limiting, GESs are most likely to have to invoke priority and preemption only when the total traffic load begins to reach the GES's peak load handling capabilities. In a well-designed system this should happen only infrequently.

From time to time it may be necessary to obtain satellite resources from non-AMS(R)S systems to meet needs that cannot be met internally. Satellite resources include specific frequencies, associated bandwidth and satellite transmit power to support the radio carriers that will use the frequencies. Criteria are required for the time required by a non-AMS(R)S system to respond to a resource provisioning request from an AMS(R)S system. I have determined that the criteria should take into account the following factors:

1. Requests should be infrequent if the AMS(R)S network has sufficient internal resources to meet its critical needs.
2. Many requests would be made sufficiently in advance of the need that nearly instantaneous responses may not be routinely required. Operational arrangements should be established that are aimed at minimizing the number of instantaneous requests.
3. Conditions could exist when rapid, immediate response is required to satisfy AMS(R)S requirements.

Provisioning requests in accordance with the present invention are given one of two classifications. The classifications are Urgent and Routine. Urgent requests are intended primarily to accommodate factor No. 3, and are to be given immediate responses. Routine requests are intended to accommodate all other conditions where there is no urgency in responding. It is proposed that the time allowed for responses for each classification and percent of requests be as follows:

| | RESPONSE TIME (seconds) | |
|---|---|---|
| CLASSIFICATION | 99% | REQUESTS 99.99 |
| URGENT | [2] | [10] |
| ROUTINE | [6] | [30] |

Figure 26:
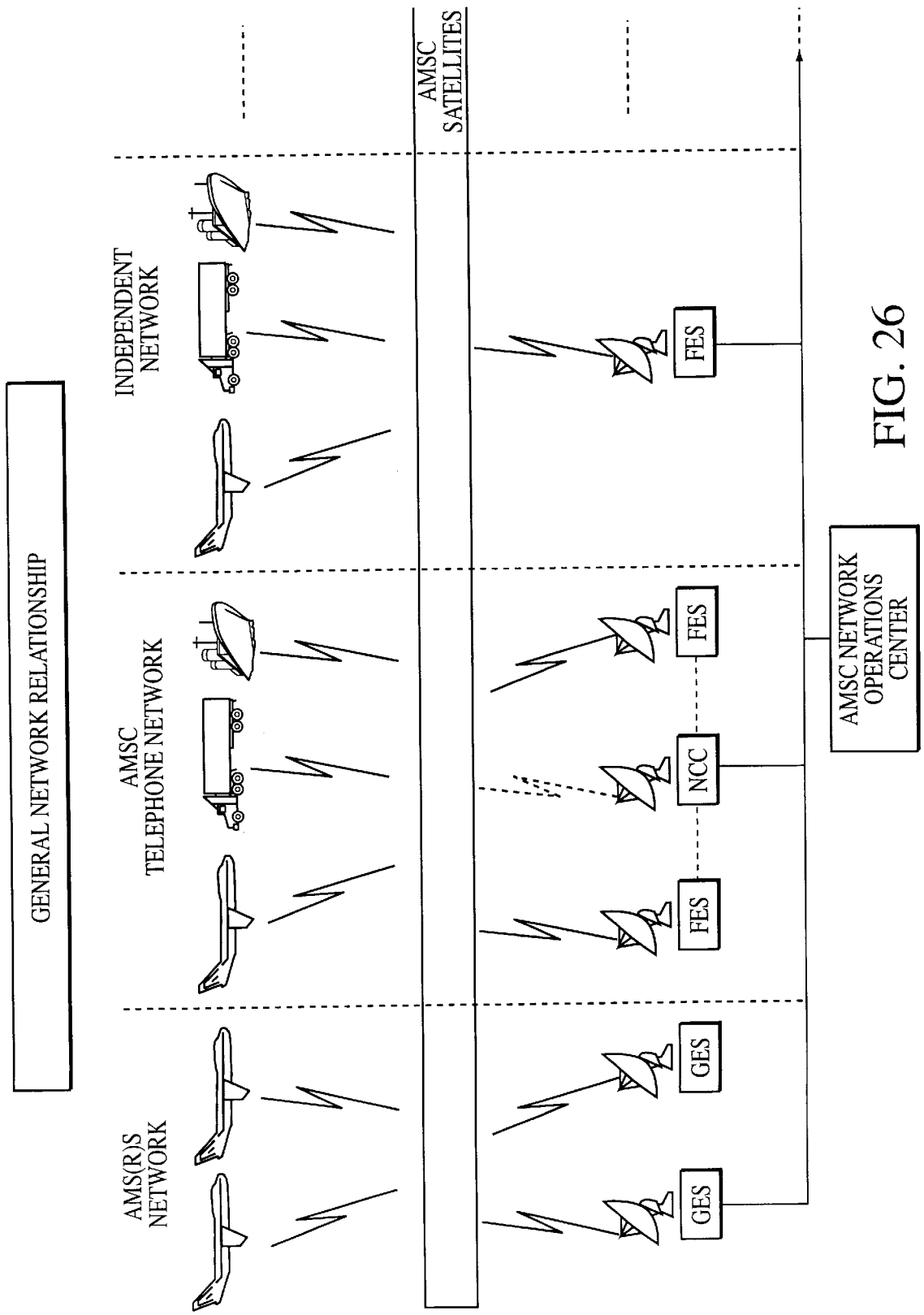
FIG. 26 illustrates the independent grouping of feederlink earth stations and mobile terminals will generally be grouped into networks according to the type of service involved.

The mobile satellite system includes one or more satellites, feederlink earth stations and mobile terminals of various kinds. The feederlink earth stations (FESs or GESs) and mobile terminals will generally be grouped into networks according to the type of service involved. FIG. 26 illustrates this independent grouping. There are expected to be several networks operated nearly independently of one another. All of these networks will be under the ultimate control of the Network Operations Center.

Figure 27:
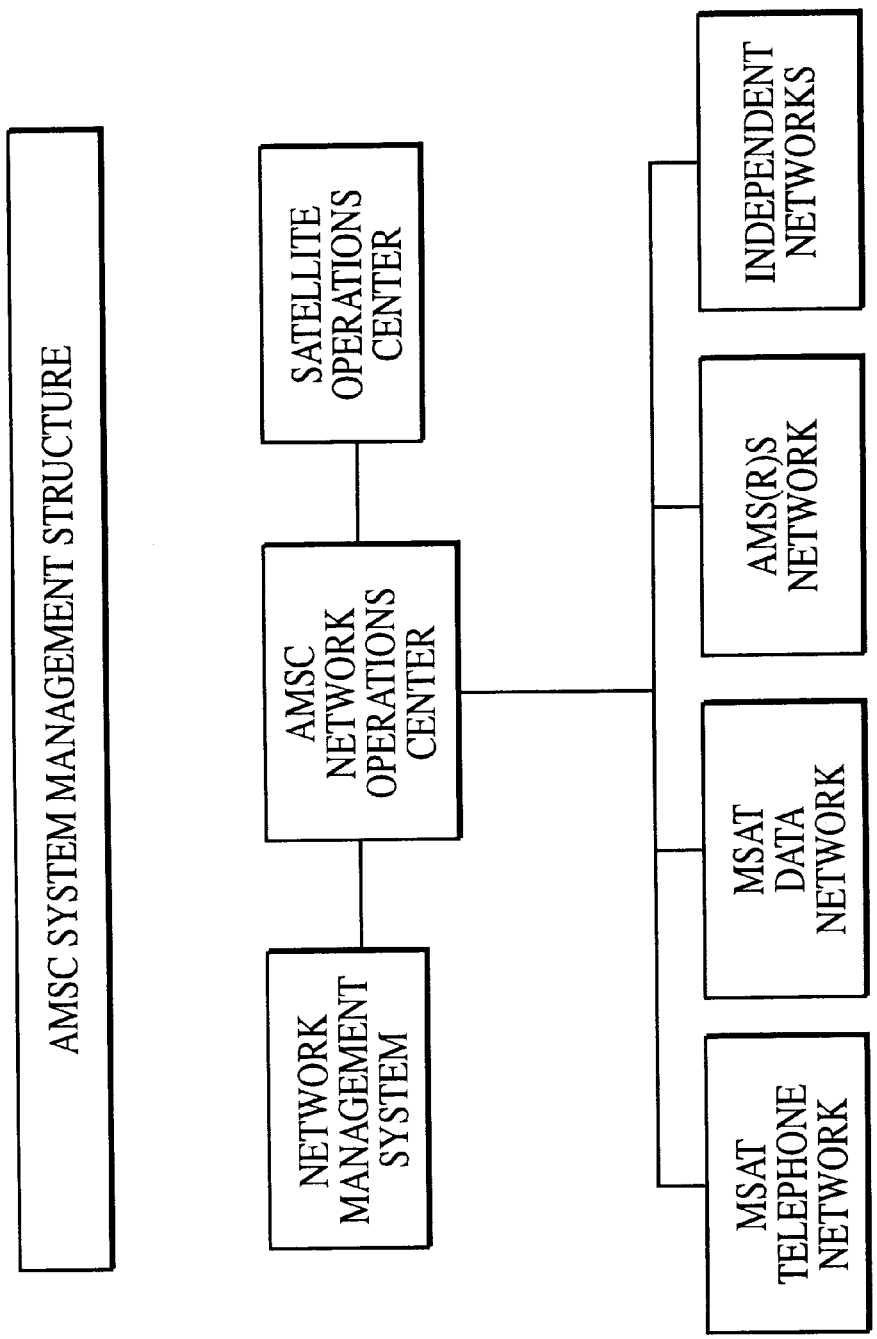
FIG. 27 illustrates the functional relationships between the Network Operations Center and other networks or systems that support or use the satellites in connection with the priority and preemption process.

FIG. 27 illustrates the functional relationships between the Network Operations Center and other networks or systems that support or use the satellites in connection with the priority and preemption process. (The satellites are not shown in FIG. 27). Within the mobile satellite system the NOC is responsible for the functions associated with the Network Coordination Station of INMARSAT or the Network Coordination Center of the MOPS.

Four types of communications networks used in connection with the priority and preemption process are illustrated in the FIG. 27, and all will be interconnected to the NOC.

MSAT Digital Telephone Network is an AMSC owned and operated network that will provide demand assigned voice services to land, maritime and non-safety aeronautical mobile subscribers. MSAT Data Network is an AMSC owned and operated network that will provide packet switched data services to land, maritime and non-safety aeronautical mobile terminals.

Independent networks are networks that use the AMSC satellites but are owned and operated by parties other than AMSC. The AMS(R)S network is a separate network that provides aeronautical safety communications to aviation in accordance with the AMS(R)S standards. It will have its own control center (AMS(R)S Control Center) for managing its internal resources and utilize feederlink earth stations equipped as AMS(R)S GESs with dedicated channel units and switching equipment.

The NOC manages all of the satellite resources, allocating them to the various networks as required. It assigns groups of frequencies, the associated bandwidth and satellite power for each network to manage its resources in real-time.

The NOC also interacts with the AMSC Satellite Operations Center (SOC) and the AMSC Network Management System (NMS). The matters relating to the communications use of the satellite. The NMS is a network support system used in configuring the overall system and in planning for its use and expansion. The NMS is primarily an off-line operation.

Figure 28:
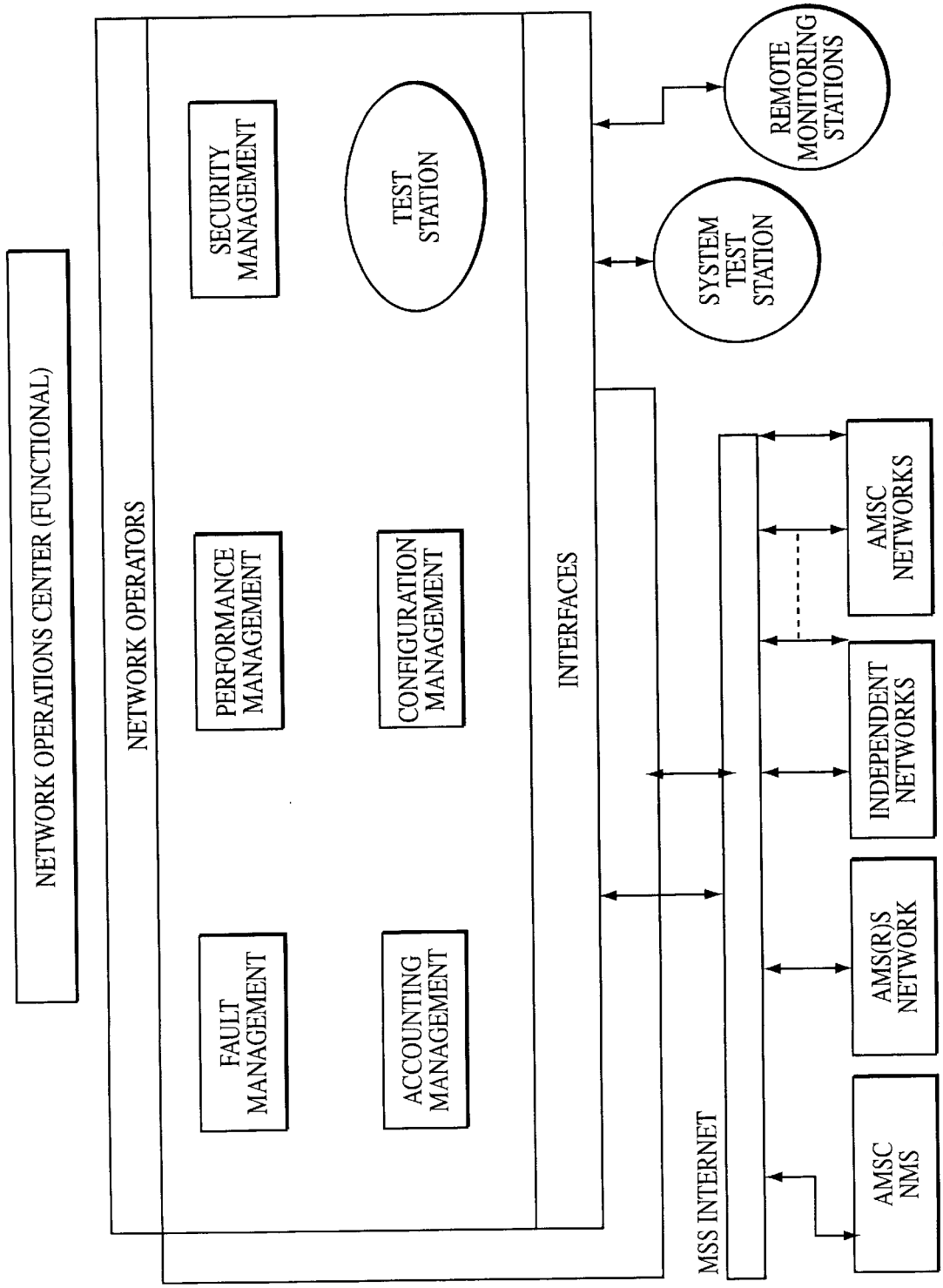
FIG. 28 is an illustration of the functional makeup of the NOC used in connection with the priority and preemption process.

The functional makeup of the NOC used in connection with the priority and preemption process is illustrated in FIG. 28. The NOC is the operational center for the management of the system. The NOC supports network operators who oversee the operation, maintenance, and fault management of the system. The NOC performs configuration management, performance management, fault management, accounting management and security management. It includes test stations for remote RF monitoring of transmissions of the spacecraft in both directions (L-band and X-band), and for testing of AMSC owned and operated networks. It interconnects to other user networks through a packet data network (MSS Internet work) designed for fast, reliable response. The AMS(R)S control center accesses the NOC via the MSS Internet work.

In particular, the AMS(R)S control center interfaces with the AMSC NOC for purposes of resource provisioning and for other operational interactions. The NOC-AMS(R)S control center interface supports both automatic transactions and console-to-console transactions. The automatic transactions provide the automated responses to resource provisioning requests from the AMS(R)S control center. It also supports two-way major alarm reporting and transfer of summary status information from the AMS(R)S control center to the NOC that may be required from time to time. The console-to-console transaction capability permits operators int eh control centers to exchange information in a more general way. They are able to send operator-to-operator messages, obtain status updates, do database and file transfers, and manually do resource transfers from one system to the other.

Figure 29:
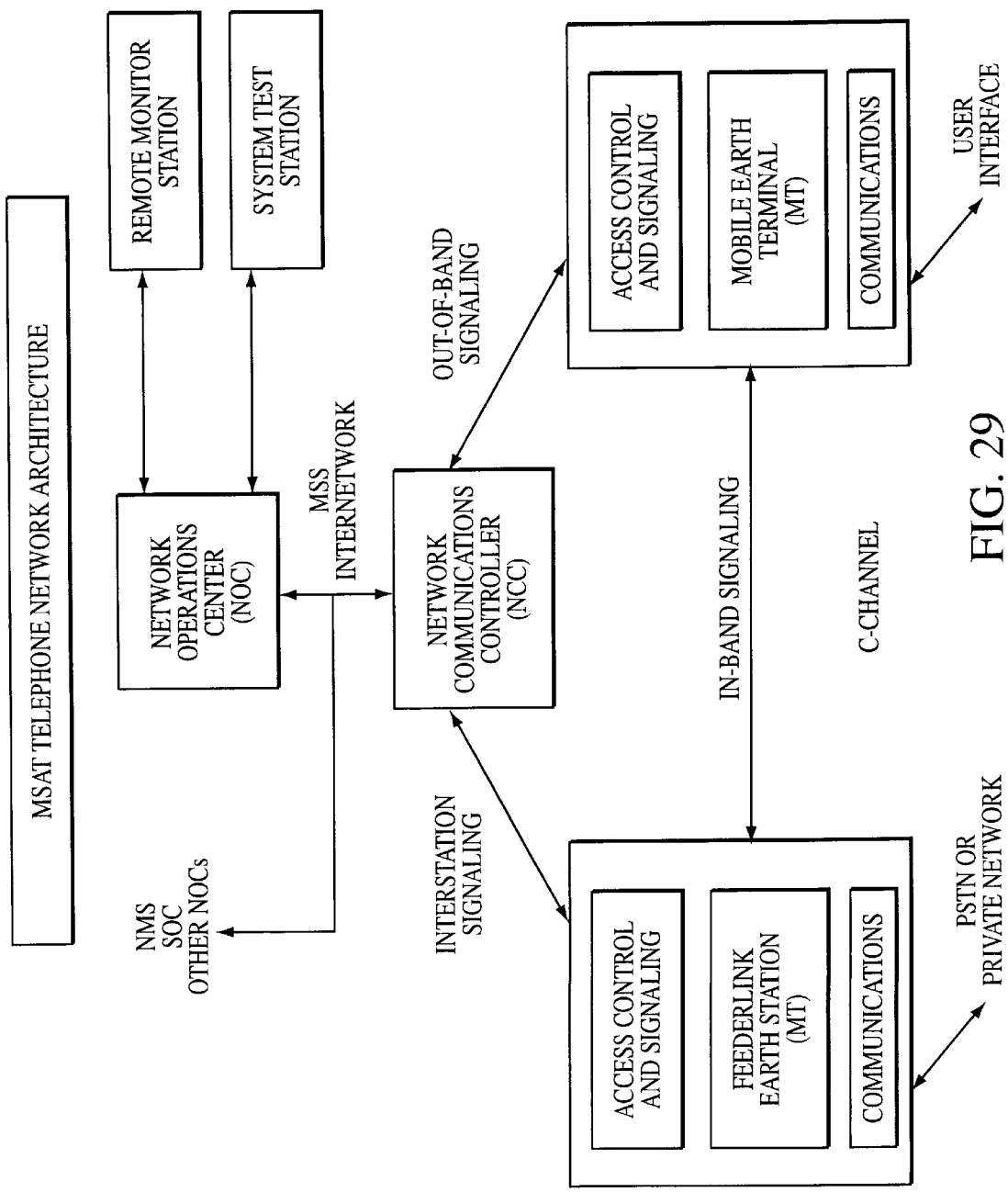
FIG. 29 is an illustration of the design of the MSAT Digital Telephone network and the architecture for the service used in connection with the priority and preemption process.

The design of the MSAT Digital Telephone network and the architecture for the service used in connection with the priority and preemption process is illustrated in FIG. 29 (the satellite is not shown). There are four principle elements in the architecture. Mobile Earth Terminals (MTS) and Feederlink Earth Stations (FES) communicate with one another through the satellite over demand assigned full duplex communications channels (C-channels).

The Network Communications Controller (NCC) does the call-by-call assignment of C-channels between MTs and FESs. The NCC is given a pool or pools of channels (frequencies, power levels, bandwidth) by the NOC for use in the establishment of connections between MTs and FESs. Signaling to and from the MTs is done through the satellite over Out-of-Band signaling channels that the MTs "camp-on" when they are idle.

The NCC exchanges signaling messages with the FESs over Interstation Signaling channels. Once an assignment is made, the MT and FES communication via In-band signaling within the C-channel. This C-channel signaling path is generally always available as long as the path is connected. The NCC substantially always has a control path to a MT either through the Out-of-band signaling channels or via the FES through the Interstation signaling channels and the C-channel in-band signaling channel.

The NOC manages all AMS(R)S resource provisioning responses. The NOC controls all satellite resources, allocating them to the various networks and keeping track of their status. The AMS(R)S network is allocated a set of resources for its normal use and real-time management. In addition the NOC maintains a reserve resource pool for AMS(R)S of configurable size. This pool acts as a buffer between the AMS(R)S system and the other resource pools maintained for other networks. Resource allocation requests from the AMS(R)S control center are filled immediately from this reserve pool. The pool is then replenished by the NOC from its other resources. By adjusting the size of the pool, sufficient reserve resources are maintained to fulfill resource requests immediately.

Figure 30:
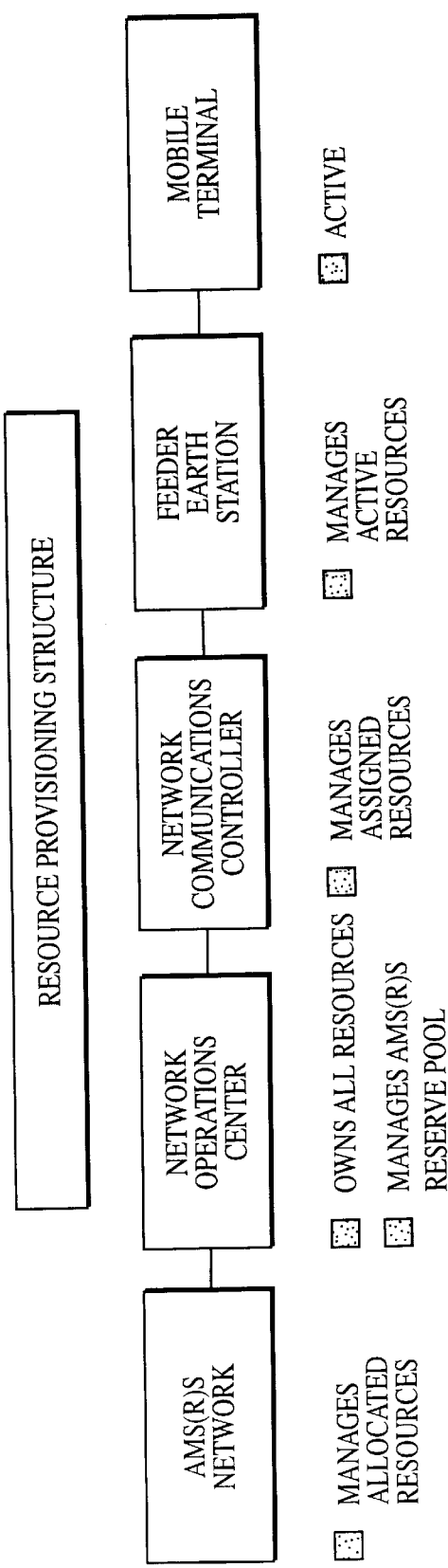
FIG. 30 illustrates the replenishment process implemented by the NOC.
Figure 30:
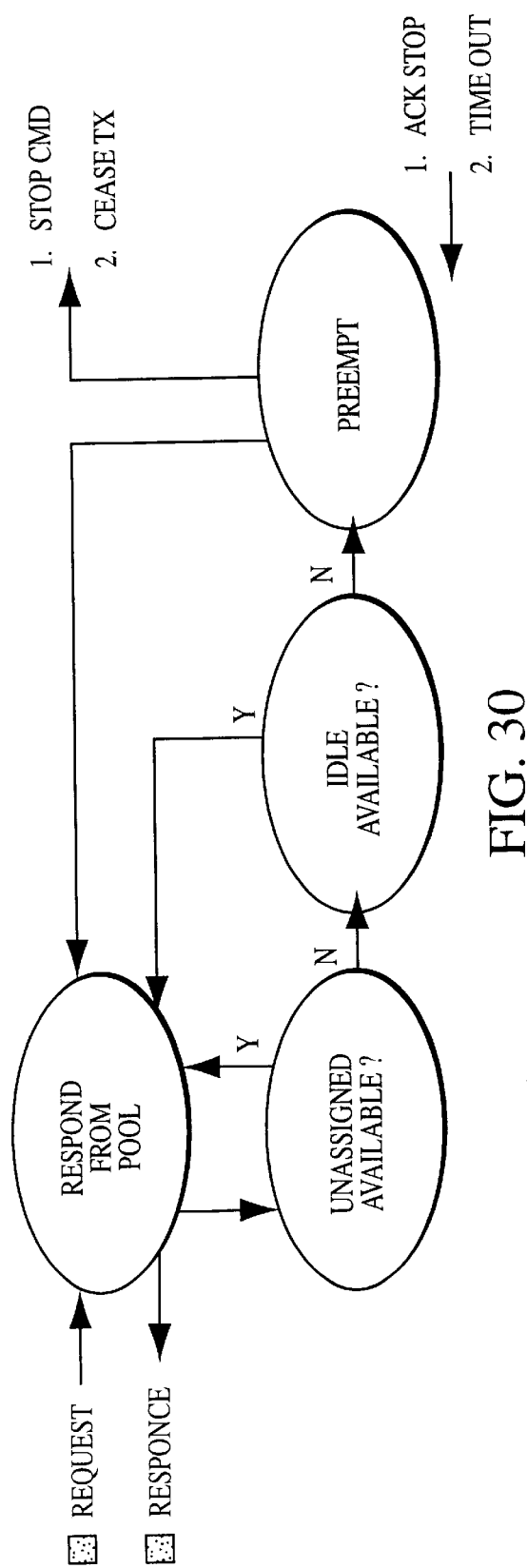

The NOC replenishes the pool in an ordered way that minimizes replenishment time while minimizing possible disruption to other networks. FIG. 30 illustrates the replenishment process implemented by the NOC. Resource requests are serviced immediately from the reserve pool. The NOC then determines if there are any suitable resources available that have not been allocated to other networks. If so, these resources are extracted and used to replenish the reserve pool.

If not, the NOC then requests resources be returned by the NCC. The NCC first returns currently idle resources. If these are insufficient, it preempts active connections and returns the cleared resources back to the NOC. To clear a call, the NCC sends a preemptions message back to the NOC. To clear a call, the NCC sends a preemption message to the FES carrying the call. The FES then sends a call clearing command repeatedly to the MT over the C-channel for a period of time and then shuts down the FES transmitter.

If the MT successfully receives the call clearing command, it sends an acknowledgment repeatedly for a period of time over the C-channel and the MT stops transmitting. If the MT does not received the call clear command, it will stop transmitting automatically when the FES C-channel transmission is not successfully recovered after a specified period of time. In either case the channel is cleared and the FES notifies the NCC of the method of call clearing. The details of this procedure are now described.

To initiate preemption of a call in progress the GC sends a preemption message via the GC-I channel to the FES through which the call has been established. The preemption message contains the call identifier corresponding to the call that is to be preempted. Upon receiving the preemption message, the FES signals call release to the terrestrial network, switches the appropriate FES-C channel to inband signaling mode, transmits a preemption command SU to the MET via the FES-C channel, and starts a timer, for example, timer Tf8.

Figure 31:
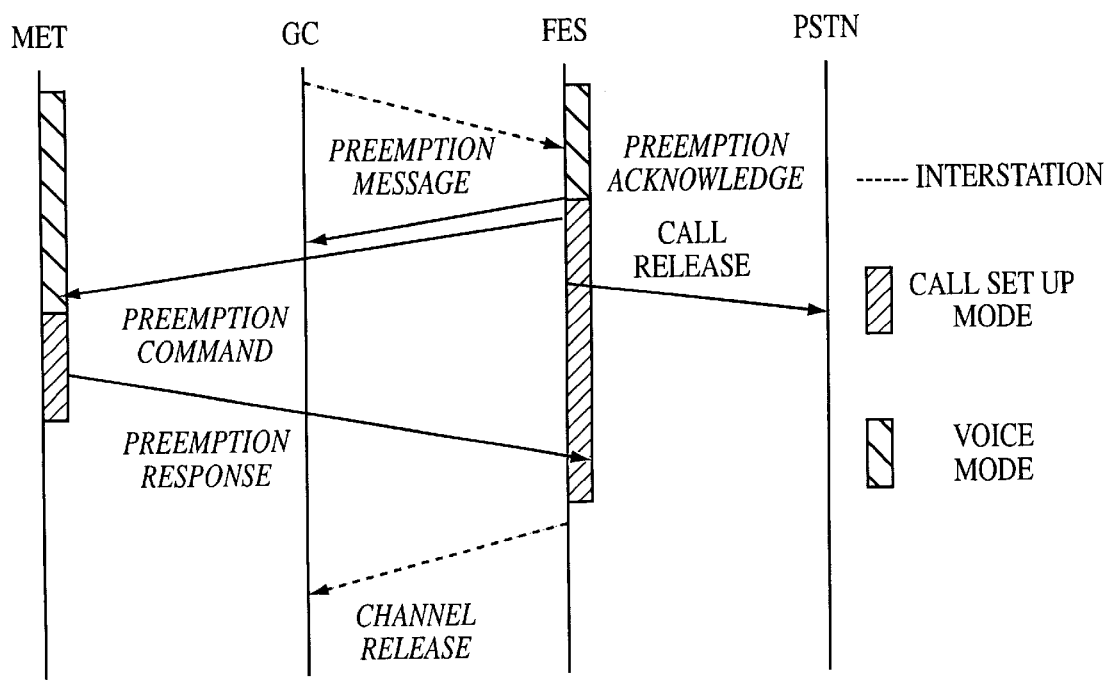
FIG. 31 is an illustration of the sequence of messages used for channel preemption.
Figure 32:
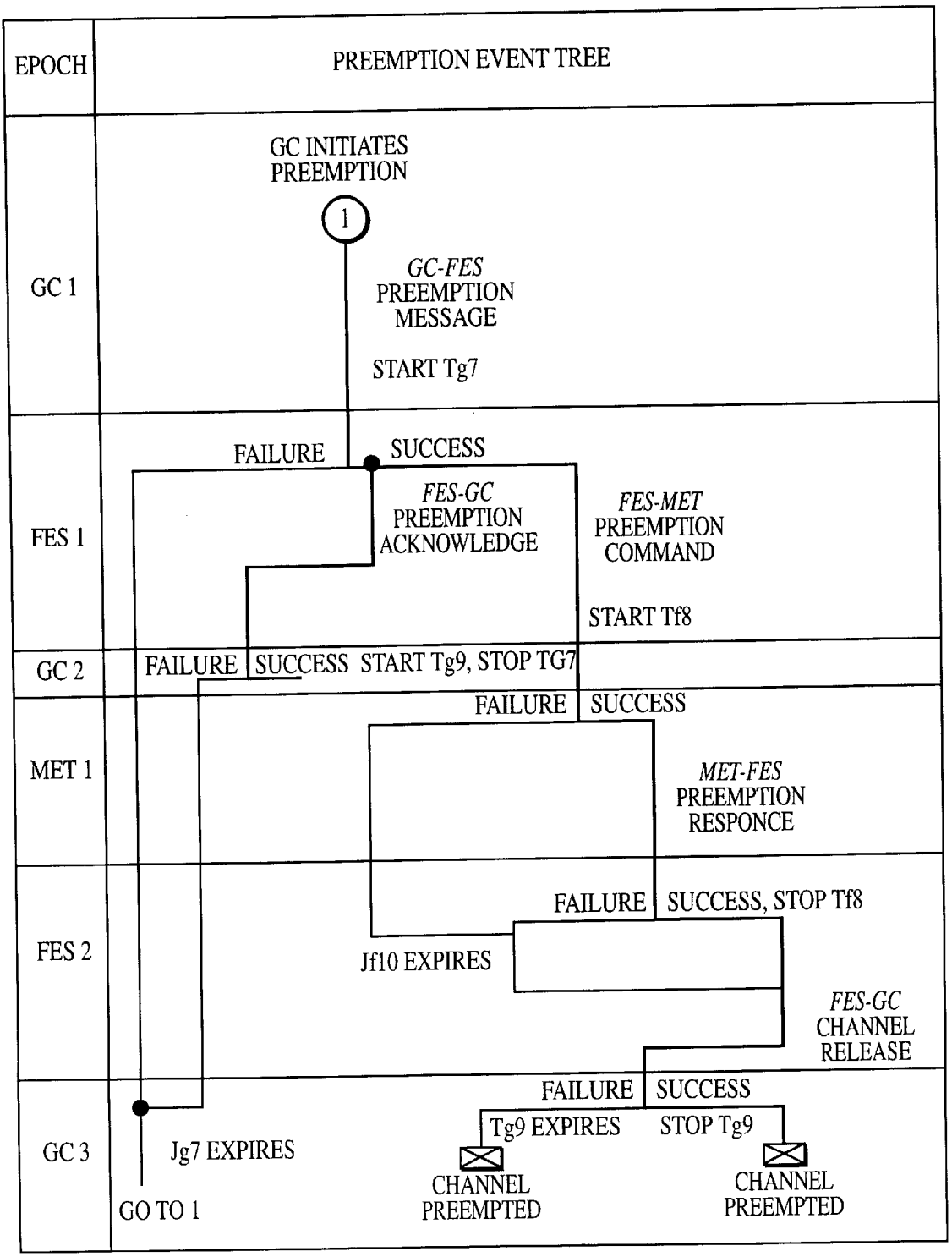
FIG. 32 is an illustration of an event tree for the preemption procedure.

The FES continues to send the preemptions command until either a preemption response SU is received from the MET or until timer Tf8 expires. Upon receiving a preemption command SU a MET switches the MET-C channel to inband signaling mode and transmits the preemption response SU for a number of frames equal to the duration of $N_8$ superframes. Upon reception of a preemption response SU or upon expiration of time Tf8, the FES sends a preemption acknowledge message to the GC via the FES-I channel. The sequence of messages used for channel preemption is shown in FIG. 31, and an event tree for the preemption procedure is shown in FIG. 32.

This sequential method of restoring the reserve pool makes it unlikely that actual preemption of an active call will be required. Most of the time there will be some unused resources in the system. If these are exhausted, most of the time there will be some idle capacity within the NCC because of the demand nature of the service. For instance, a busy hour call blocking probability of 0.01 means that there is a 99% chance that at least one channel is ideal at any given moment and generally there will be a number of channels idle.

Interference and preemption management in the mobile satellite system are based on a set of principles, translated into requirements that are designed to minimize the likelihood of interference, to restore service quickly when it does occur and to provide a capability to exercise preemption. At the equipment level, these principles include proper specification, testing and operational principle include monitoring, testing, control of malfunctioning equipment and transfer of affected operations to avoid interference. At the network administration level, they include internally and the assignment of frequencies within the system to minimize potential interference situations.

All mobile terminals using the mobile satellite system are generally required to meet a minimum set of specifications related to interference control before being permitted to operate. The specifications are as follows.

1. Built-in automatic self-test and monitoring capability with transmit inhibit interlocks are required.

2. Transmissions are inhibited unless the mobile terminal is correctly receiving a control channel such as a signaling channel, a data channel or a circuit mode C-channel according to specified criteria which include loss of received carrier for a defined time interval.
3. Maximum EIRP limits are specified, the terminal must have the capability to detect excessive EIRP and cease transmissions automatically.
4. The terminal shuts off upon command from its associated control stations. These commands are accepted through signaling channels, data channels or C-channels.
5. Each mobile terminal transmits a unique station identification number upon each attempt to gain access to a system.
6. All transmissions meet transmitted power spectral density limits specified by means of a mask. The mask defines the out-of-band emission limits associate with the modulated waveform.
7. Spurious emission meet limits at least as follows:
   above 1559 MHZ-55 dBc per 4 kHz
   below 1559 MHZ-83 dSc per 4 kHz.
8. The maximum allowable EIRP when the transmitter is off does not exceed −55 dBc per 4 kHz.
9. All terminals meet the applicable parts of FCC rules and regulations.

The transmitter emission requirements for MSAT Digital Telephone Service terminals relevant to the priority and preemption process described herein is described below.

Circuit switched Single Channel Per Carrier (SCPC) voice and data services are provided from a MET to an FES over the MET-C channel and from an FES to a MET over the FES-C channel. An overall channel rate of, for example, approximately 6.75 kbit/s is transmitted using QPSK modulation with a nominal channel spacing of 6.0 kHz. The data service offers a choice of different bit rates. Data is transmitted, for example, at an information rate of 4800 bit/s with rate ¾ convolutional coding. Data is also transmitted at an information rate of 2400 bit/s with rate ½ convolutional coding for more reliable operation.

Both voice and data modes share a similar frame structure and inband signaling is supported in each case. This facilities switching between voice and data modes very quickly. Facsimile (FAX) transmission uses the same coding and frame format as data at, for example, approximately 2400 bit/s.

MET-ST and MET-SR inbound signaling channels employ binary differential phase shift keying modulation (DPSK) with symmetrical DPSK signals (phase shifts of ±90) at an information rate of, for example, 1687.5 bps and transmission rate of 3375 bps (after rate ½ FEC coding of the signal units), for the MT-ST channel and at an information rate of 2531.25 bps, and a transmission rate of 3375 bps (after rate ¾ FEC coding of the signal units), for the MT-SR channel.

MET Operating Frequencies

Transmit Frequency Band: 1626.5 to 1660.5 MHZ

Channel spacing: 6.0 kHz

Tuning increments: 0.5 KHz

Frequency Control for the MET may be achieved via one of the following options, High Stability Reference Oscillator Option or Closed Loop Frequency Control Option.

The MET uses a high stability reference oscillator and maintains the transmit frequency within ±320 Hz of the nominal transmit channel frequency (i.e., a long term stability of 2×10) at L-band, at all times, without requiring adjustment more frequently than once per three years.

Under the closed loop frequency control option, the MET is required to satisfy all of the following:
(a) The transmit frequency error must generally be maintained to within ±100 Hz relative to the received GC-S carrier or the FES-C carrier. This requirement includes any MET frequency drift that may occur between maintaining bursts on the channel when the MET is engaged in a transmission. When the MET is not engaged in a call, it acquires its frequency reference from the GC-S channel transmitted by the NCC to maintain that above frequency accuracy.
(b) If the MET fails to lock onto the outbound carrier for any reason, the MET ceases all transmissions until the problem is known to have been corrected.
(c) In the absence of an outbound carrier for an interval equal to 15 seconds or less (as during periods of long fades or blockage), the MET reference oscillator has an inherent stability of one part per million or better.

Upon reception of the outbound channel from the FES, each operating Aeronautical MET measures the offset of the actual received frequency relative to the nominal frequency expected.

The frequency for any transmission directed towards a given FES is obtained as the nominal channel frequency corrected by the received frequency offset taken with the opposite sign and the appropriate scaling factor to account for the ration of the transmit-to-receive frequency. Note: For a receive frequency band of 1530 to 1559 MHZ and a transmit frequency band of 1626.5–1660.5 MHZ, this ratio is given approximately by 1.06.

The maximum MET transmitter EIRP during periods when the carrier is activated shall be 16.5 dBw for mobile directive antennas having off-axis discrimination in the azimuth plane and 15 dBw for mobile directive antennas that are omni-directional in the azimuth plane.

When not transmitting and during speech pauses, the MET does not radiate, from the antenna, more than −45 dBw EIRP for any single carrier, or an EIRP spectral density greater than −70 dBw in any 4 kHz band.

Figure 33:
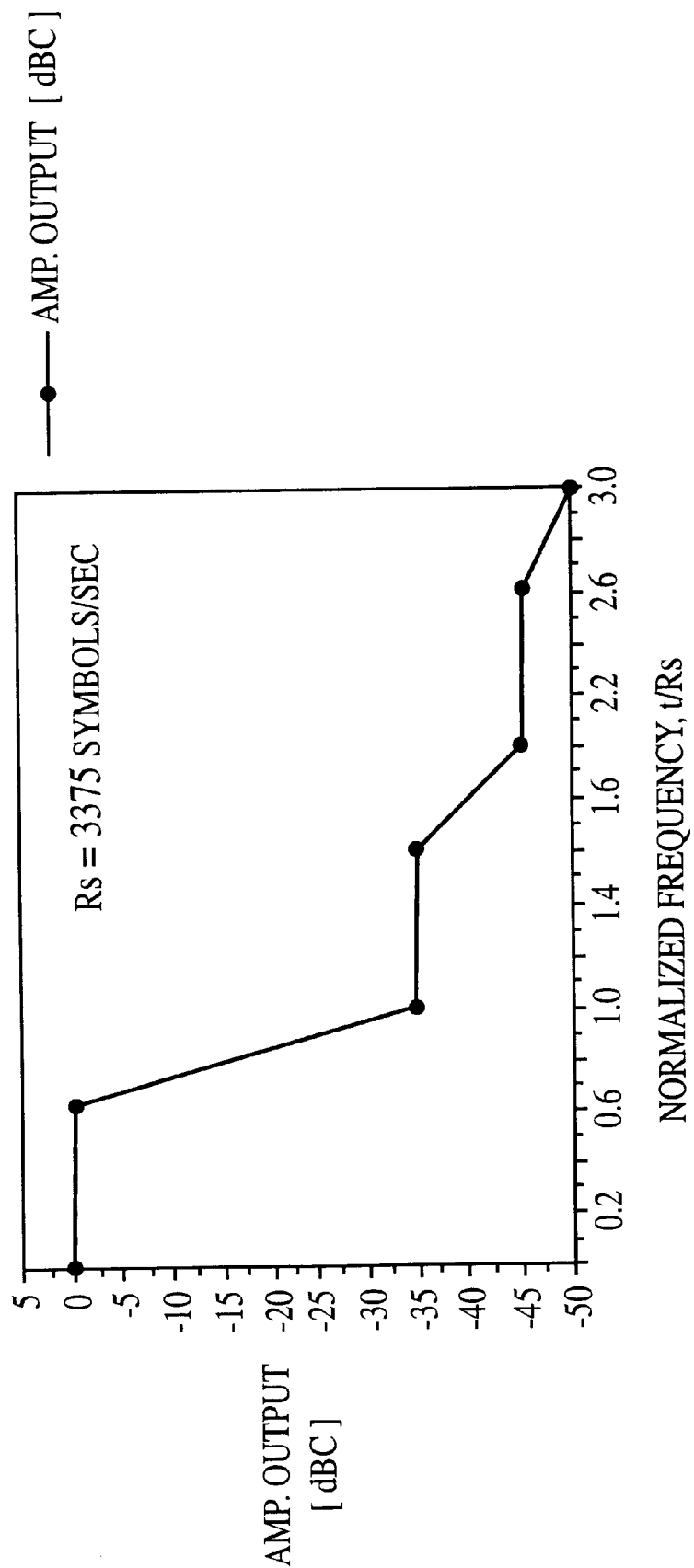
FIG. 33 is an illustration of the spectrum of the signal at the output of the power amplifier being within the spectral limit mask.
Figure 34:
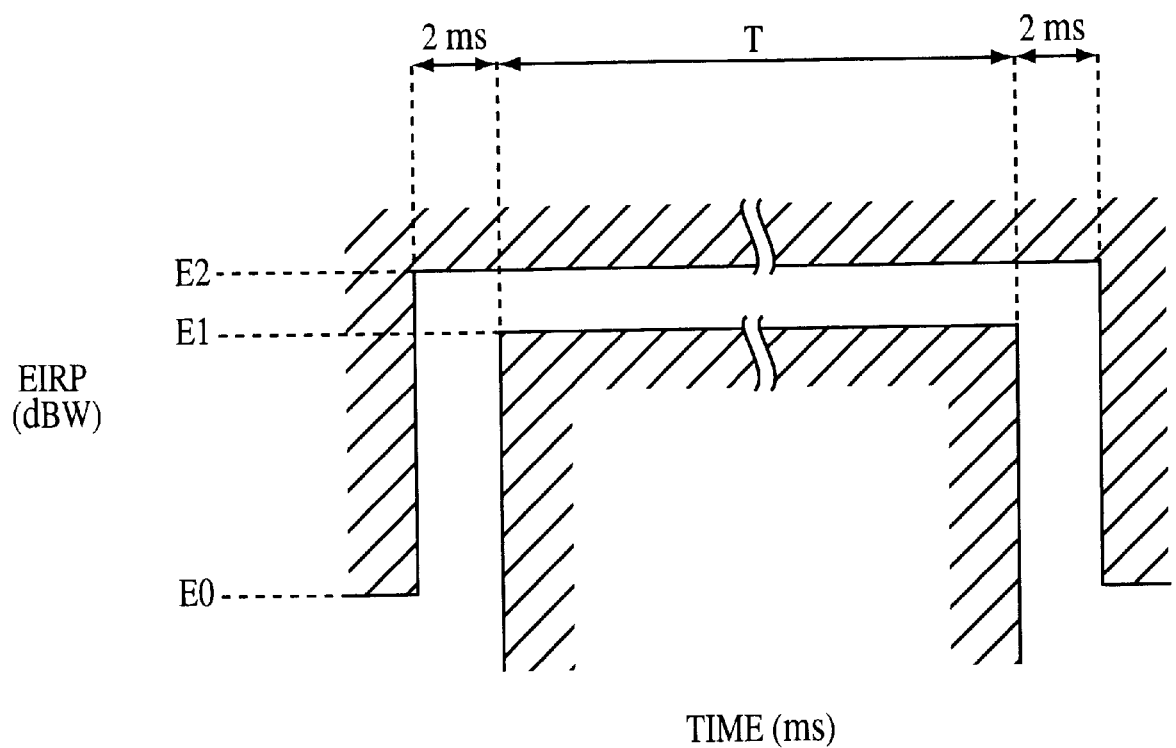
FIG. 34 is an illustration of the rise and fall times of MET transmission, at the MET antenna which comply with the timing limit mask.

The spectrum of the signal at the output of the power amplifier is within the spectral limit mask shown in FIG. 33. The rise and fall times of MET transmission, at the MET antenna comply with the timing limit mask shown in FIG. 34 where:

E2=Maximum MET EIRP value.

E1=Minimum MET EIRP value.

E0=Maximum transmitter OFF MET EIRP value.

T=Nominal duration for the transmission (i.e., 80 ms for MET-ST and MET-SR bursts).

The MET continuously monitors the output of the transmitter. The MET transmitter is deactivated, and any call in progress cleared (without further transmission), if its output produces an EIRP that exceeds the nominal EIRP by more than 3 db.

The transmitter remains deactivated until the power on the MET is cycled. The monitoring system complies with the following requirements:
(a) it obtains its input from the RF output of the HPA.
(b) the power detector has a rise time of less than 0.2 ms, and an averaging time of less than 10 ms.

The MET monitors the duration of all transmission at L-band. The MET transmitter is deactivated (without further transmission) in the following cases:
(a) the transmitter is found to be operating when the MET is not transmitting any MET-ST/SR signaling message and is not engaged in a call.

(b) the duration of a signaling message over the MET-ST/SR channel exceeds by 20 ms the nominal duration.

The transmitter remains deactivated until the power on the MET is cycled. The burst duration monitor complies with the following requirements:

(a) it obtains its input from the output of the HPA and is capable of determining the duration of any burst exceeding a level corresponding to a nominal EIRP of +2 dBw.

(b) the burst duration limit in the monitor is set in advance of each MET-ST/MET-SR transmission.

Figure 35:
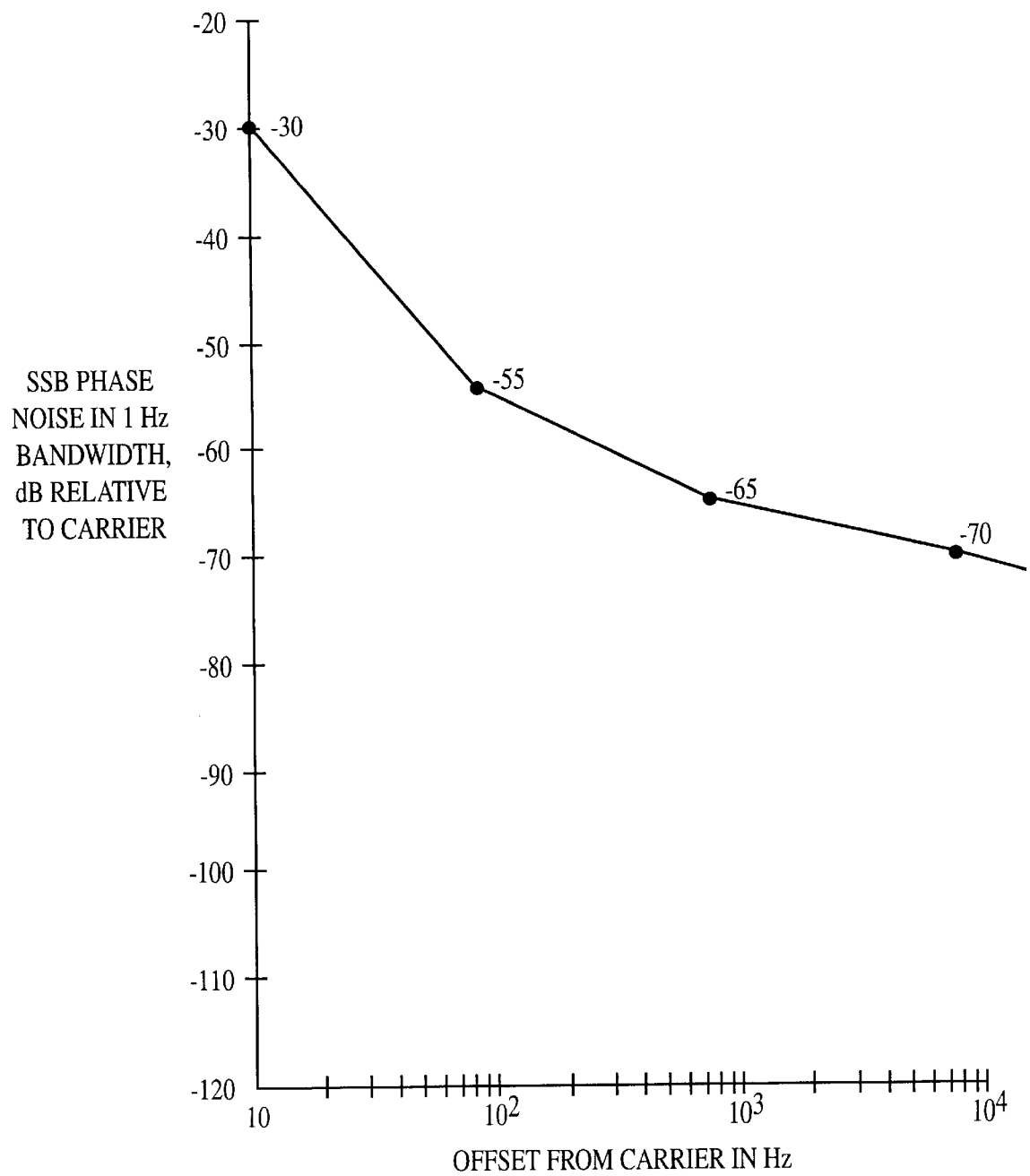
FIG. 35 is an illustration of the phase noise induced on the transmitted carrier at L-band with a single sideband power density continuous spectrum not exceeding the limit mask.

The phase noise induced on the transmitted carrier at L-band has a single sideband power density continuous spectrum not exceeding the limit mask illustrated in FIG. 35. If any discrete phase noise components are present at a level which exceeds the limit mask, the 10 Hz to 10 kHz band is considered to be divided into a number of continuous frequency sub-bands each containing no more than 1 discrete component. The width of a frequency sub-band containing a discrete component does not generally exceed F/6 Hz, where F is the offset frequency of the discrete component.

In each frequency sub-band, the sum of the integrated phase jitter due to the continuous spectral component and the phase jitter due to any discrete component does not exceed that allowed by integrating the limit mask over the same frequency sub-band. In addition to the above requirement, no discrete component exceeds the limit by more than 10 db.

Within 100 ms after reception of the tuning command by the synthesizer, the output of the synthesizer has settled within ±50 Hz and ± relative to the stable value. While transmitting a continuous carrier at any frequency in the MET transmit band and at the maximum output power, the MET complies with the following requirements:

(a) in the MET receive band, any spurious signals and noise appearing at a MET receiver input must be generally low enough to satisfy the MET G/T requirements.

(b) in the MET transmit band, excluding a ±10 kHz band about the assigned transmit carrier frequency, the composite spurious and noise output EIRP (including phase noise and modulation sidebands) radiated by the MET in any 4 kHz band is at least 60 dB below the level of the unmodulated carrier;

(c) in a ±10 kHz band about the assigned transmitted carrier frequency, the phase noise requirements apply. Additionally, in this same band, the EIRP due to any spurious output which is neither phase noise (discrete or continuous) nor a QPSK modulation product is at least 40 dB below the level of the unmodulated carrier.

The EIRP of any radiated harmonic in any direction, is less than −25 dEw for any frequency up to 30 GHz. The composite spurious and noise does not generally output EIRP (excluding harmonics) radiated by the MET does not generally exceed the following values outside the MET transmit band in any 4 kHz band.

Below 1559.0 MHz the level is less than −85 dBw.
From 1559.0 MHz at −85 dBw the level is below a straight line
  terminating at 1611.5 MHZ at −77 dBw.
From 1611.5 MHz at −77 dBw the level is below a straight line
  terminating at 1626.5 MHZ at −48 dBw.
The level is less than −48 dBw between 1626.5 MHZ and 1660.5MHz.
From 1660.5 MHz at −48 dBw the level is below a straight line
  terminating at 1751.5 MHZ at −85 dBw.
  terminating at 1751.5 MHZ at −85 dBw.
From 1675.5 MHz at −77 dBw the level is below a straight line terminating at 1751.5 MHZ at −85 dBw.
Above 1751.5 MHZ the level is less than −85 dBw.

All mobile terminals are subject to qualification and performance verification testing. The objective are to confirm non-interfering operation and specification compliance, to confirm proper response to cease emission procedures and commands, and to confirm minimum operational performance capability in their intended application. All terminals are required to pass commissioning tests prior to commencing operations upon initial entry into the system, or after having been denied access due to commissioning failure.

All terminals are subject to performance verification testing once commissioned. The NOC is able to address any terminal in the network via the control system and cause it to undergo performance verification testing is grounds for shut-down and access denial.

All FESs include self-test capabilities with means for detecting faults and shutting down potentially interfering transmission. They must pass acceptance tests before being permitted to operate through the satellite, and are subject to performance verification testing once declared operational. FESs meet minimum spurious emission limits, modulated carrier spectral limits. They are subject to shut-down by the NOC if necessary to protect the system and users of the system.

The mobile satellite system maintains RF monitors at L-band and at the feederlink frequencies capable of analyzing the frequencies, power and spectral distributions of all signals passing through its satellites. These monitors are operated from the NOC with the data collected by the monitors returned to the NOC for analysis and action.

The Digital Telephone NCCs constantly monitors the signaling channels under their jurisdiction, collecting data on the access success or failure of mobile terminals attempting to access the network. FESs collect similar data for mobile terminals using C-channels and pass it to the NCCs. The NCCs pass this information to the NOC for analysis and action. If a terminal is suspected of improper performance, the NOC may institute performance verification tests or commend immediate shut-down. Shut down comments are directed to the offending mobile either through the NCC generated signaling channel if the mobile is in the idle or access sate, or through the FES C-channel in-band signaling channel if it is connected to an FES. The latter mode operates as described for preemption.

The AMS(R)S system requires special protection because of the safety aspects of its use. AMS(R)S using the satellites will be managed as an independent network, with its own control system managing real-time access to its radio channels and GESs. These AMS(R)S radio channels are assigned to frequencies that are not typically shared with or frequency reused by other MSS carriers operating in other networks using the satellites. This segregation of frequencies, although not required, minimizes the chances for interference to AMS(R)S and simplify the operations of the system as a whole.

Safety or non-safety Circuit Mode radio channel use can be identified at the time of call initiation. Hence it is possible to assign safety calls to radio channels designated as AMS (R)S radio channels and non-safety calls to MSS (non-safety) radio channels. The segregation and special protection of circuit mode radio channels applies only to AMS(R)S designated channels. It does not generally apply to non-safety radio channels, managed by an independent AMS(R)S network, that are used only for non-safety communications. The later will be treated as any other MSS channels in the system.

International intersystem frequency coordination are carried out in accordance with the procedures established by the Article 11 of the ITU Radio Regulations. Frequency reuse between systems are permitted only when the coordination criteria are met. If the criteria are not met, separate spectrum (not shared) are used.

Figure 36:
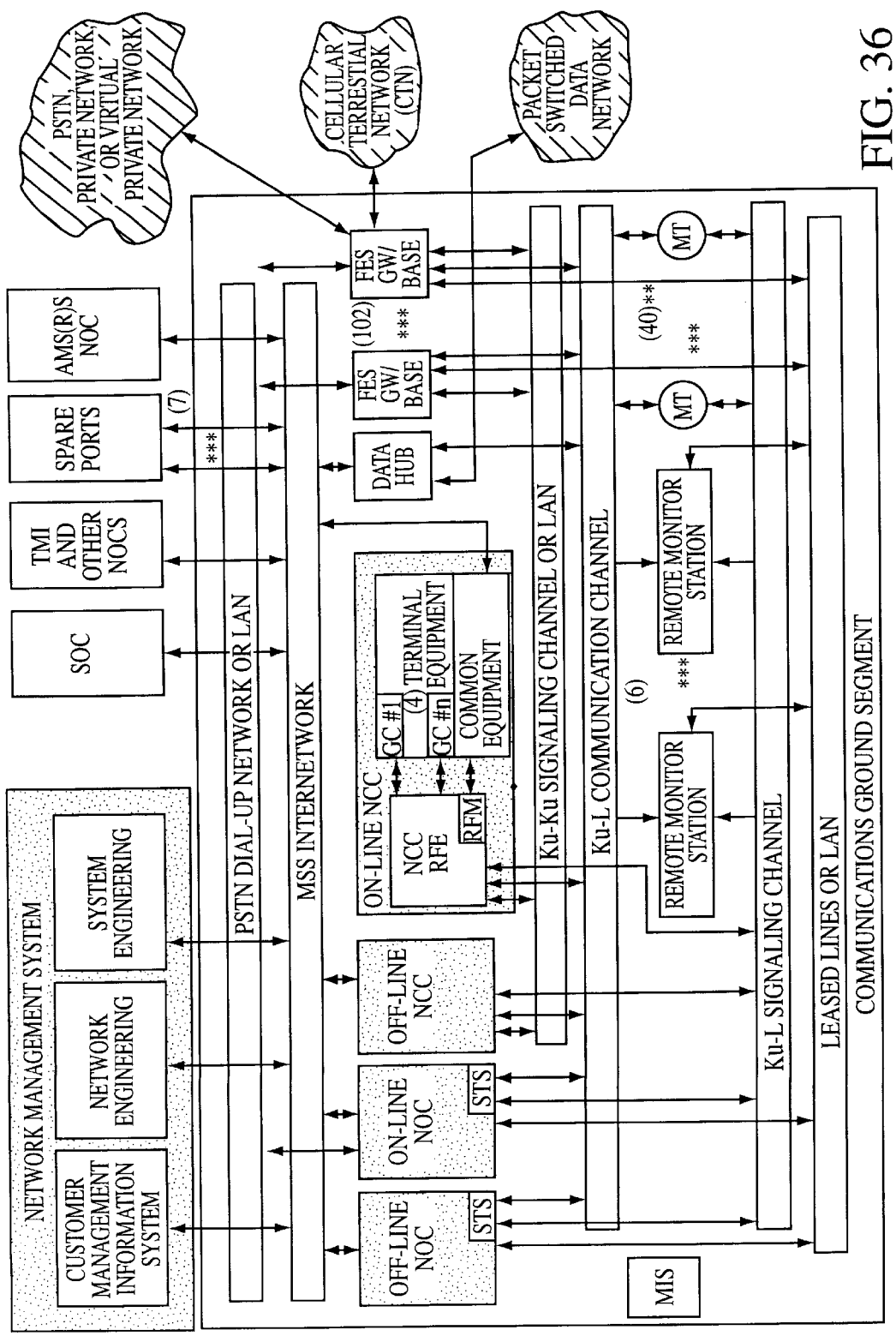
FIGS. 36–37 are illustrations of the NOC interacting with one or more external organizations.
Figure 37:
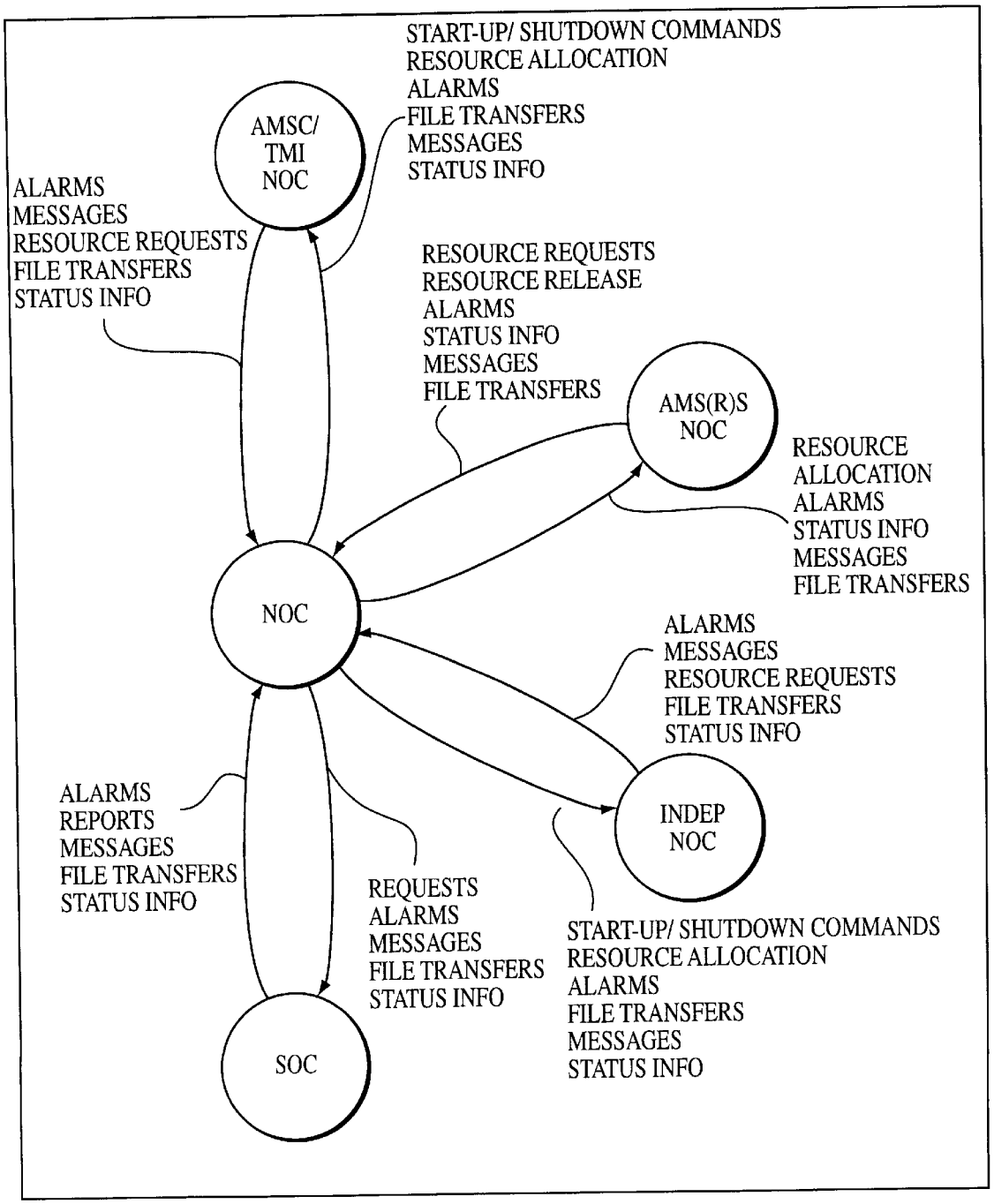

To effectuate the above described priority and preemption features, the NOC which interacts with a number of external organizations as depicted in FIGS. 36–37, is used. As illustrated in FIGS. 36–37, these external organizations include interactions with the SOC in order to maintain cognizance of the availability of satellite resources and to arrange for any necessary satellite reconfiguration to meet changed traffic patterns; interactions with the NOCs of private network operators who lease bandwidth and power on a full period basis; interactions with the NOCs of organizations that provide aeronautical services for safety and regularity of flight (AMS(R)S) as well as other aeronautical services.

Transactions with external elements fall into two categories: Automatic transactions and Console transactions. Automatic transactions comprise transactions handled by machine to machine communications without human intervention. Console transactions comprise transactions handled by machine to machine communications but which are initiated controlled, and authorized by human operators.

Figure 38:
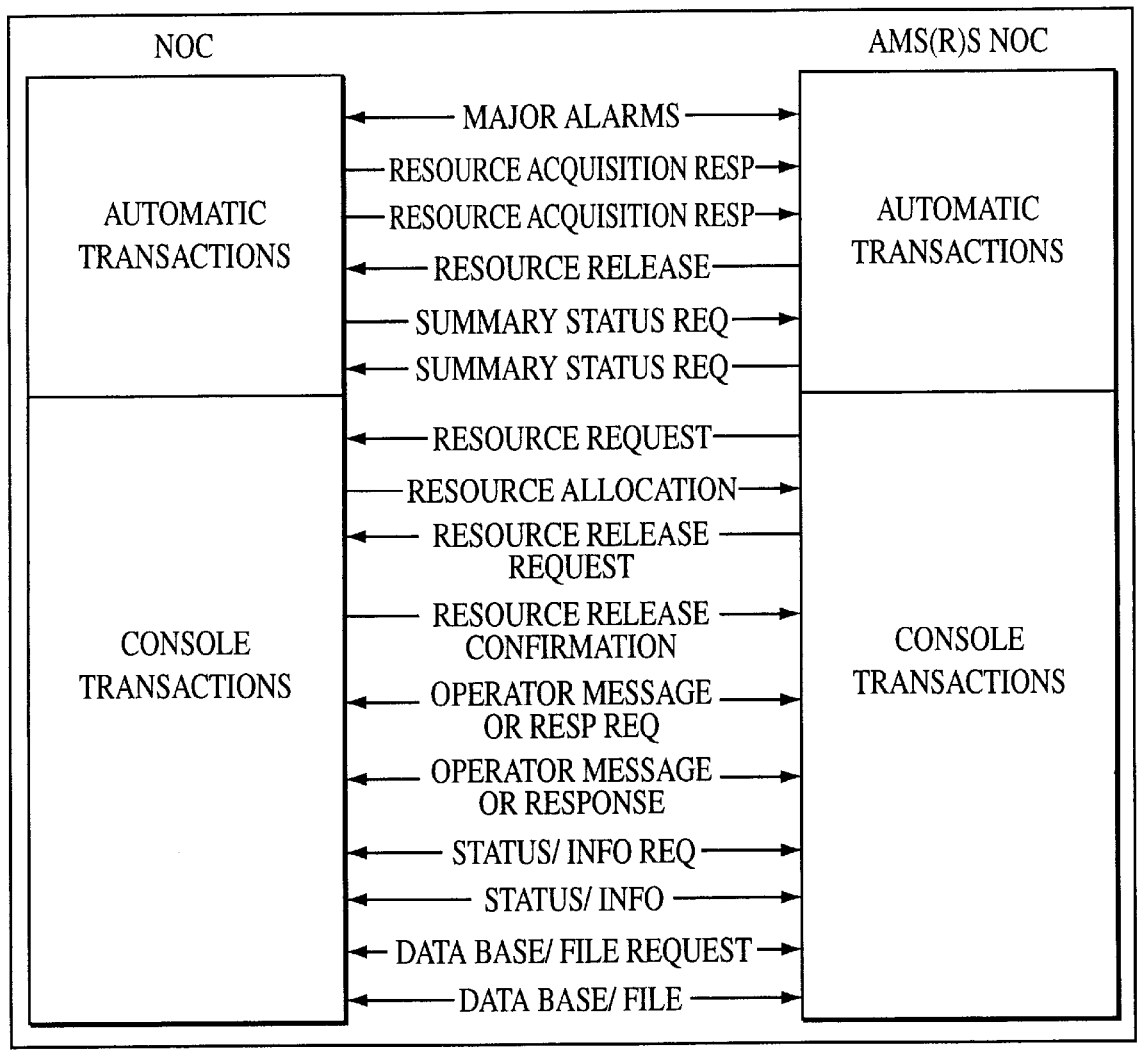
FIG. 38 is an illustration of the transactions occur between the On-Line NOC and AMS(R)S NOCs.

Transactions occur between the On-Line NOC and AMS(R)S NOCs as illustrated in FIG. 38. The following automatic transactions are supported between the NOC and an AMS(R)S NOC on the MSS Internet work:

Major Alarms (NOC to AMS(R)S NOC—This transaction comprises a summary message intended to indicate only that a major alarm condition has occurred with the MSS system and to alert operators to the possible requirement for action or intervention.

Major Alarms (AMS(R)S NOC to NOC)—This transaction comprises a summary message intended to indicate only that a major alarm condition has occurred within the AMS(R)S system and to alert operators to the possible requirement for action or intervention.

Resource Acquisition Request (AMS(R)S NOC to NOC)—This transaction comprises a request for satellite resources under emergency conditions. If circuits are not available to service this request, pre-emption occurs.

Resource Acquisition Response (NOC to AMS(R)S NOC)—This transaction comprises a positive acknowledgment of a Resource Acquisition Request identifying channels or frequencies.

Resource Release (AMS(R)S NOC to NOC)—This transaction shall comprise a message detailing release or partial release of resources acquired under emergency conditions.

Summary Status Request (Bidirectional)—This transaction shall comprise a periodic automatic message requesting a confidence summary status of report of the condition of a satellite or the NOC/NCC.

Summary Status Report (Bidirectional)—This transaction shall provide a summary confidence report showing the state of major operational conditions of a satellite and either the AMSC/TMI NOC/NCC or AMS(R)S NOC/NCC.

The following Console transactions are supported between the NOC and AMS(R)S NOC on the MSS Internet work:

Operator Message Request (Bidirectional)—This transaction comprises a message between operators requesting operational information.

Operator Message Response (Bidirectional)—This transaction comprises a message between operators conveying requested operational information.

Status/Info Request (Bidirectional)—This transaction comprises a request for information or reports which are electronically generated or stored, but which requires operator intervention for access, transmission, or authorization.

Status/Info (Bidirectional)—This transaction comprises transmission of information or reports which are electronically generated or stored, but which requires operator intervention for access, transmission, or authorization and shall occur in response to a request.

Database/File Request (Bidirectional)—This transaction comprises a request for database information or files which are electronically generated or stored, but which require operator intervention for access, transmission, or authorization.

Database/File (Bidirectional)—This transaction comprises transmission of database information or files which are electronically generated or stored, but which require operator intervention for access, transmission, or authorization and occurs in response to a request.

Resource Allocation Request (AMS(R)S NOC to NOC)—This transaction comprises a request for allocation of satellite resources for general use, such as resale to customers/users. This transaction does not result in pre-emption.

Resource Allocation Response (NOC to AMS(R)S NOC)—This transaction comprises a response to a Resource Allocation Request and shall indicate a denial or details of a full or partial allocation of requested resources.

Resource Release Request (Bidirectional)—This transaction comprises a message requesting de-allocation of non-emergency resources.

Resource Release Acknowledge (Bidirectional)—This transaction comprises a response to a Resource Release Request acknowledging or declining release of satellite resources.

NOC Network Configuration Manager

The NOC Network Configuration Manager is the modules or routine in the NOC that implements the following general network management functions, including the priority and preemption processes: network element management startup, shutdown, and switch over; MET and FES commissioning, decommissioning and configuration management; satellite resource configuration management; virtual network configuration management; management of routing tables; and AMS(R)S resource management. The AMS(R)S resource management function provides expanded capabilities to handle the acquisition and release of resources under emergency conditions, as described above.

In addition to supporting the startup of other network elements, the NOC configuration management subsystem provides NOC software startup and self-test capability which is used to create and verify the required NOC internal configuration. The element switch over function provides the NOC operator with the capability to switch the status of the On-Line and Off-Line NOCs. It also provides the capability to switch the status of NCC when a normal NCC switch over cannot be performed.

Satellite resource configuration management provides the functions required to distribute satellite resources among the MSS, the AMS(R)S NOC and other external entities which share satellite resources.

AMS(R)S Resource Management and Provisioning

A special feature of the AMS(R)S resource management function is that it responds to Resource Acquisition Requests in real-time. It performs the following functions:

Satisfies AMS(R)S request from NOC reserve pool;

Replenishes the NOC reserve with power and frequencies taken from GCs, Data Hub and independent NOCS;

Replenishes the NOC reserve with power and frequencies taken from Independent NOCs which are leasing frequencies which can be allocated to the AMS(R)S NOC;

If a Resource Acquisition Request cannot be satisfied from the pool, the NOC requests the NCC, Data Hub or an Independent NOC to supply additional unused frequencies, or if there are no unused frequencies, to preempt active calls;

Replenishes the power and frequencies taken from the Gas, Data Hub, and Independent NOCs when these are no longer needed by the AMS(R) NOC.

When the AMS(R)S requires additional channels to support aeronautical emergency services, it transmits an AMS(R)S resource provisioning request to the NOC. The NOC always is ready to receive this request from the AMS(R)S. The operator is alerted to the arrival of an AMS(R)S resource provisioning request by a message displayed on a status screen. The message is transmitted by AMS(R)S to the NOC via the MSS Internet work.

The NOC fulfills the request with frequencies drawn from a reserve managed by the NOC. These frequencies are withheld from GC circuit pools so that a supply of additional channels can be immediately supplied to the AMS(R)S when needed. The NOC transmits the response to the AMS(R)S via the NCS Internet work or a similar electronic medium.

After fulfilling a Resource Acquisition Request with frequencies drawn from its reserve pool, the NOC then proceeds to replenish the reserve by obtaining unused frequencies from the GC circuit pools or from independent NOCs which lease frequencies from AMSC that lie within the AMS(R)S band. This function requires the NOC to solicit unused frequencies from GCs and from INOPS using the NCS Internet work as the communications medium.

The network configuration manager also manages the MSS databases managed by the NOC, used in conjunction with the priority and preemption feature. The configuration manager updates the circuit pool allocated to Control Groups. Each defined circuit pool is assigned a rank order which shall determines the order in which frequencies are used for AMS(R)S provisioning. The rank order is determined by the circuit pool type.

The configuration manager updates NCC configuration databases by initiating Configuration Control Transactions routed to the NCC through the NOC-NCC interface software. The configuration manager implements configuration changes by initiating Configuration Control-GC Operating State Transactions routed to the NCC through NOC-NCC interface software.

The configuration manager responds to Resource Allocation Request Console Transactions from the AMS(R)S NOC. The request is automatically added to a resource allocation request log file. The log file is displayable by the operator who has the capability to sort the file on various criteria, including but not limited to status, requester, and request date. The NOC operator is signaled by a short audible signal and by visual indicator, such as a flashing icon on all NOC displays, that a new request has been received. The operator has the capability to acknowledge the signal.

The NOC operator has the capability to change the status of requests which have not been responded to. The operator also has the capability to modify the allocation resources. The NOC operators also have the capability to initiate a Resource Allocation Response Console Transaction with the requesting NOC. The NOC resource database is updated to show the updated configuration.

The NOC processes Resource Acquisition Request messages from the AMS(R)S NOC. This is an emergency request for resources which are processed with the highest priority. The configuration manager runs at a priority which is higher than any other NOC process, preventing the operating system from scheduling and running another task in its place. An exception is that messages such as Resource Release messages which could replenish the AMS(R)S pool are processed with equal priority to that of Resource Acquisition Request messages.

The configuration manager reserves the required resources in the AMS(R)S pool. If the resources in the AMS(R)S pool are insufficient, the NOC obtains additional resources by initiating a Resource Preemption Command to the NCC or an Independent NOC utilizing the priority rules, defined above. This command will cause frequency preemption if no free frequencies are available.

Having reserved or acquired the resources, the NOC initiates a Resource Acquisition Response transaction with the AMS(R)S NOC defining the resources. It also initiates an AMS(R)S Reserve Pool Updated Transaction with the Off-Line NOC.

If the AMS(R)S pool has been depleted below a configurable level, the NOC attempts to replenish the pool by requesting that the NCC reserve circuits (i.e., not reassign them after call completion) for the purpose of replenishing the circuit pool. Circuits are not be preempted to replenish the circuit pool. Having completed processing this transaction, the NOC resumes execution at its previous priority.

The NOC processes Resource Release messages from the AMS(R)S NOC. The configuration manager:

Runs at a priority which is higher than any other NOC process, preventing the operating system from scheduling and running another task in its place. The Resource Release message is processed at the same priority as the Resource Acquisition Request message.

Indicates in the AMS(R)S pool data base that the resources specified in the message are again available.

Acknowledge the message by sending a Resource Release Acknowledgment message to the AMS(R)S NOC.

Having a completed processing this transaction, the NOC resumes execution at its previous priority.

The NOC responds to a AMS(R)S Reserve Pool Update Transaction from the Off-Line NOC by indicating in its AMS(R)S Reserve Pool database, that the specified records in the Off-Line NOC database have been updated. The NOC periodically determines whether the AMS(R)S pool has been replenished to resource levels above a configurable threshold. When this occurs, the excess resources are returned to their original sources. The channels are returned in a sequence determined by the priority level and the rank order of the designation. Having redistributed the resources, the NOC initiates a AMS(R)S Reserve Pool Updated Transaction with the Off-Line NOC.

AMS(R)S Resource Provisioning—Summary

The frequency bands 1545 to 1555 MHZ and 1646.5 to 1656.5 MHZ have been allocated internationally to the Aeronautical Mobile Satellite (Route) Service (AMS(R)S) on a primary basis. Non-AMS(R)S services, or MSS, are permitted to use these bands in Canada and the U.S., subject to the condition that AMS(R)S channel requirements shall be satisfied fully. In the U.S., the bands 1555 to 1559 MHZ and 1656.5 MHZ are also subject to the same condition. When the AMS(R)S NOC requires additional bandwidth, the MSS NOC must immediately respond with the requested amount, even if in some rate cases non-AMS(R)S service using the band may have to be preempted to do so.

The requests for, and responses to, AMS(R)S NOC demands for additional channels within the defined space resource are through the AMS(R)S NOC interface. If the MSS Internet work fails or is temporarily disabled for scheduled maintenance, the NOC operator will communicate with AMS(R)S, for example, via a standard telephone supplied by the customer within the NOC facility. The NOC operations personnel then manually enter AMS(R)S specific requests and responses for space resources. Event records are generated for each transaction and made available for transfer to NMS and NOC operations.

The AMS(R)S system is assigned a block of full period channels for normal use. The size of the block will change from time to time according to need under the direction of the Customer Service-NOC interface. When the AMS(R)S has need for additional temporary channels, it requests them of the NOC. The NOC establishes and maintains a reserve pool of channels of configurable size (the AMS(R)S reserve pool). Transfers to and from the AMS(R)S NOC are through this pool. As channels are withdrawn or returned to this AMS(R)S reserve pool, the size of the pool is maintained constant.

When the circuit in the reserve pool is assigned to AMS(R)S, the NOC requests the NCC or Independent NOC to reserve (i.e., not reassign after call completion) one or more circuits for the purpose of replenishing the AMS(R)S reserve pool. In the event that the AMS(R)S circuit bandwidth exceeds that of an MSS circuit, the number of reserved circuits is such that their total bandwidth is at least the bandwidth of an AMS(R)S circuit in the reserve pool. The reserved circuits are contiguous in frequency and is adjacent to the last reserved or preempted circuits allocated to AMS(R)S. When reserved circuits are freed, either immediately or following call completion, the NCC allocates these circuits to the NOC and inhibits all further assignment of these circuits for MSS purposes until released by the NOC.

When an AMS(R)S request is received at the NOC and the reserved pool is depleted, the NOC preempts one or more circuits for the purpose of assigning them to AMS(R)S. In the event that the AMS(R)S circuit bandwidth exceeds that of an MSS circuit, the number preempted circuits is such that their total bandwidth is at least the bandwidth of an AMS(R)S circuit in the reserve pool. The preempted circuits are contiguous in frequency and adjacent to the last reserved or preempted circuits allocated to AMS(R)S.

If it is necessary to preempt an in-progress call, the call is terminated in accordance with established procedures. When the reserve pool has an excess of channels, the NOC transfers channels from the reserve pool to GCs or Independent NOCs. Reserved or preempted channels are generally released in the inverse order of allocation (i.e., last allocated channel shall be released first).

To initiate preemption of a call in progress, the GC sends a preemption message via the GC-I channel to the FES through which the call has been established. The preemption message contains the call identifier corresponding to the call that is to be preempted. Upon receiving the preemption message, the FES signals call release to the terrestrial network, switches the appropriate FES-C channel to call setup mode, transmits a preemption command SU to the MET via the FES-C channel, and starts timer Tfr.

The FES continues to send the preemption command until either a preemption response SU is received from the MET or until timer Tfr expires. Upon receiving a preemption command SU, the MET switches the MET-C channel to call setup mode and transmits the preemption response SU for a number of frames equal to the duration of six (6) superframes. Upon reception of a preemption response SU or upon expiration of timer Tfr, the FES sends a channel release message to the GC via the FES-I channel. As discussed above, the sequence of messages used for channel preemption is shown in FIG. 31, and an event tree for the preemption procedure is shown in FIG. 32.

Upon NOC request the NCC Controller requests a designated GC to reserve specified satellite resources for AMS (R)S use from the GC's free pools. Satellite source specifications identify the L-Band beam and the specific frequency segment which is being requested. The GC assesses free pool usage to determine the portion of the request that is satisfied. When the free pool bandwidth so identified is adequate to meet the NOC request, the GC reports and identifies the satellite resources that are being provided. The GC inhibits further use of the resources until returned by the NOC.

When the free pool resources so identified are less than the amount requested by the NOC, the GC inhibits any further assignment of the requested resources to new call requests. As calls terminate normally, the GC assesses the applicability of the freed resources to the NOC request. Applicable resources are deleted from the pool and accumulated for the NOC requirement. When adequate resources are accumulated, the GC reports and identifies the resources that are being provided. The GC inhibits further use of the resources until returned by the NOC.

Upon NOC request, the NCC Controller requests a designated GC to preempt specified satellite resources for AMS(R)S use from the GC's circuit pools. The GC first assesses free pool usage, and determines the portion of the request that can be met. When the free pool bandwidth so identified is adequate to meet the NOC request, the GC reports and identifies the satellite resources that are being provided. The GC inhibits further use of the resources until returned by the NOC.

When the full preemption request cannot be met from the free pools, the GC evaluates resources allocated to calls in progress for preemptive action. The preemption evaluation process retrieves the specific frequency resources requested by the NOC. As each call is identified, the GC sends preemption messages to the associated FES, and updates the associated call record. Preemption messages in the Interstation Signaling channels are processed at the highest priority level. Upon receipt of the preemption acknowledge message from the FES, the GC waits for a Channel Release message from the FES. When this arrives, the GC terminates the call indicating the preemptive action and updates the call record. The preempted satellite resources are deleted from the circuit pool and the spacecraft power assigned to the preempted circuits are subtracted from the current total power calculation for the pool and beam.

The preemption process continues until all requested resources can be provided. The GC reports and identifies the resources that are being provided. The GC inhibits further use of the resources until returned by the NOC.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

DICTIONARY ITEMS AND DEFINITIONS

Actual GSI
Definition:
Current GSI based on TDM changes during MET operation. This field is populated by the NOC based on actions on the CGS. The CMIS cannot create or update this field.

Call Barring Inbound/Outbound Flag
Definition:
Describes the call barring entry as applying to incoming or outgoing calls. If the Call Barring List is flagged as Inbound, it applies to calls the MET is receiving. If the Call Barring List is flagged as Outbound, it applies to calls the MET is making.

Call Barring Include/Exclude Flag
Definition:
Describes the call barring entry as an included (legal) call or an excluded (illegal) call. When a Call Barring List is flagged as Include, the MET may only make calls to the numbers or NPAs on the list. Any other call would be denied. Conversely, if a Call Barring List is flagged as Exclude, the MET may make calls to any number or NPA except those on the list.

Call Barring List Value
Definition:
Numbering plan area or phone number in the call barring list. The values that appear in the list are the phone numbers or NPAs that the MET's restriction apply to. The types of restrictions are dictated by the flags for Include/Exclude and Inbound/Outbound Call Barring.

Call Trap Flag
Definition:
Indicates call trapping has been initiated for the MET. The GC will trap MET states as they change during MET CGS activity. This information will be provided to the CMIS on a call record.

Call Type
Definition:
Service available on the MET. There are four service types: voice data (2400 or 4800 baud), fax, and alternate voice data (avd). For each service the mobile is registered, a service record is created with a single call type indicated. This call type in turn has a unique mobile identification number (min) associated with it.

Carrier
Definition:
Name of preferred IXC carrier. This field is a switch field used to support equal access to long distance carriers.

Cellular ESN
Definition:
32 bit ESN that is used by the switch. For dual mode cellular/satellite phones it is the ESN for the cellular portion of the phone and would match the ESN used by the home cellular carrier to identify that mobile terminal.

CGS Time Stamp
Definition:
Time stamp was created/modified. Part of the notification of success or failure of CGS action. Not created or updated by CMIS.

Channel Spacing
Definition:
Multiple of frequency step size. This element is a characteristic of the MET Class. CMIS will only have the MET Class ID that a particular METs equipment maps to. NE originates this and other data that describes the MET Class and sends it to the NOC.

Check String
Definition:
Constant used by the GC to validate the encryption/decryption algorithm. This element is related to the ASK.

Commanded GSI
Definition:
Set by CMIS this is the original GSI stored as a NVRAM (non-volatile RAM) parameter by the MET. Required for each new MET registered for service. This element is used by the MET to tune to a GC-S channel during commissioning on the CGS. Without the GSI the MET is incapable of logging on to the CGS.

Configuration File
Definition:
A file containing the contents of a working configuration that has been saved to disk under a unique name.

Current Configuration
Definition:
The set of resources that exist in the configuration most recently sent to or received from the NOC. This is assumed to be the actual configuration of the traffic bearing network at any given time.

Commit a Resource
Definition:
Explicit engineer action to add a fully provisioned interim resource to the working configuration.

Control Group ID
Definition:
The CGS is divided into Control Groups that contain circuit pools, signaling channels, bulletin boards, METs, and VNs. A MET may only belong to one Control Group. The control Group assignment is based on the virtual network membership. All VNs a MET is a member of must be in the same control group.

Cust Group
Definition:
Identifier for a specialized routing information used at the switch (e.g., 1024 available cust groups per MSR). Dialing plans will be implemented for groups of customers through a Customer Group (Cust Group).

Data Hub Id
Definition:
Used to route messages during PSTN to IVDM call setup to the proper data hub. This is only applicable for METs that are participating in the Mobile Packet Data Service.

Date Last Tested
Definition:
Time stamp of most recent commissioning test. This field is populated by the NOC and cannot be created or updated by CMIS.

Default VN
Definition:
VN selected if user does not specify VN during dialing. For METs that belong to only one VN, this can be populated with the VN ID the MET is assigned to by default.

EIRP
Definition:
Equivalent Isotropic Radiated Power—power level required for a MET to receive a satellite signal. This element is a characteristic of the MET Class. CMIS will only have the MET Class ID that a particular METs equipment maps to. NE/SE originates this and other data that describes the MET Class and sends it to the NOC.

Event Argument Id
Definition:
   Part of the Event Record received from the NOC. CMIS has no part in creating or updating events-they arrive unsolicited from the NOC.
Event Argument Type
Definition:
   Part of the event Record received from the NOC. CMIS has no part in creating or updating events-they arrive unsolicited from the NOC.
Event Argument Value
Definition:
   Part of the Event Record received from the NOC. CMIS has no part in creating or updating events-they arrive unsolicited from the NOC.
Event Argument VMS Type
Definition:
   Part of the Event Record received from the NOC. CMIS has no part in creating or updating events-they arrive unsolicited from the NOC.
Event Code
Definition:
   Part of the Event Record received from the NOC. CMIS has no part in creating or updating events-they arrive unsolicited from the NOC.
Event Severity
Definition:
   Network impact assessment of the trouble event.
Event Time
Definition:
   Time the event occurred within the network.
Event Type
Definition:
   Part of the Event Record received from the NOC. CMIS has no part in creating or updating events-they arrive unsolicited from the NOC.
External Date Time Stamp
Definition:
   CMIS generated time stamp used for CMIS audit purposes in exchanging messages with the CGS.
External Transaction Id
Definition:
   CMIS generated transaction id used for CMIS audit purposes in exchanging messages with the CGS.
Feature Set
Definition:
   Identifies MET features within a specific VN. Fixed features are set up during order processing and require no action by the MET user to invoke a feature. MET activated features must also be set up during order processing but will only be available through some action on the part of the MET use during call process.
   FIXED FEATURES include:
   Calling Line Id Presentation (CLIP)—display the calling party's number to a MET.
   Calling Line Id Restriction (CLIR)—prohibition from displaying the METs number when it is calling another party.
   Connected Line Id Presentation (COLP)—display the number the calling MET is connected to.
   Connected Line Id Restriction (COLR)—prohibit display of the connected MET's number to the calling party.
   Sub-addressing (SA)—allows one or more attachments to the MET to be addressed. This is being accomplished through unique phone numbers for service types requiring different equipment.
   Call Waiting (CW)—notification to a MET engaged in the call that another call is waiting. MET may accept the other call or ignore it.
   Call Barring (CB)—restricts the MET user's from making or receiving one or more types of calls.
   Operator intervention (OI)—allows an operator to break into a call in progress for the MET.
   Operator Assistance (OA)—allows the MET to access an MSAT operator to receive assistance
   Call Priority (CP)—used in conjunction with the system's call queuing function (trunk access priority) presence of this feature gives a MET access to channels at times of congestion ahead of MET's with lower priority. Priority applies only to MET initiated calls.
MET ACTIVATED (dynamic) FEATURES include:
   Call Transfer (CT)—allows sa MET user to transfer an established call to a third party.
   Call Forwarding Unconditional (CFU)—permits a MET to have all calls forwarded to another MET or PSTN number.
   Call Forwarding Busy (CFB)—permits a MET to have all incoming calls attempted when the MET is busy to another MET or PSTN number.
   Call Forward Congestion (CFC)—permits the MET to have all incoming calls attempted when the signaling channels are congested answered with a recorded announcement intercept.
   Call Forward No Reply (CFN)—permits a MET to have all incoming calls attempted when the MET is not answering to another MET or PSTN number. This applies if the MET is blocked, turned off or not answering.
   Call Holding (CH)—allows a MET to interrupt call communication on an existing connection and then re-establish communications.
   Alternate Voice Data Operation (AVD)—allows a MET user to toggle between voice and data mode during a call. Requires that the call be initiated in voice mode. Only the MET user may toggle between voice and data. This requires a special service type in addition to the activation at set-up of the feature.
   Conference calling (CC)—allows a MET to communicate with multiple-parties including METs and PSTN concurrently.
   Three Party Service (3PS)—allows a MET to who is active on a call to hold that call, make an additional call to a third party, switch from one call to the other (privacy being provided between the calls) and/or release one call and return to the other.
   Malicious Call Trace (MCT)—enables an MSAT operator to retrieve the complete call record at a MET's request for any terminated call in real-time. The operator can then identify the calling party to the MET and take appropriate action.
   Voice Mail (VM)—allows call forwarding to a voice mail box and retrieved of messages by the MET.
   Alternate Accounts Charging (ACC)—allows the MET user to enter in an account code to charge the call to after entering the dialed digits
Fully Provision
Definition:
   Supply values to all attributes of a resource
Frequency Step Size
Definition:
   Minimum tuning increment acquired for a MET to tune in an assigned channel. CMIS will only have the MET Class ID that a particular MET's equipment maps to. NE originates this and other data that describes the MET Class and sends it to the NOC.

From MET Call Barring Flags
Definition:
Describe actions available to a user originating a call from a MET. These call Barring flags relate to specific types of calls at an aggregate level to indicate if the MET can make or receive a call of a particular type. When this list indicates that an Inclusion or Exclusion to particular numbers or area codes is allowed, the values for those restrictions are indicated on a Call Barring List.
FTIN
Definition:
Forward Terminal Identification Number—Downloaded to MET from NOC during commissioning. Used for MET to GC signaling.
Internal Data Time Stamp
Definition:
NOC generated time stamp used for NOC audit purposes.
Internal Transaction Id
Definition:
NOC generated transaction is used for NOC audit purposes.
Interim resource
Definition:
The resource currently being modified by the engineer. Changes made to an interim resource are not added to the working configuration until the resource is committed to the working configuration.
L Band Beam
Definition:
Current beam MET is logged into. Determined by the GC during commissioning. CMIS has no role in creating or updating this field.
LCC
Definition:
Line Class Code—type of phone, required by the switch.
MCC Class Id
Definition:
Part of the Event Record received from the NOC. CMIS has no part in creating or updating events—they arrive unsolicited from the NOC.
MCC Instance
Definition:
Part of the Event Record received from the NOC. CMIS has no part in creating or updating events—they arrive unsolicited from the NOC.
MCC Instance Id
Definition:
Part of the Event Record received from the NOC. CMIS has no part in creating or updating events—they arrive unsolicited from the NOC.
MCC Instance Type
Definition:
Part of the Event Record received from the NOC. CMIS has no part in creating or updating events—they arrive unsolicited from the NOC.
Message Status 1
Definition:
Used in the message initiated by the NOC to acknowledge success or failure of a previously transmitted CMIS request. Used by the DM.
Message Status 2
Definition:
Used in the message initiated by the NOC to acknowledge success or failure of a previously transmitted CMIS request. Will be used by the DM.

Message Verb
Definition:
Action required at the NOC on data passed in a message from CMIS. This field is in the message relaying the results of a CMIS request.
Modulation Scheme
Definition:
Non-standard modulation schemes. CMIS will only have the MET Class ID that a particular MET's equipment maps to. NE/SE originates this and other data that describes the MET Class and sends it to the NOC.
MSA
Definition:
Mobile Servicing Area—identifies the last call's servicing area. Atomic data element within MSR. Transient data maintained in call processing not on the cellular switch table. Same as MSR.
MSR
Definition:
Mobile Servicing Region id (table) contains multiple MSA assignments for the MET. For a roamer, the operator will input the MSR for temporary assignment. Allows up to 1024 cust groups—At CGS startup there will be 1 MSR.
MET ASK
Definition:
Access Key MET must match during call setup/validation.
MET Class ID
Definition:
Identifies the operating characteristics of the MET. Associated to MET by CMIS during registration from data supplied by NE/SE. The technical characteristics the MET Class ID encompasses are not needed by CMIS. These are stored on a table in the NOC and referenced by having the ID on the MET Information record. This ID applies to MET level regardless of how many services, etc. the MET has tied to it.
MET Commanded State
Definition:
Current CGS status of MET.
MET Fraud Flag
Definition:
Indicates fraud has been detected on the MET. Updated by GC and CMIS only. This field is set at the MET level regardless of the number of services, etc. the MET has.
MET ID
Definition:
CMIS assigned unique MET identifier. This can be a unique random number assigned to each MET registered for service. This is a MET level characteristic set once for the MET regardless of how many services, etc. the MET has. The MET ID is used by the NOC to identify METs. It does not have to be used within CMIS as a key field. MET ID cannot be updated once it has been assigned. A MET that requires a new MET ID for any reason would have to go through the registration process anew.
MET Signaling Code
Definition:
Dialed digits from MET that identifies VN selection. Signaling codes would be assigned when a MET has multiple Virtual Network memberships. After the MET user enters the destination phone number, the pound key is hit and then the signaling code is entered if the caller wants to associated the outbound call with a particular virtual network. When no signaling code is entered, implies default VN be associated with the call.

Pending NVRAM Init Flag
Definition:
　Instructs the GC to download/initialize parameters for a MET.
Pending PVT Flag
Definition:
　This flag indicates that a PVT is required following next MET access. If CMIS requests a PVT to help diagnose customer troubles, an update would be sent to NOC with the Flag set to Perform PVT after Next MET access (1).
Picsel
Definition:
　Flag indicating if user has asked for a preferred IXC carrier. Carrier name is contained in CARRIER field.
Record Type
Definition:
　Type of record defined by object. Part of the Update Results Record.
Remote
Definition:
　Remote user—not required by the switch for MSAT Application.
Recent Configuration Event
Definition:
　This is a serial list of events received from the NOC that pertain to configuration database changes.
Referential Integrity
Definition:
　Database "key field" relationships that bind record within the databases, and create dependencies for additions and deletions of table instances.
RF Pin
Definition:
　Remote feature personal identification number. A user is prompted for a pin when attempting to use a remote feature.
Roam
Definition:
　Roam Capable—not required by the switch for MSAT Application.
RTIN
Definition:
　Reverse Terminal Identification Number which is also the satellite electronic serial number on satellite only and dual mode cellular/satellite METs. This is a unique identifier assigned by manufacturer for each piece of equipment. Within CGS processing the RTIN is used by the GC to signal the MET.
Satellite Id
Definition:
　Satellite Id of current L-band beam. The NOC populates this field based on MET commissioning. CMIS does not ever create or update this field.
SCM
Definition:
　Station Class Mark.
Secure Disable Flat
Definition:
　Channel Unit security check flag. Setting this flag to bypass security would disable ASK verification during call processing for a MET. CMIS cannot change this flag.
Signaling Priority
Definition:
　Number of MET signaling requests to the GC during network congestion. Assigned at the MET level—each MET may have only one signaling priority regardless of the number of VN memberships it has. The highest priority level is 0 and the lowest is seven.

TDM Change Enable Flat
Definition:
　Restriction on MET from changing TDM (TDM is the GSI).
Telephone Number
Definition:
　Phone number associated with a call type (voice, data, fax, avd) in a given virtual network.
Template
Definition:
　An initial set of default attribute values for each resource being added.
To MET Call Barring Flags
Definition:
　Describes actions available to a user receiving a call at their MET.
Trunk Access Priority
Definition:
　Satellite trunk queuing priority used during network congestion. Determines access to channels.
Virtual Network Id
Definition:
　Identifies the Virtual Network that the service and feature profiles relate to. Within a single VN a MET may have one voice, data, fax and/or avd service type. Features and restrictions for those services are defined on the basis of the METs membership in that VN. If the MET required an additional instance of a service that it already subscribed to, (e.g. a second voice number), a second virtual network assignment would be required. Features and restrictions for that second membership can be defined with no relation to the existing VN membership, but all elements that relate to the MET level cannot change without a ripple effect to the other services.
VMS Instance Type
Definition: Part of the Event Message
Vocoder Id
Definition:
　Vocoder version currently installed in the MET. CMIS will only have the MET Class ID that a particular METs equipment maps to. NE/SE originates this and other data that describes the MET Class and sends it to the NOC.
Working Configuration
Definition:
　The set of resources currently being modified by the engineer. This may be an existing, complete configuration which the engineer is modifying, or may be a new, partial (or initially empty) configuration.

GLOSSARY

A Availability
AAC Airline Administrative Communications
AARM Access Authentication Request
ABH Average Busy Hour
AC Alternating Current
ACU Access Channel Unit
ACU Antenna Control Unit
AD Attribute Dictionary
AEDC After Effective Date of Contract
AFC Automatic Frequency Control
AFS Antenna/Front-end Subsystem
AGC Automatic Gain Control
AIOD Automatic Number Identification Outward Dialing
AMI Alternative Mark Inversion
AMPS North American Analog and Digital Cellular Networks
AMSC American Mobile Satellite Corporation AMS(R)S Aeronautical Mobile Satellite (Route) Service
AMSS(R) Aeronautical Mobile Satellite Services (Reserved)
ANI Automatic Number Identification
ANSI American National Standards Institute
ANT Antenna
AOC Aircraft Operational Communications
APC Airline Passenger Communications
API Applications Program Interface
AR Automatic Roaming
ARC Atlantic Research Corporation
ASK Access Security Key
ASN.1 Abstract Syntax Notation One
AT Command set for a DTE to communicate with asynchronous host
ATC Air Traffic Control
AVD Alternate Voice/Data Calls
AWGN Additive White Gaussian Noise
AZ Azimuth
B8ZS Bipolar with 8 Zeros Substitution
BB Bulletin Board
BBS Bulletin Board Service
BER Bit Error Rate
BERT Bit Error Rate Tester
BID Beam Identifier Code
BIT Built In Test
BITE Built-In Test Equipment
BPS Bits Per Second
BS Base Station
BSPU Baseband Signaling Processing Unit
BSS Base Station Switch
C/No Carrier to Noise Power Density Ratio
CAC Channel Access and Control
CAF Call Failure Message
CCCS Command, Control, and Communications Subsystem
CCIR Consultative Committee International de Radio
CCITT Consultative Committee International Telegraph and Telephone
CCU Communications Channel Unit
CD Call Delivery
CDR Call Detail Record
CDR Critical Design Review
CDRL Contract Data Requirements List
CE Common Equipment
CG Control Group
CGID Control Group Identification Number
CGS Communications Ground Segment
CHA Channel Assignment Message
CHREL Channel Release Message
CHREQ Channel Request Message
CI Configuration Item
CIBER Cellular Intercarrier Billing Exchange Roamer
CIC Carrier Identification Code
CM Configuration Management
CMIP Common Management Information System
CMIS Configuration Management Information System
CMIS Customer Management Information System
COTS Commercial off-the-Shelf
CP Circuit Pool
CPD Call Processing Demonstration
CPS Circuit Pool Segment
CPU Central Processing Unit
C/PV Commissioning/Performance Verification
CRC Cyclic Redundancy Check
CS Communications System
CSC Computer Software Component
CSCI Computer Software Configuration Item
CSDT Channel Switchover Detection Time
CSF Critical System Functionality
CSMA/CD Carrier Sense Multiple Access with Collision Detection
CSMP Circuit Switch Management Processor
CSMPCS Circuit Switch Management Data Processor Equipment Communications System
CSPU Channel Signal Processing Unit
CSR CAC Statistics Request
CSREP Call Status Reply Message
CSREQ Call Status Request Message
CSU Computer Software Unit
CSUG Computer Software Unit Group
CTB Customer Test Bed
CTN Cellular Telephone Network
CTN Cellular Terrestrial Network
CTNI Cellular Telephone Network Interface
CU Channel Unit
CUD Call User Data
CUG Closed User Group
CUP Channel Unit Pool
CUS Channel Unit Subsystem
CVR Cellular Visitor Registration
CVRACK Cellular Visitor Registration Acknowledge
CW Carrier Wave
CWCHA Call Waiting Channel Assignment Message
DAMA Demand Assignment Multiple Access
db Database
dbc Decibel Relative to Carrier
dB decibels
dBi dB Relative to Isotropic
dBm dB relative to 1 milli watt
dBW decibels relative to 1 watt
D bit 'Data Configuration' bit in X.25
DBMS DataBase Management System
dBw dB Relative to 1 Watt
DC Direct Current
DCE Data Circuit Terminating Equipment
DCE Data Communications Equipment
DCL Digital Command Language
DCN Down CoNverter
DCR# Document Control Release#
DCU Data Channel Unit
DD Design Document
DDCMP Digital Data Communications Message Protocol
DDS Direct Digital Synthesis
DEC Digital Equipment Corporation
DECmcc Digital's Network Management System
DEQPSK Differential Encoded Quadrature Phase Shift Keying
DET Data Equipment Terminal
DFD Data Flow Diagram
DH Data Hub
DH-D Outbound Time Division Multiplex Channel from Data Hub to Mobile Terminal
DHP Data Hub Processor
DHSI DH-D Selector Identification Code
DID Direct Inward Dialing
DLDs Data Item Descriptions
DME Dial-Up Modem Emulation
DMQ DEC Message Queue
DMS Digital Multiplex System
DN Directory Number
DNS Digital Name Service
DOC Canadian Department Of Communications
DOD Direct Outward Dialing
DPSK Differential Phase Shift Keying DQPSK Differentially Encoded Quadrature Phase Shift Keying
DS0 Digital Service Level Zero (single 64K b/s channel)
DS1 Digital Service Level One (twenty four voice channels)
DSP Digital Signal Processing
DSSS1 Digital Subscriber Signaling System 1
DTC Digital Trunk Controller
DTE Data Terminal Equipment
DTE Data Terminal Element
DTMF Dual Tone Multiple Frequency
DVSI Digital Voice Systems, Inc.
Eb/No Bit Energy to Noise Power Density Ratio
ECN Engineering Change Notice
EFD EF Data, Inc.
EFTINEncrypted Forward Terminal Identification Number
E-I Exchange-Interexchange
EIA Electronic Industries Association
EICD Element Interface Control Document
EIE External Interface Equipment
EIRP Equivalent Isotropic Radiated Power
E1 Elevation
EMC ElectroMagnetic Compatibility
EMI ElectroMagnetic Interference
eng engineer or engineering
EO End Office
EO External Organizations
EOD End of Data
ESN Electronic Serial Number
FAX Facsimile
FCA Functional Configuration Audit
FCC Federal Communications Commission
FCS Fading Channel Simulator
FDMA Frequency Division Multiple Access
FEC Forward Error Correction
FES Feederlink Earth Station
FES-C Inbound Communication channel from Feederlink Earth Station to Mobile Terminal
FES-I Interstation signaling channel from Feederlink Earth Station to Group Controller
FES/MT Feederlink Earth Station/Mobile Terminal
FES-REFeederlink Earth Station-Radio Frequency Equipment
FES-TEFeederlink Earth Station Terminal Equipment
FFT Fast Fourier Transform
FIS Feederlink Earth Station Interface Simulator
FIT Fault Isolation Tests
FIU Fax Interface Unit
FMT Fixed Mobile Terminal
FMA Field Programmable Gate Array
FPMH Failures per Million Hours
FRO Frequency Reference Oscillator
FT Fault Tolerant
FTE Fax Terminal Equipment
FTIN Forward Terminal Identification Number
G/T Gain to System Noise Ratio
GBF Gateway/Base Function
GBS Gateway Base System
GC Group Controller
GC-I Interstation signaling channel from Group Controller to Feederlink Earth Station
GC-S Time Division Multiplex Signaling channel from Group Controller to Mobile Terminal
GCSSTGC-S Search Time
GEN Generator
GHz Giga (1,000,000,000) Hertz (cycles per second)
GMACS Graphical Monitor And Control System
GPIB General Purpose Instrument Bus
GPS Global Positioning System
GS Gateway Station
GSI GC-S Selector Identifier
GW Gateway
GWS Gateway Switch
GWS/BSS Gateway Switch/Base Station Switch
H/W Hardware
HCHREQHandoff Channel Request
HDP Hardware Development Plan
HLR Home Location Register
HMI Human Machine Interface
HOT Hand-off Test
HPA High Power Amplifier
HRS Hardware Requirements Specification
HWCI Hardware Configuration Item
HW/SWHardware/Software
Hz Hertz
I In Phase channel
IAW In Accordance With
IC Interexchange Carrier
ICD Interface Control Document
ICI Instrument Control Interface
ICP Intelligent Cellular Peripheral
ICU Interstation Channel Unit
ICWG Interface Control Working Group/Interface Coordination Working Group
ID Identification
IEEE Institute of Electrical and Electronics Engineers
IF Intermediate Frequency
IFIS Intermediate Frequency Subsystem
IFL Interfacility Link
IF IFLIntermediate Frequency Internal Facility Link
IHO Interstation Hand-Off
IICD Internal Interface Control Document
IICWGInternal Interface Control Working Group
IM Intermodulation
IMBE Improved Multiband Excitation
IOC Input/Output Controller
IP Internet Protocol
ISCU Interstation Signaling Channel Unit/Interstation Channel Unit
ISDN Integrated Services Digital Network
ISL Interstation Signaling Link
ISO International Standards Organization
IVDCPD Integrated Voice & Data Call Processing Demonstration
IVDM Integrated Voice/Data Mobile Terminal
KBPS Kilo (1,000) Bits per Second kHz Kilohertz
KLNA K-band Low Noise Amplifier
KP Key Pulse
LAN Local Area Network
LAP Link Access Procedure
LAPB Link Access Procedure using a balanced mode of operation
LATA Local Access and Transport Area
LBP Local Blocking Probability
LCN Logical Channel Number
LLCSC Lower Level Computer Software Component
LLNA L-band Lowe Noise Amplifier
LLS Lower Level Specification
LNA Low Noise Amplifier
LOI Level of Integration
LPP Link Peripheral Processor
LRU Line Replaceable Unit
LRU Lowest Replaceable Unit
LSSGR Loval Access and Transport Area Switching Systems Generic Requirements MAP Maintenance Administrative Position
MAP Mobile Application Part
M bit 'More Data' bit in X.25
M&C Monitor and Control
MCC Management Control Center
MCGID Mobile Data Service Control Group Identification Number
MDLP Mobile Data Service Data Link Protocol
MDS Mobile Data Service
MDSR MDLP Statistics Request
MEA Failure Modes and Effects Analysis
MEF Minimum Essential Functionality
MELCO Mitsubishi Electronic Company
MET Mobile Earth Terminal (a.k.a. MT)
MET-C Communication Channel Between Mobile Terminal and Feederlink Earth Station
MET-DRd Inbound Slotted Aloha Data Channel
MET-DRr Inbound Slotted Aloha Reservation Channel
MET-DT Inbound Packet Time Division Multiple Access Channel
MET-SR Random Access Signaling Channel from Mobile Terminal to Group Controller
MET-ST Time Division Multiple Access signaling channel from Mobile Terminal to Group Controller
MF Multiple Frequency
MFID Manufacturer Identification
MGSP Mobile Terminal to Group Controller Signaling Protocol
MHz Mega Hertz (cycles per second)
MIB Management Information Base
MIR Management Information Region
MIRQ MT Initialization Request
MIS Mobile Terminal Interface Simulator
MIS Mobile Earth Terminal Interface Simulator
ML Message Layer
MLCSC Mid Level Computer Software Component
MLP Multilink Procedure
MMI Man Machine Interface
MMRS Mobile Road Service
MMSS Maritime Mobile Satellite Services
MNMS Mobile Data Service Network Management Subsystem
MNP Multi Network Protocol
MODEM MODulator/DEModulator
MOS Mean Opinion Score
MOV Method of Verification
MPLP Mobile Data Service Packet Layer Protocol
MPR MPR Teltech Inc.
MRI Minimum Request Interval
MRS Mobile Radio Service
MSAT Mobile Satellite
MSC Mobile Switching Center
MSS Mobile Satellite Service
MSSP Mobile Terminal Specialized Services Protocol
ms millisecond
MT Mobile Terminal
MT-C Communication Channel Between Mobile Terminal and Feederlink Earth Station
MT-DRd Inbound Slotted Aloha Data Channel
MT-DRr Inbound Slotted Aloha Reservation Channel
MT-DT Inbound Packet Time Division Multiple Access Channel
MT ASK Mobile Terminal Access Security Key
MTBF Mean-Time Between Failures
MTBRA Mean-Time Between Restoral Actions
MTCRS Mobile Telephone Cellular Roaming Service
MT-MET Mobile Terminal to Mobile Terminal
MT-MT Mobile Terminal to Mobile Terminal
MTP Mobile Data Service Transaction Protocol
MT-PSTN Mobile Terminal/Public Switched Telephone Network
MTS Mobile Telephone Service
MT-SR Random Access Signaling Channel from Mobile Terminal to Group Controller
MTSR MTP Statistics Request
MT-ST Time Division Multiple Access Signaling Channel from Mobile Terminal to Group Controller
MTTR Mean-Time to Repair
MTX Mobile Telephone Exchange
MULP Mobile Data Service Unacknowledged Link Protocol
MUSR MULP Statistics Request
NACN North American Cellular Network
NADP North American Dialing Plan
NANP North American Numbering Plan
NAP Network Access Processor
NAP-C Network Access Processor for the Communications Channel
NAP-CU Network Access Processor-Channel Unit
NAP-D Network Access Processor for the Data Channel
NAP-N Network Access Processor for the Network Radio Channel
NAP-S Network Access Processor for the Signaling Channel
NAS Network Access Subsystem
NASP National Aerospace Plan
NCC Network Communications Controller
NCC Network Control Center
NCC-RE Network Communications Controller Radio frequency Equipment
NCC-TE Network Communications Controller Terminal Equipment
NCS Network Control System
NE Network Engineering
NEBS New Equipment Building System
NE/SE Network Engineering/System Engineering
NIM Network Module
NM Network Module
NMP Network Management Process
NMS Network Management System
NMS/CMIS Network Management System/Customer Management Information System
NOC Network Operations Center
NOC-FES Network Operations Center-Feederlink Earth Station
NPA Numbering Plan Area
NRZ Non-Return to Zero
NT Northern Telecom
NTL Northern Telecom Limited
NTP Northern Telecom Practice
NVM Non-Volatile Memory
OA&M Operation, Administration, and Maintenance
O&M Operations and Maintenance
OJJ On the Job Training
OM Operational Measurements (from GWS)
OS Operating System
OSF Open Software Foundation
OSI Open Systems Interconnection
OSR Operational Support Review
PA Product Assurance
PAC Pre-emption Acknowledge Message
PAD Packet Assembler/Disassembler
PAP Product Assurance Plan
PBX Private Branch Exchange
PC Process Control
PCM Pulse Code Modulation PC-RFMCP PC Based RFM Control Processor
PC-SCPPC Based Systems Control Processor
PCSTR Physical Channel Statistics Request
PCT Provisioning Criteria Table
PCU Pilot Control Unit
PCU Pilot Channel Unit
PDAMA Priority Demand Assignment Multiple Access
PDN Packet Data Network
PDR Preliminary Design Review
PDU Protocol Data Unit
PE Protocol Extension
PER Packet Error Rate
PERSP Packet Error Rate Sample Period
PERT Packet Error Rate Threshold
PIP Program Implementation Plan
PLP Packet Layer Protocol
PLT Pilot
PMR Project Management Review
PMT Pre-emption Message
PN Private Network
PN Pseudo Noise
PNIC Private Network Identification Code
PPM Pulses per Minute
PS Processor Subsystem
PSDN Private Switched Data Network
PSDN Public Switched Data Network
PSTN Public Switched Telephone Network
PTT Push-To-Talk
PVC Performance Virtual Circuit
PVT Permanent Verification Test/Performance Verification Test
Q Quadrature Phased Channel
QA Quality Assurance
Q bit 'Qualified Data' bit in X.25
QPSK Quadrature Phase Shift Keying
RAM Random Access Memory
RAM Reliability, Availability, Maintainability
RDB Relational DataBase
REMS Remote Environmental Monitoring System
Req Requirement
Rev Revision
RF Radio Frequency
RFE Radio Frequency Equipment
RFIFL Radio Frequency Inter Facility Link
RFM Radio Frequency Monitor
RFP Request For Proposal
RFS Radio Frequency Subsystem
RHCP Right Hand Circularly Polarized
RMS Remote Monitoring Station
RMS Remote Monitor Subsystem
RNO Remote NOC Operator
ROM Read Only Memory
RR Receiver Ready
RS Requirements Specification
RS-232C Electronics Industry Standard for unbalanced data circuits
RSP Radio Standard Procedure
RTIN Reverse Terminal Identification Number
RTM Requirements Traceability Matrix
RTP Reliable Transaction Protocol
RTR Reliable Transaction Router
RTS Reliable Transaction Service
RTS Receiver/Tuner System
Rx Receive
S/W Software
SCADA Supervisory Control and Data Acquisition
SCCP Signaline Connection Control Part
SCPC Single Channel Per Carrier
SCR Software Change Request
SCS System Common Software
SCU Signaling Channel Unit
SDD Software Design Description
SDID Seller Data Item Description
SDLC Synchronous Data Link Control
SDP Software Development Plan
SDPAP Software Development Product Assurance Plan
SDR System Design Review
SDRL Seller Data Requirements List
SE Systems Engineering
SEC Setup Complete Message
SEDP Software Engineering Development Plan
SEE Software Engineering Environment
SEEP Software Engineering Environment Plan
SID System Identifier Code
SIF System Integration Facility
SIT Special Information Tones
SLOC Source Lines of Code
SLSS Station Logic and Signaling Subsystem
SM Site Manager
SMAC Station Monitor Alarm and Control Subsystem
SMDS Satellite Mobile Data Service
SMP Software Management Plan
SMRS Satellite Mobile Radio Service
SMSC Satellite Mobile Switching Center
SMTS Satellite Mobile Telephone Service
SNA Systems Network Architecture
SNAC Satellite Network Access Controller
SNACSSatellite Network Access Controller Subsystem
SNMP Simple Network Management Protocol
SNR Signal to Noise Ratio
SOC Satellite Operation Center
SOW Statement of Work
SP Start Pulse
SPAP Software Product Assurance Plan
SPP Satellite Protocol Processor
SQL Software Query Language
SRR Systems Requirements Review
SRS Software Requirements Specification
SS7 Signaling System No. 7
SSA Sloppy Slotted Aloha
SSTS Satellite Transmission Systems, Inc.
STP Signal Transfer Point
STP System Test Program
STS System Test Station.
STSI Satellite Transmission Systems, Inc.
Su Signaling Unit. A data packet used for signaling.
Sues Shared-Use Earth Station
SVC Switched Virtual Circuit
SVVP Software Verification and Validation Plan
SVVPR Software Verification and Validation Plan Review
S/W Software
[TI] Top Level Specification
T-1 Digital Transmission Link, 1.544 Mega-bits per second
TCP/IP Transmission Control Protocol/Internet Protocol
TCAP Transactions Capabilities Application Part
TCF Training Check Frame
TD Transmission demonstration
TDM Time Division Multiplex
TDMA Time Division Multiple Access
TDMSI Time Division Multiplex Selector ID
TE Terminal Equipment Telecom Telephonic Communications
TDM Time Division Multiplex
TDMA TDM Access TID Terminal Identification
TIM Timing
TIM Technical Interchange Meeting
TIN Terminal Identification Number
TIS Terrestrial Interface Subsystem
TLCSC Top Level Computer Software Component
TLS Top Level Specification
TMI Telesat Mobile Incorporated
TMS Test and Monitor Station
TNI Terrestrial Network Interface
TPP Test Plan and Procedure
TT&C Telemetry, Tracking and Control
TX Transmit
UCN Up Converter
UDS Unacknowledged Data Delivery Service
UIS User Interface Subsystem
UPC Uplink Power Control
UTR Universal Tone Receiver
UW Unique Words
V&V Verification and Validation
VAC Value-Added Carrier
VAX Model Identification of a Digital Equipment Corporation system
VAX Virtual Address Extension (proprietary name used by DEC for some of its computer systems)
VCN Virtual Circuit Number
VF Voice Frequency
VLR Visitor Location Register
VN Virtual Network
VPN Virtual Private Network
VUP VAX Unit of Processing
V.25 Procedure for setting up a data connection on the Public Switched Telephone Network
V.26, V.28 Electrical specification of interchange circuits at both the Data Terminal Equipment and Data Communications Equipment sides of the interface (similar to RS-232-C)
V.32 High Speed Serial Link, Physical Layer Definition V.35 X.25 physical layer interface used to access wideband channels (at data rates up to 64 kbit/s)
WAN Wide Area Network
XCR X.25 Configuration Request
XICD External Interface Control Document
XICWG External Interface Control Working Group
X.3 Specification for facilities provided by the Packet Assembler/Disassembler
X.21 X.25 physical layer interface for Data Terminal Equipment and Data Communications Equipment using synchronous transmission facilities
X.21bis X.25 physical layer interface for Data Terminal Equipment designed for interfacing to synchronous V-series modems to access data networks
X.25 Specification for interface between Data Terminal Equipment and Data Communications Equipment for terminals operating in packet mode
X.28 Specification for interaction between loval terminal and Packet Assembler/Disassembler
X.29 Specification for interaction between Packet Assembler/Disassembler and remote packet mode terminal

What is claimed is:

1. In a satellite network system including a satellite antenna for receiving and transmitting messages via a satellite and satellite beams to and from feederlink earth stations (FESs) connected to at least one land line communications network and mobile earth terminals (METs) of a mobile communication system; a satellite communication switching office connected to said antenna and coupled through a satellite interface system to a central controller; and a network operations center (NOC) for managing and controlling resources of the satellite network system, the NOC communicating with various internal and external entities via a control network, said NOC transmitting and receiving information with other components of the NOC, allocating system resources, updating network functions, enabling monitoring of customer usage, detecting fault conditions, and transmitting system information to an operator station, a priority and preemption system performing the functions of:

(a) satisfying a resource acquisition request from a reserve pool for an external system;

(b) replenishing the reserve pool with power and frequencies received from at least one of a frequency controller, a data hub and an independent operations controller leasing the frequencies;

(c) when the resource acquisition request cannot be satisfied from the reserve pool, requesting additional unused frequencies, and when the additional unused frequencies are not available, requesting to preempt active calls; and (d) replenishing the power and the frequencies received from the at least one of the frequency controller, the data hub and the independent operations controller when the frequencies are no longer needed by the priority and preemption system, thereby replenishing the reserve pool in an ordered way that minimizes replenishment time while minimizing possible disruption to other networks.

2. A priority and preemption system according to claim 1, wherein the resource acquisition request comprises at least one of an Aeronautical Mobile Satellite (Route) Service (AMS(R)S) request, a maritime request, a distress request, and a priority request.

3. A priority and preemption system as recited in claim 1, wherein said NOC comprises:

data management means for transmission and receipt of information with other components of the network operations center, said data management means including a NOC data base;

configuration management means for allocating system resources;

network management means for updating network functions;

call records management means for enabling monitoring of customer usage;

event management means for detecting fault conditions; and operator interface means for transmitting system information to an operator station.

4. A priority and preemption system as recited in claim 3, wherein said call records management means comprises:

a first server for receiving satellite call usage records from the GCs and a second server for receiving nonsatellite call usage records from at least one gateway switch (GWS), each of said servers coupled to said NOC data base for storage therein of said usage records, said servers further coupled to said CMIS for transmission thereto of usage information.

5. A priority and preemption system as recited in claim 3, wherein said operator interface means comprises:

session manager means for logging into the NOC by an operator;

access security encryption means for encrypting for encrypting request transactions;

operator message interface means for interfacing an operator with electronic mail; and resource allocation means for enabling the operator to modify system operation.

6. A priority and preemption system as recited in claim 3, wherein said data management means further comprises:

a router for routing configuration update requests to a plurality of NOC components and for receiving poling update request responses from said components;

a configuration data base server for updating said NOC data base for each update request upon receipt of positive responses from all of the components poled for the respective update request; and communication means for exporting information from the NOC database to NE/SE and CMIS.

7. A priority and preemption system as recited in claim 3, wherein said network management means comprises historian means for recording performance of the network over time.

8. A priority and preemption system as recited in claim 7, wherein said historian means collects statistics regarding resource utilization and calls in progress.

9. A priority and preemption system as recited in claim 3, wherein said network management means further comprises process control means for controlling NOC startup and shutdown.

10. A priority and preemption system as recited in claim 3, wherein said network management means comprises a management information repository (MIR) server for receiving network update information and exporter means for transmitting network management information to the NOC data base.

11. A priority and preemption system as recited in claim 3, wherein said network management means comprises watchdog means for transmitting an alarm in response to an abnormal condition.

12. A priority and preemption system as recited in claim 1, wherein said satisfying the resource acquisition request from the reserve pool step (a) includes at least one of switching operating modes from packet mode to circuit mode or vice versa, and queuing of calls within the operating mode.

13. A priority and preemption system as recited in claim 1, wherein the priority and preemption system provides a sequential method of restoring the reserve pool minimizing the necessity of actual preemption of an active call, maximizing usage of at least one of the additional unused frequencies and idle capacity due to a demand nature of service.

14. A priority and preemption system as recited in claim 1, wherein the priority and preemption system further performs at least one of the following automatic transactions between the NOC and the external system:

Major Alarms (NOC to external system)—wherein this transaction comprises a first summary message indicating that a first major alarm condition has occurred and to alert operators to a possible requirement for action or intervention;

Major Alarms (external system to NOC)—wherein this transaction comprises a second summary message indicating that a second major alarm condition has occurred within the external system and to alert operators to a possible requirement for action or intervention;

Resource Acquisition Request (external system to NOC)—wherein this transaction comprises a request for satellite resources under emergency conditions, and when the satellite resource are not available to service this request, pre-emption occurs;

Resource Acquisition Response (NOC to external system)—wherein this transaction comprises a positive acknowledgment of a Resource Acquisition Request identifying channels or frequencies;

Resource Release (external system to NOC)—wherein this transaction comprises a message detailing release or partial release of resources acquired under emergency conditions;

Summary Status Request (Bidirectional)—wherein this transaction comprises a periodic automatic message requesting a confidence summary status of report of a condition of a satellite or the NOC;

Summary Status Confidence Report (Bidirectional)—wherein this transaction provides a summary confidence report showing the state of major operational conditions of a satellite and either the NOC or the external system.

15. A priority and preemption system as recited in claim 1, wherein the priority and preemption system further performs at least one of the following console transactions between the NOC and the external system:

Operator Message Request (Bidirectional)—wherein this transaction comprises a first message between operators requesting operational information;

Operator Message Response (Bidirectional)—wherein this transaction comprises a second message between operators conveying requested operational information;

Status/Info Request (Bidirectional)—wherein this transaction comprises a request for information or reports which are electronically generated or stored, but which requires operator intervention for access, transmission, or authorization;

Status/Info (Bidirectional)—wherein this transaction comprises transmission of information or reports which are electronically generated or stored, but which requires operator intervention for access, transmission, or authorization and occurs in response to a request;

Database/File Request (Bidirectional)—wherein this transaction comprises a request for database information or files which are electronically generated or stored, but which require operator intervention for access, transmission, or authorization;

Database/File (Bidirectional)—wherein this transaction comprises transmission of database information or files which are electronically generated or stored, but which require operator intervention for access, transmission, or authorization and occurs in response to a request;

Resource Allocation Request (AMS(R)S NOC to NOC)—wherein this transaction comprises a request for allocation of satellite resources for general use, such as resale to customers/users and this transaction does not result in pre-emption;

Resource Allocation Response (NOC to AMS(R)S NOC)—wherein this transaction comprises a response to a Resource Allocation Request and indicates a denial or details of a full or partial allocation of requested resources;

Resource Release Request (Bidirectional)—wherein this transaction comprises a message requesting de-allocation of non-emergency resources;

Resource Release Acknowledge (Bidirectional)—wherein this transaction comprises a response to a Resource Release Request acknowledging or declining release of satellite resources.

16. A priority and preemption system as recited in claim 1, wherein when said satisfying step (a) is performed, said priority and preemption system further performs the function of after satisfying the resource acquisition request with the frequencies drawn from the reserve pool, replenishing the reserve pool by obtaining unused frequencies from other available circuit pools or from the independent NOCs which lease frequencies within a predetermined frequency band.

17. A priority and preemption system as recited in claim 1, wherein the reserve pool is assigned a rank order that determines an order in which the frequencies are used for the external system.

18. A priority and preemption system as recited in claim 1, wherein said priority and preemption system determines whether the reserve pool has been replenished to resource levels above a configurable threshold, and when the configurable threshold is reached, excess resources are returned to the at least one of the frequency controller, the data hub and the independent operations controller leasing the frequencies.

19. A priority and preemption system as recited in claim 1, wherein said priority and preemption system returns the frequencies in the reserve pool in a sequence determined by priority level and rank order of the frequencies in accordance with predetermined criteria.

20. A priority and preemption system as recited in claim 1, wherein the external system comprises an AMS(R)S system.

21. In a mobile satellite system including a satellite communication switching office and network system having a satellite antenna for receiving and transmitting a satellite message via a satellite and satellite beams to and from feederlink earth stations (FESs) and mobile earth terminals (METs) using a mobile communication system, a satellite interface system, a central controller receiving and transmitting the satellite message to and from the satellite communication switching office, the mobile satellite system being responsively connected to said mobile communication system and comprising:
 a network operations center (NOC) managing and controlling the resources of the satellite network system and carrying out the administrative functions associated with the management of the network system, the NOC communicating with various internal and external entities via a control network;
 a first network communications controller (NCC) managing the real time allocation of circuits between METs and FESs for the purposes of supporting communications, available circuits being held in circuit pools managed by group controllers (GCs) within the NCC, the NCC communicating with the NOC via a satellite network internetwork, with FESs via Ku-to-Ku band interstation signaling channels or terrestrial links, and with METs via Ku-to-L band signaling channels;
 a FES supporting communications links between METS, the public switched telephone network (PSTN), private networks, and other METs, call completion and service feature management being accomplished via in-band signaling over the communication channel following the establishment of such a channel, the FES including a gateway FES providing mobile telephone service (MTS) and mobile telephone cellular roaming service (MTCRS) services, and a base FES providing mobile radio service (MRS) and net radio (NR) services; and
 a group controller subsystem (GCS) incorporating one or multiple group controllers (GC), each GC maintaining state machines for every call in progress within its control group and allocating and de-allocating circuits for FES-MET calls within each beam of the system, the GC providing satellite bandwidth resources to the NOC for AMS(R)S resource provisioning and monitoring the performance of call processing and satellite circuit pool utilization, and performing MET and database management,
 wherein said NOC performing priority and preemption functions of:
 (a) satisfying a resource acquisition request from a reserve pool for an external system;
 (b) replenishing the reserve pool with power and frequencies received from at least one of a frequency controller, a data hub and an independent operations controller leasing the frequencies;
 (c) when the resource acquisition request cannot be satisfied from the reserve pool, requesting additional unused frequencies, and when the additional unused frequencies are not available, requesting to preempt active calls; and
 (d) replenishing the power and the frequencies received from the at least one of the frequency controller, the data hub and the independent operations controller when the frequencies are no longer needed by the priority and preemption system, thereby replenishing the reserve pool in an ordered way that minimizes replenishment time while minimizing possible disruption to other networks.

22. In a mobile satellite system including a satellite communication switching office and network system having a satellite antenna for receiving and transmitting a satellite message via a satellite and satellite beams to and from feederlink earth stations (FESs) and mobile earth terminals (METs) using a mobile communication system, a satellite interface system, a central controller receiving and transmitting the satellite message to and from the satellite communication switching office, the mobile satellite system being responsively connected to said mobile communication system and including a network operations center (NOC) managing and controlling the resources of the satellite network system and carrying out the administrative functions associated with the management of the network system, the NOC communicating with various internal and external entities via a control network; a first network communications controller (NCC) managing the real time allocation of circuits between METs and FESs for the purposes of supporting communications, available circuits being held in circuit pools managed by group controllers (GCs) within the NCC, the NCC communicating with the NOC via a satellite network internetwork, with FESs via Ku-to-Ku band interstation signaling channels or terrestrial links, and with METs via Ku-to-L band signaling channels; a FES supporting communications links between METs, the public switched telephone network (PSTN), private networks, and other METs, call completion and service feature management being accomplished via in-band signaling over the communication channel following the establishment of such a channel, the FES including a gateway FES providing mobile telephone service (MTS) and mobile telephone cellular roaming service (MTCRS) services, and a base FES providing mobile radio service (MRS) and net radio (NR) services; and a group controller subsystem (GCS) incorporating one or multiple group controllers (GC), each GC maintaining state machines for every call in progress within its control group and allocating and de-allocating circuits for FES-MET calls within each beam of the system, the GC providing satellite bandwidth resources to the NOC for resource provisioning and monitoring the performance of call processing and satellite circuit pool utilization, and performing MET and database management, a priority and preemption system performing priority and preemption functions of:

(a) satisfying a resource acquisition request from a reserve pool for an external system;

(b) replenishing the reserve pool with power and frequencies received from at least one of a frequency controller, a data hub and an independent operations controller leasing the frequencies;

(c) when the resource acquisition request cannot be satisfied from the reserve pool, requesting additional unused frequencies, and when the additional unused frequencies are not available, requesting to preempt active calls; and (d) replenishing the power and the frequencies received from the at least one of the frequency controller, the data hub and the independent operations controller when the frequencies are no longer needed by the priority and preemption system, thereby replenishing the reserve pool in an ordered way that minimizes replenishment time while minimizing possible disruption to other networks.

23. A priority and preemption method for performing a priority and preemption process, comprising the steps of:

(a) satisfying a resource acquisition request from a reserve pool for an external system;

(b) when the resource acquisition request cannot be satisfied from the reserve pool, requesting additional unused frequencies, and when the additional unused frequencies are not available, requesting to preempt active calls; and (c) replenishing the power and the frequencies received from the at least one of the frequency controller, the data hub and the independent operations controller when the frequencies are no longer needed by the priority and preemption system, thereby replenishing the reserve pool in an ordered way that minimizes replenishment time while minimizing possible disruption to other networks.

* * * * *